United States Patent
Kobayashi et al.

(10) Patent No.: US 7,744,503 B2
(45) Date of Patent: Jun. 29, 2010

(54) ENIGNE-DRIVEN WORK MACHINE

(75) Inventors: Hiroshi Kobayashi, Wako (JP); Masayuki Sasaoka, Wako (JP); Toshio Inoue, Wako (JP); Kenzo Shimada, Wako (JP); Yoshinori Maekawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 591 days.

(21) Appl. No.: 11/654,152

(22) Filed: Jan. 17, 2007

(65) Prior Publication Data
US 2007/0169743 A1  Jul. 26, 2007

(30) Foreign Application Priority Data

| Jan. 26, 2006 | (JP) | 2006-017292 |
| Jan. 26, 2006 | (JP) | 2006-017389 |
| Jan. 26, 2006 | (JP) | 2006-017434 |
| Jan. 26, 2006 | (JP) | 2006-017498 |
| Jan. 26, 2006 | (JP) | 2006-017612 |

(51) Int. Cl.
B60W 10/06 (2006.01)
(52) U.S. Cl. .......... 477/107; 477/166; 477/181
(58) Field of Classification Search .......... 477/107, 477/166, 181
See application file for complete search history.

(56) References Cited

U.S. PATENT DOCUMENTS

| 4,592,322 A | 6/1986 | Murakami et al. |
| 4,860,607 A * | 8/1989 | Numazawa et al. ........... 74/330 |
| 5,146,735 A | 9/1992 | McDonner |
| 6,217,477 B1 * | 4/2001 | Nobumoto et al. ............ 477/43 |
| 6,378,492 B1 * | 4/2002 | Liu ........................ 123/339.18 |
| 7,220,213 B2 * | 5/2007 | Shimada et al. ............... 477/73 |
| 7,395,889 B2 * | 7/2008 | Sugiyama et al. ...... 180/65.285 |
| 2002/0056581 A1 * | 5/2002 | Mianzo et al. ............. 180/197 |
| 2002/0177940 A1 | 11/2002 | Suzuki et al. |

FOREIGN PATENT DOCUMENTS

| DE | 35 19 220 A1 | 12/1985 |
| DE | 39 37 846 A1 | 5/1991 |
| EP | 0 304 316 A | 2/1989 |
| JP | 04-350333 | 12/1992 |
| JP | 09-301015 | 11/1997 |
| JP | 2005-098223 | 4/2005 |

* cited by examiner

*Primary Examiner*—Ha D. Ho
(74) *Attorney, Agent, or Firm*—Carrier, Blackman & Associates, P.C.; Joseph P. Carrier; William D. Blackman

(57) ABSTRACT

An engine-driven work machine having a target engine speed selection unit and a control unit. The target engine speed selection unit selects and specifies an arbitrary target engine speed from among a plurality of target engine speeds that is set in stepwise fashion. The control unit electrically controls the opening and closing of a throttle valve so that the actual engine speed conforms to the specified target engine speed.

19 Claims, 59 Drawing Sheets

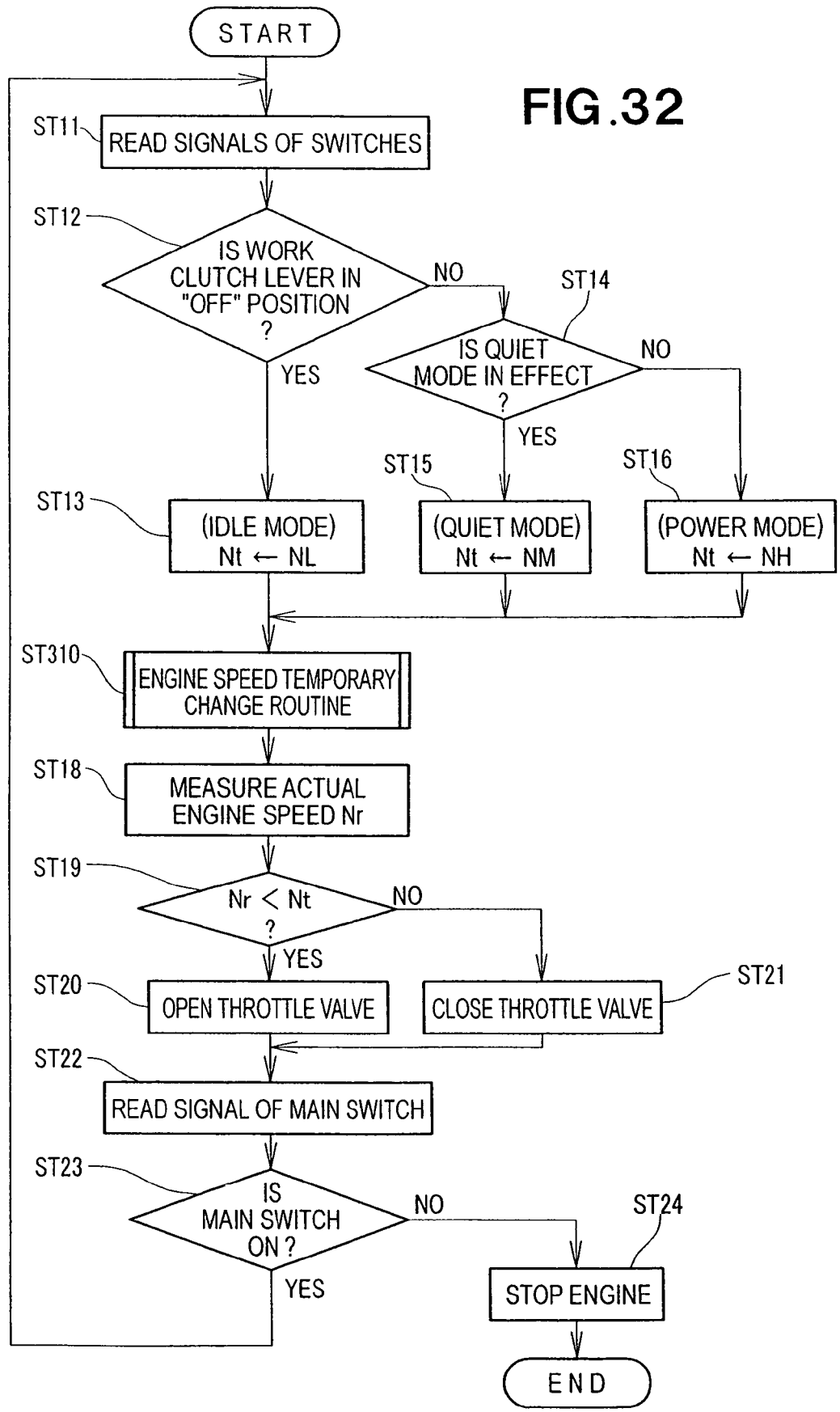

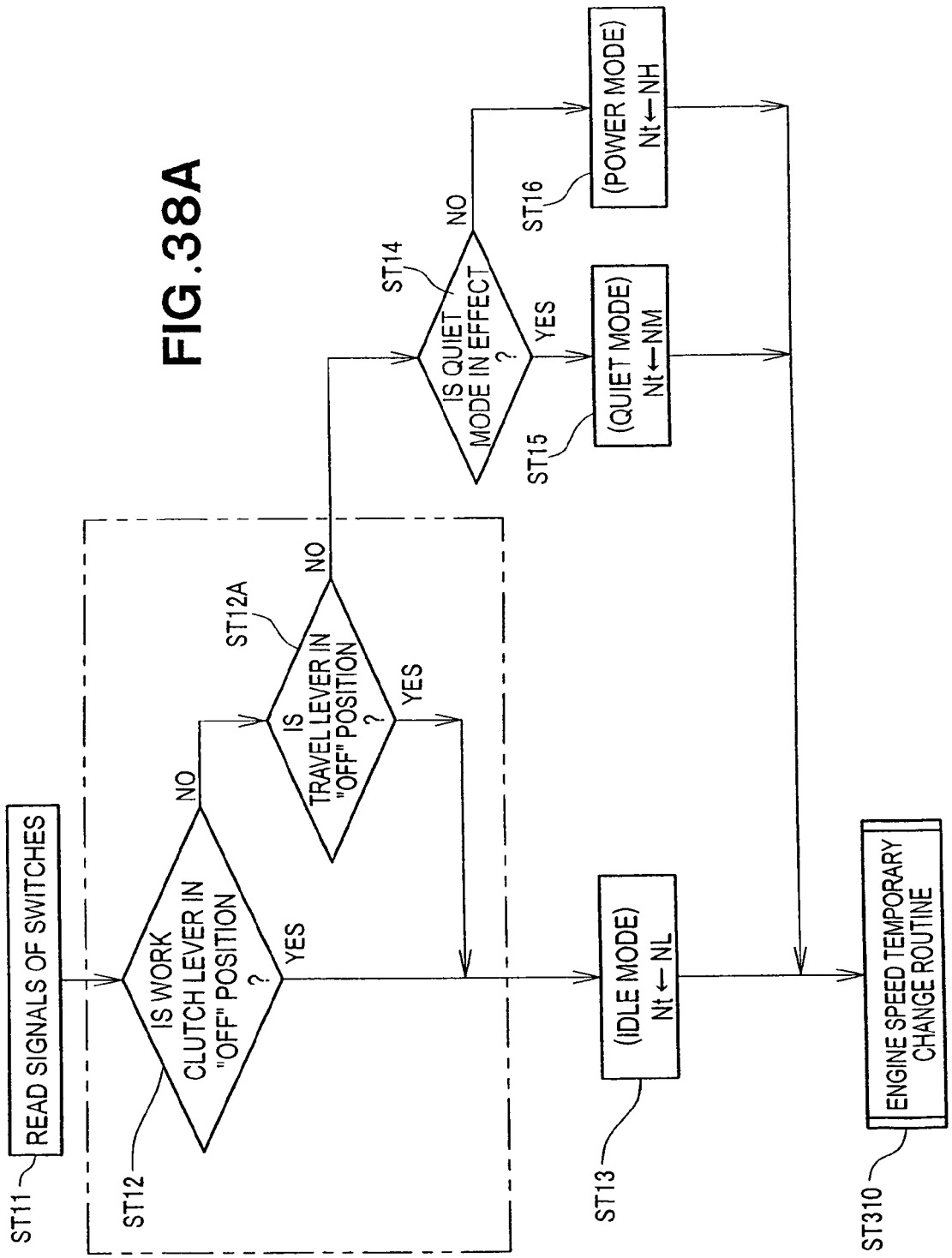

ENIGNE-DRIVEN WORK MACHINE

CROSS-REFERENCE TO RELATED APPLICATIONS

The present application claims priority under 35 USC 119 based on Japanese patent applications 2006-0172922, 2006-0172389, 2006-0172434, 2006-0172498, and 2006-0172612, each of which was respectively filed Jan. 26, 2006. The subject matter of each of these priority documents, including specification, claims, and drawings, is incorporated by reference herein.

FIELD OF THE INVENTION

The present invention relates to an engine-driven work machine that is driven by an engine and provided with various types of implements.

BACKGROUND OF THE INVENTION

Work machines provided with an engine-driven implement include, for example, a work machine in which the load applied to the implement increases according to work conditions, such as in a walk-behind lawnmower. A walk-behind lawnmower is a work machine that cuts grass using a cutter while under self-propulsion, and that is controlled by a walking operator. This type of walk-behind lawnmower is described in Japanese Patent Laid-Open Publication No. 9-301015 (JP 09-301015 A).

The walk-behind lawnmower disclosed in JP 09-301015 A cuts grass while under self-propulsion by using the output of an engine to rotate a drive wheel and a cutter used for cutting grass. An operator operates a running clutch lever and switches the running clutch lever between a disengaged state and an engaged state, whereby the drive wheel switches between a stopped state and a running state. At this time, the angle of a throttle valve in the engine is temporarily reduced in conjunction with the switching action of the running clutch lever. As a result, since the engine speed is temporarily reduced, travel by the walk-behind lawnmower is smoothly started and stopped in a low-speed state.

Examples of lawnmowers, mowing machines, and various other types of engine-driven work machines in which a throttle valve is automatically controlled by an electronic governor provided to the engine have recently been disclosed in Japanese Patent Laid-Open Publication Nos. 4-350333 (JP 04-350333 A) and 2005-98223 (JP 2005-098223 A).

In the lawnmower, mowing machine, or other engine-driven work machine disclosed in JP 04-350333 A, an electronic governor automatically controls the angle of a throttle valve according to the size of a load when the operator moves a throttle lever to perform work. The engine-driven work machine is also configured so that the throttle valve is automatically closed completely or partway when the operator removes his hand from the throttle lever and stops the work operation. As a result, the engine speed returns to an idling speed or a certain minimum speed.

The walk-behind lawnmower disclosed in JP 2005-098223 A is provided with an electronic governor, and cuts grass while under self-propulsion by using the output of an engine to rotate a drive wheel and a cutter used for cutting grass. The electronic governor controls the engine speed as described in (1) through (3) below by electrically controlling the opening and closing of the throttle valve.

(1) When the operator is performing neither the operation for traveling nor the operation for grass cutting, the electronic governor performs control so that the actual engine speed (actual RPM) is adjusted to an idling speed.

(2) When the operator is performing only the operation for traveling, the electronic governor performs control so as to gradually increase the actual engine speed. As a result, sudden movement of the walk-behind lawnmower is prevented.

(3) When the operator is performing the operation for grass cutting, the electronic governor performs control so that the actual engine speed is kept high after being increased without interruption to a target engine speed used during grass cutting, regardless of whether the operation for traveling is being performed.

The work conditions that are in effect during operation of the engine-driven work machines disclosed in JP 9-301015 A, JP 4-350333 A and JP 2005-98223 A are not necessarily constant. According to the work conditions, the load placed on the implement can vary significantly during work. The load placed on the engine can significantly vary as a result.

Since the electronic governor electrically controls the opening and closing of the throttle valve so that the actual engine speed conforms to the target engine speed, the angle of the throttle valve is increased according to the increase in load when the load on the engine increases.

However, when the load on the engine is at maximum, the actual engine speed begins to decrease with respect to the target engine speed even though the angle of the throttle valve has been increased. Since the rotation of the grass cutter decreases when the actual engine speed decreases, the efficiency of the grass cutting work decreases.

It is also possible for the operator to move the throttle lever to appropriately adjust the engine speed according to the engine load. The engine output is adequate even when the machine is operated in a state in which the engine speed is reduced when the load is small. When the load is large, the machine may be operated in a state in which the engine speed is increased to increase the engine output.

However, it is troublesome for the operator to move the throttle lever and adjust the engine speed to the proper value each time the load on the engine changes during work. When the engine speed is reduced to an excessive degree, the output of the engine becomes too low to handle the load. A certain level of experience is thus required to appropriately perform fine adjustment of the engine speed.

The engine may be maintained in a state of high-speed rotation so that the output of the engine can be kept high in order to obviate this troublesome adjustment operation that requires experience. However, when such a configuration is adopted, the engine speed remains high even when the load is small. As a result, the noise created by the engine during high-speed rotation continues, which is disadvantageous for improving the work environment. This configuration is also disadvantageous with regard to reducing fuel consumption by the engine.

There is therefore a need for a technique whereby the ease of operation and the working efficiency of an engine-driven work machine can be increased by enabling the operator to conveniently adjust the engine speed. There is also a need for a technique whereby the noise generated by an engine-driven work machine can be further reduced, and the working environment can be further improved.

SUMMARY OF THE INVENTION

According to an aspect of the present invention, there is provided an engine-driven work machine for driving an implement by an engine, which comprises a target engine speed selection unit for selecting and specifying an arbitrary target engine speed from among a plurality of target engine speeds that is set in stepwise fashion, and a control unit for electrically controlling an opening and closing of a throttle valve of the engine so as to cause an actual engine speed of the engine to conform to the target engine speed specified by the target engine speed selection unit.

An operator can therefore select a single arbitrary target engine speed from among a plurality of target engine speeds that is set in stepwise fashion, and specify the selected single target engine speed to the control unit from the target engine speed selection unit by operating the target engine speed selection unit. The control unit electrically controls the opening and closing of the throttle valve so that the actual engine speed (actual RPM) conforms to the specified target engine speed. For example, the control unit automatically controls the angle of the throttle valve via a control motor. Accordingly, the operator can shift to the target engine speed of the selected value with extreme convenience merely by operating the target engine speed selection unit. There is therefore no need for the operator to operate a throttle lever and to finely adjust the target engine speed.

For example, even when the load placed on the engine varies significantly due to significant variation of the load on the implement, the operator can easily adjust the engine speed according to the load on the engine. It is therefore possible to increase the ease of operation and the working efficiency of the engine-driven work machine.

When the load is small, engine noise can be reduced by operating the target engine speed selection unit to reduce the engine speed. As a result, the amount of noise generated by the engine-driven work machine can be further reduced, and the work environment can be further improved. By reducing the engine speed when the load is small, the fuel consumption of the engine can be reduced, and the amount of dust generated by the implement during operation can also be reduced.

Preferably, the plurality of target engine speeds comprises two target engine speeds that include a medium target engine speed at which the engine is substantially capable of generating a maximum torque, and a high target engine speed which is higher than the medium target engine speed and at which the engine is substantially capable of generating a maximum output.

Desirably, the work machine further comprises a clutch for disengaging and engaging an output that is transmitted from the engine to the implement, a work clutch operating unit for operating the clutch, and a work clutch operation detection sensor for detecting that the clutch has been placed in the engaging position by the work clutch operating unit.

In a desired form, the control unit executes control on the basis of the specified target engine speed only when the work clutch operation detection sensor detects that the clutch has been placed in the engaging position.

Preferably, the control unit increases the specified target engine speed in stepwise fashion with increased angle of the throttle valve.

Desirably, the control unit performs a stepwise reduction so as to reduce the specified target engine speed by a prescribed value each time the throttle angle is reduced by a prescribed reduction amount when the throttle angle is reduced, and the prescribed reduction value of the throttle angle and a prescribed increment by which the target engine speed is reduced in stepwise fashion are both preferably set to small step values.

In a preferred form, the control unit performs a stepwise increase so as to increase the specified target engine speed by a prescribed value each time the throttle angle is increased by a prescribed increase amount when the throttle angle is increased; and the prescribed increase value of the throttle angle and a prescribed increment by which the target engine speed is increased in stepwise fashion are both preferably set to large increment values.

The control unit may perform a stepwise increase according to an increase characteristic whereby the specified target engine speed is increased by a prescribed value each time the throttle angle is increased by a prescribed increase amount when the throttle angle is increased, and may perform a stepwise reduction according to a reduction characteristic whereby the specified target engine speed is reduced by a prescribed value each time the throttle angle is reduced by a prescribed reduction amount when the throttle angle is reduced. The increase characteristic and the reduction characteristic may preferably be hysteretic.

The work machine may further comprise a target engine speed change operation unit for issuing a temporary change command on the basis of a human operation, wherein the control unit temporarily changes the specified target engine speed to another target engine speed according to the change command only when a condition wherein the engine-driven work machine is operating is satisfied.

The work machine preferably further comprises a travel unit capable of self-propulsion, wherein the control unit determines that a condition wherein the engine-driven work machine is operating is satisfied when at least one condition is satisfied from the group consisting of a condition wherein work is being performed by an implement, and a condition wherein travel is being performed by the travel unit.

It is preferable that the specified target engine speed is a medium target engine speed at which the engine is capable of generating a maximum torque, and the other target engine speed is a high target engine speed which is higher than the medium target engine speed and at which the engine is capable of generating a maximum output.

The target engine speed change operation unit preferably continuously issues the change command only during the time in which human operation is continued, and the control unit preferably increases the specified target engine speed value according to a time during which the change command is issued, and uses the increased value as the other target engine speed.

The work machine may further comprise a machine body which has the travel unit and on which the engine is mounted, left and right handlebars that extend to the rear from the machine body, and a grip portion that extends between the rear ends of the left and right handlebars. The grip portion may comprise left and right grip leg portions that extend upward from rear ends of the left and right handlebars, and a grip bar that extends between upper ends of the left and right grip leg portions. The target engine speed selection unit is preferably provided to a rear end portion of a handlebar selected from the left and right handlebars.

The work machine may further comprise a target engine speed change operation unit for temporarily changing the specified target engine speed, which has an operating member for manual operation. The operating member may be provided at a position which is close to the target engine speed selection unit and permits its operation by a hand gripping a handlebar selected from the left and right handlebars.

The work machine may further comprise a lever which is used for operating an element selected from the implement and the travel unit and positioned to be generally parallel to a rear surface of the grip portion. The lever may comprise: left and right lever leg portions that are generally parallel to the left and right grip leg portions, respectively; and a horizontal bar that extends between upper ends of the left and right lever leg portions and is generally parallel to the grip bar. An interval between the left and right lever leg portions is set to be smaller than an interval between the left and right grip leg portions, whereby an operating space is provided between the grip leg and the lever leg portion on one of the left side and the right side. The operating member may be disposed in the operating space.

The operating member preferably comprises an operating lever that extends further to the rear than the grip portion.

The work machine preferably further comprises a machine body which has the travel unit and on which the engine is mounted; a handle that extends to the rear from the machine body, a shift lever provided to the handle and used to adjust the travel speed of the travel unit; and a linkage mechanism for linking the shift lever to the operation of the target engine speed selection unit.

The linkage mechanism also preferably switches the shift lever to a speed reduction side when the target engine speed selection unit is moved from a low-speed target engine speed to a high-speed target engine speed among the plurality of target engine speeds.

The target engine speed selection unit preferably comprises a switching lever provided to the handle, and a switch that can be operated by the switching lever. The linkage mechanism preferably comprises an engaging portion provided to the switching lever, and an engagement-receiving portion provided to the shift lever. The engaging portion preferably engages with the engagement-receiving portion in conjunction with movement of the switching lever, whereby the shift lever is moved in conjunction with the switching lever.

The switching lever preferably comprises a grip, which is disposed in the vicinity of a grip portion of the handle.

BRIEF DESCRIPTION OF THE DRAWINGS

Certain preferred embodiments of the present invention will be described in detail below, by way of example only, with reference to the accompanying drawings, in which:

FIG. 32 is a flowchart of the control performed by the control unit shown in FIG. 23;

FIGS. 38A through 38C are flowcharts of the control performed by the control unit of FIG. 37;

DETAILED DESCRIPTION OF ILLUSTRATIVE EMBODIMENTS

A first embodiment will now be described, based on FIGS. 1 through 11C, and using a walk-behind lawnmower as an example of an engine-driven work machine according to the present invention.

Figure 1:
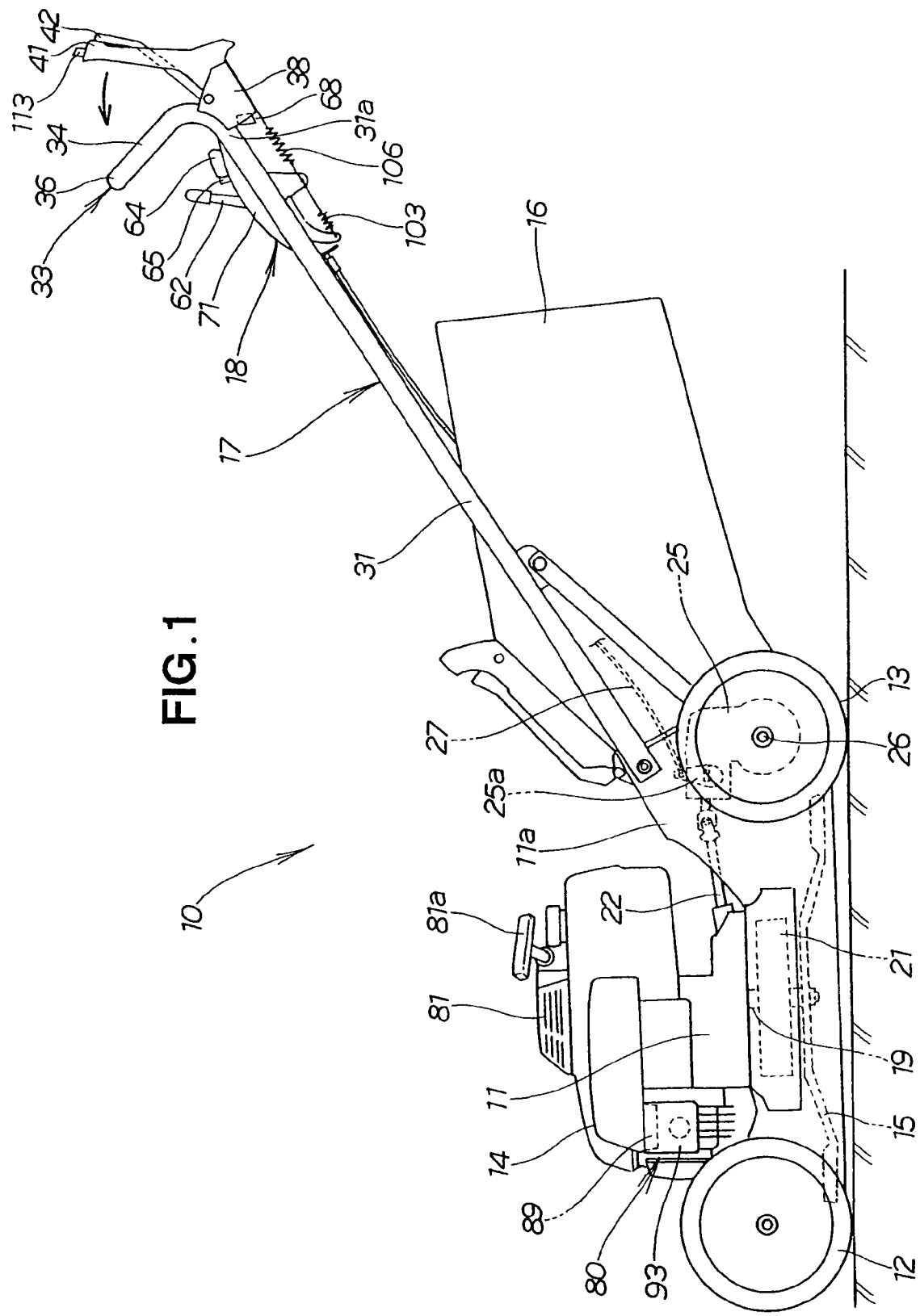
FIG. 1 is a left side elevational view of an engine-driven work machine according to a first embodiment of the present invention.

FIG. 1 shows the structure of the walk-behind lawnmower 10 of the first embodiment as viewed from the left side. The walk-behind lawnmower 10 of the first embodiment is a type of engine-driven work machine that is steered by a walking operator using a handle 17, and is (is self-propelled) by the output of an engine 14. The walk-behind lawnmower 10 is composed of a housing 11 whose lower surface is open, left and right front wheels 12, left and right rear wheels 13, an engine 14, a cutter 15, a handle 17, an operating unit 18, a work brake/clutch unit 21, and a travel shifting device 25.

The housing 11 is provided with the left and right front wheels 12, the left and right rear wheels (drive wheels) 13, the engine 14, and other main components, and therefore also functions as the machine body (frame) of the walk-behind lawnmower 10. The housing 11 will be referred to hereinafter as the "machine body 11 (or frame 11)" as appropriate. The cut grass discharge port 11a of the housing 11 has a grass collecting bag 16. The grass collecting bag 16 is a receptacle for accommodating the grass cut by the cutter 15.

The rear wheels 13 are travel units that travel (provide self-propulsion) according to the output of the engine 14. The rear wheels 13 will be referred to hereinafter as "travel units 13" as appropriate.

The engine 14 is mounted on the upper portion of the housing 11, and is a power source having an output shaft 19 that extends downward from the lower end portion of the engine 14.

The cutter 15 (cutting blade 15) is an implement for performing the work of grass cutting that is disposed inside the housing 11 and attached to the lower end portion of the output shaft 19 via the work brake/clutch unit 21. The cutter 15 will be referred to hereinafter as the "implement 15" as appropriate.

Figure 2:
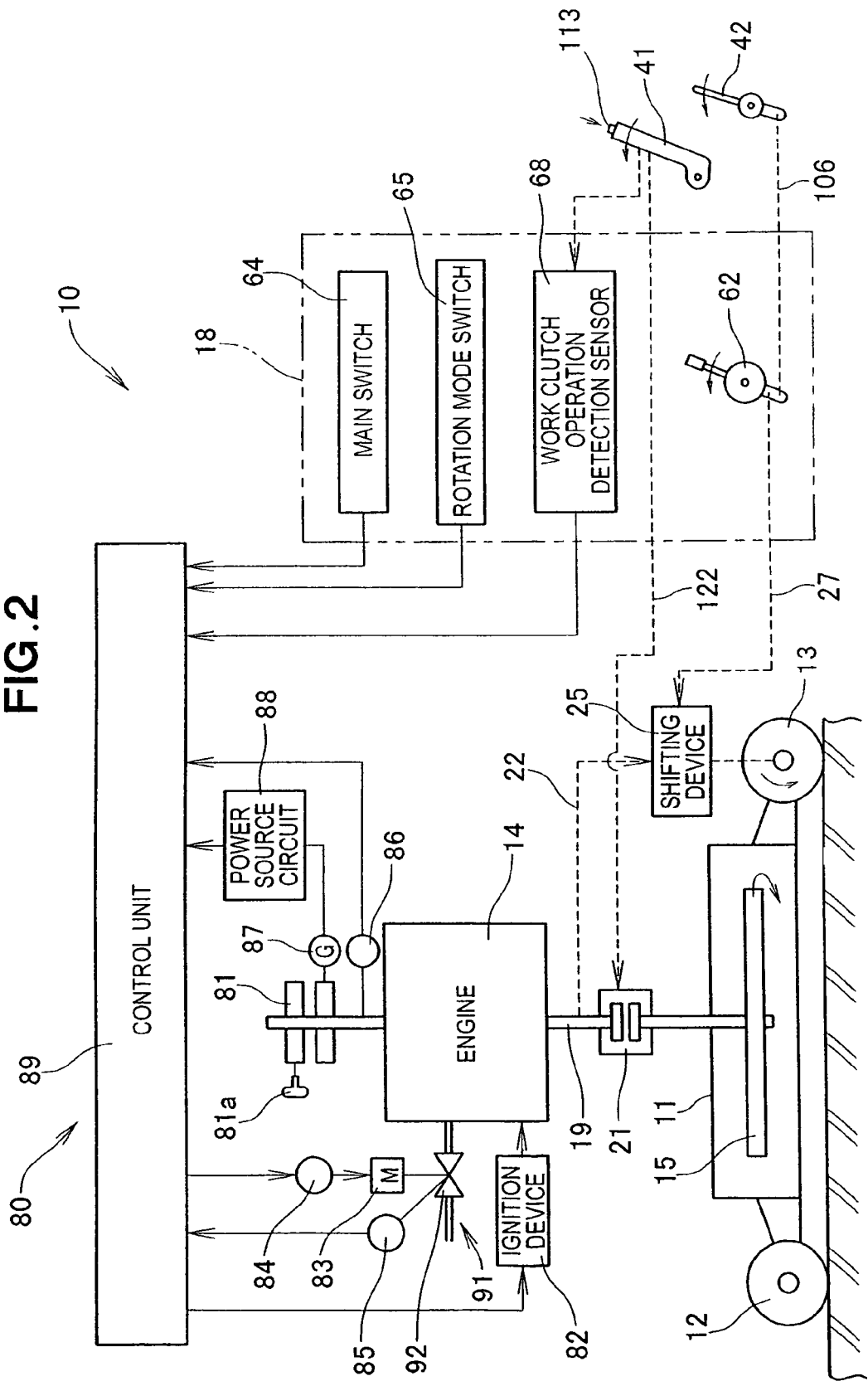
FIG. 2 is a schematic system diagram of the engine-driven work machine of FIG. 1.

As shown in FIGS. 1 and 2, the work brake/clutch unit 21 has a compound structure in which a "clutch portion" and a "brake portion" are combined. The clutch portion disengages and engages the output transmitted to the cutter 15 from the engine 14. The brake portion restricts movement of the cutter 15 when the clutch portion is in the disengaged state (clutch off; transmission of the output is disengaged). The work brake/clutch unit 21 has a publicly known structure. The work brake/clutch unit 21 will be referred to hereinafter as the "clutch 21" as appropriate.

As shown in FIGS. 1 and 2, the travel shifting device 25 (hereinafter referred to simply as the "shifting device 25") has a shifting arm 25a for shifting operation, an input shaft is connected to the output shaft 19 of the engine 14 via a transmission mechanism 22, and the output shaft is connected to the left and right rear wheels 13 via an axle 26. A shift lever 62 is connected to the shifting arm 25a via a shifting cable 27.

The shifting device 25 is composed of a hydraulic static transmission device, for example. The hydraulic static transmission device has a publicly known structure in which a transmission swash plate (not shown) is housed in a casing, and the shifting arm 25a is connected to the transmission swash plate.

Specifically, the shifting device 25 steplessly shifts the rotational speed of the rear wheels 13 from zero (stopped) to a high rotational speed. The shifting device 25 thus has a so-called clutch function for disengaging and engaging (i.e., stopping the rear wheels 13 by disengaging transmission, and causing the rear wheels 13 to rotate by engaging the transmission) the output transmitted from the engine 14 to the rear wheels 13.

The operating unit 18 will next be described. As shown in FIGS. 1 and 2, the operating unit 18 has a shift lever 62, a main switch 64, a rotation mode switch 65, and a work clutch operation detection sensor 68.

The shift lever 62 is used for shifting the shifting device 25, and is configured so as to be connected to a travel lever 42 via a second tension spring 106 and joined to the shifting device 25 via a shifting cable 27. When the travel lever 42 is operated, the shifting device 25 causes the rear wheels 13 to rotate at a speed that corresponds to the shifting position of the shift lever 62. When the travel lever 42 is then returned to the original position, the output rotation of the shifting device 25 becomes zero, and the rear wheels 13 are stopped.

The main switch 64 is a manually operated main power source switch for turning the power system of the engine 14 on and off, and is composed of a rotary switch, for example. Moving the main switch 64 from the "off" position to the "on" position enables startup of the engine 14 (allows the engine 14 to start). The engine 14 can be stopped by returning the main switch 64 from the "on" position to the "off" position.

The rotation mode switch 65 is a target engine speed switching unit (target engine speed selection unit) for specifying a single, arbitrarily selected target engine speed value from among a plurality of target engine speeds for the engine 14 that are set in advance as staged values. More specifically, the rotation mode switch 65 switches the control mode of the engine 14 between the "quiet mode" and the "power mode" described hereinafter, and is composed of a seesaw switch (also referred to as a "tumbler switch," or a "rocker switch"), for example.

The work clutch operation detection sensor 68 detects the engagement operation of the clutch 21 through the use of a work clutch lever 41 (i.e., a work clutch operating unit 41). When the work clutch lever 41 is operated, and the clutch 21 is engaged (clutch on) via a clutch cable 122, the work clutch operation detection sensor 68 detects that engagement has taken place and issues a detection signal.

The system of the engine 14 will next be described. As shown in FIG. 2, the engine 14 is provided with a recoil starter 81, an ignition device 82, a throttle valve control motor 83, a motor driver 84, a throttle angle sensor 85, an engine rotation sensor 86, a generator 87, a power source circuit 88, and a control unit 89. The engine 14 is not provided with a battery.

The recoil starter 81 is a device whereby the operator manually starts the engine 14, and the recoil starter 81 is provided, for example, to the distal end of a flywheel of the engine 14. The ignition device 82 is composed of an ignition coil and an ignition plug (not shown).

The throttle valve control motor 83 (hereinafter referred to simply as the "control motor 83") is composed of a stepping motor, for example, and is an actuator for driving the opening and closing of a throttle valve 92 provided to the engine air intake system 91. The motor driver 84 electrically drives the control motor 83 and places the motor in an "on" or "off" state on the basis of the control signal of the control unit 89.

The throttle angle sensor 85 detects the angle of the throttle valve 92 and issues a detection signal to the control unit 89. The engine rotation sensor 86 detects the speed (RPM) of the engine 14 and issues a detection signal to the control unit 89.

The generator 87 is provided to a flywheel, for example, and is an alternator that uses a portion of the output of the engine 14 to generate AC power. The power source circuit 88 rectifies and converts the AC power generated by the generator 87 to DC power, and supplies the DC power to the ignition device 82, the control unit 89, and other electrical components.

The control unit 89 is composed of a microcomputer, for example, and is an electronic control unit for receiving the signals of the main switch 64, the rotation mode switch 65, the work clutch operation detection sensor 68, the throttle angle sensor 85, and the engine rotation sensor 86, and controlling the engine 14 according to a prescribed control mode. In other words, the control unit 89 controls the ignition device 82, and also controls the angle of the throttle valve 92 via the control motor 83 according to a prescribed control mode on the basis of data relating to the detected speed of the engine 14 and the angle of the throttle valve 92. The control unit 89 thereby performs electrical control to cause the speed of the engine 14 to conform to a target engine speed.

As is apparent from the above description, a characteristic feature of the engine 14 is that an electronic governor 80 (also referred to as an electric governor or an electronic speed regulator) is mounted thereon. The electronic governor 80 controls the speed of the engine 14 by automatically adjusting the angle of the throttle valve 92 using the control motor 83 on the basis of the control signal of the control unit 89, and is composed of a structure formed by a combination of the control motor 83, the motor driver 84, the throttle angle sensor 85, the engine rotation sensor 86, the control unit 89, and the throttle valve 92.

The control modes whereby the control unit 89 controls the speed of the engine 14 are broadly classified into three rotation control modes. These rotation control modes are defined as described below.

The first rotation control mode is an "idle mode" for controlling the engine speed so as to obtain the engine speed of an idling state. The second rotation control mode is a "quiet mode" for controlling the engine speed so as to obtain the engine speed at which the torque generated by the engine 14 is substantially maximized (including an approximate maximum). The third rotation control mode is a "power mode" for controlling the engine speed so as to obtain the engine speed at which the output generated by the engine 14 is substantially maximized (including an approximate maximum).

Figure 3:
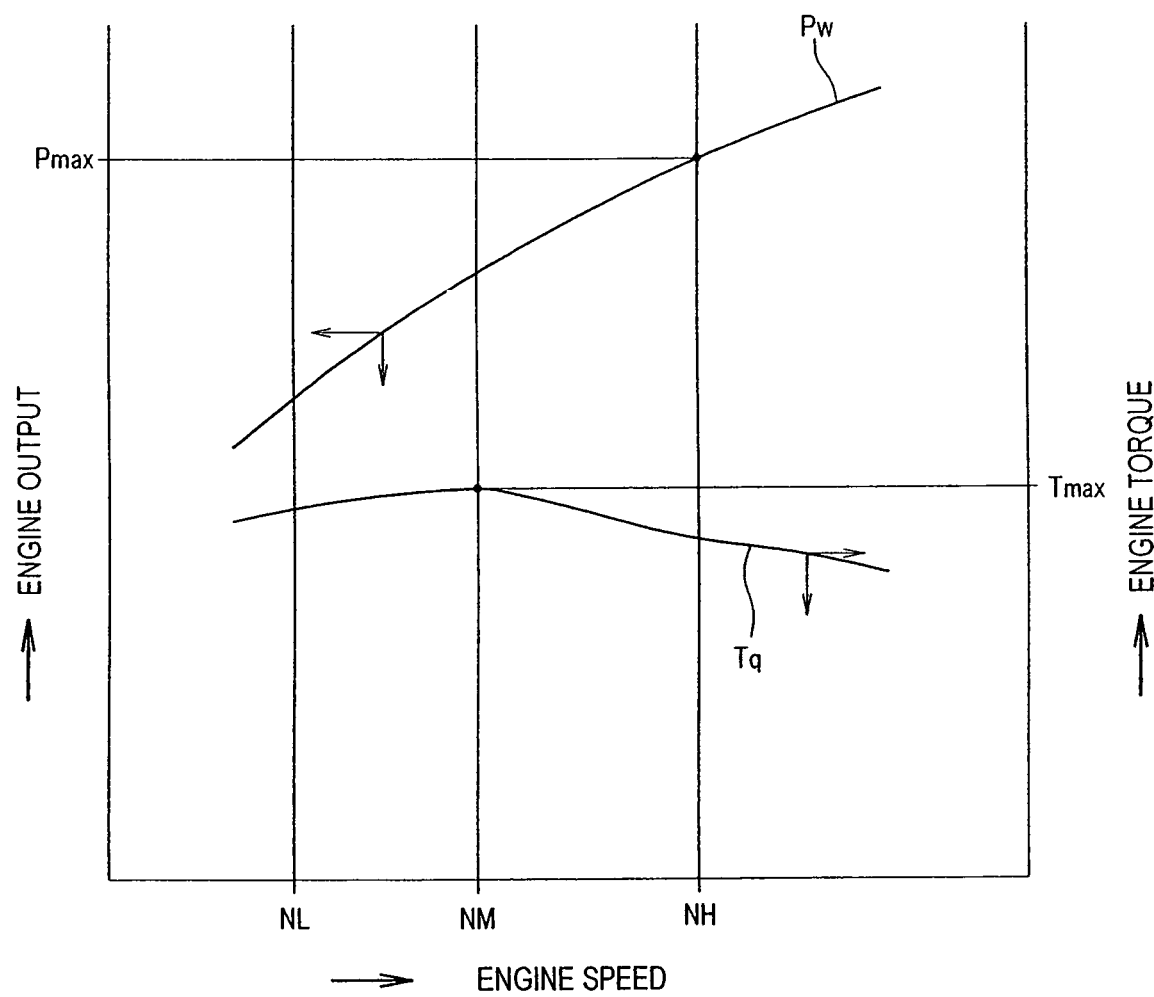
FIG. 3 is a characteristic diagram of the engine of FIG. 2.

The characteristics of the engine 14 will next be described. FIG. 3 is an engine characteristic diagram showing the output characteristics and torque characteristics with respect to the engine speed, wherein the horizontal axis indicates the engine speed, the left vertical axis indicates the output (power) of the engine, and the right vertical axis indicates the torque outputted by the engine.

The curve Pw is an output characteristic curve that indicates the characteristics of the output with respect to the speed of the engine 14 (see FIG. 2). The curve Tq is a torque characteristic curve that indicates the characteristics of the torque with respect to the speed of the engine 14.

It is apparent from the output characteristic curve Pw that the output of the engine 14 increases as the speed of the engine 14 is increased. It is also apparent from the torque characteristic curve Tq that the maximum torque Tmax is generated at an engine speed NM that is lower than the engine speed NH at which the maximum output Pmax can be generated. In other words, the torque characteristic curve Tq is a substantially mountain-shaped curve in which the maximum torque Tmax occurs at the engine speed NM.

The characteristics of this type of engine 14 are the same as the characteristics of a typical engine.

In the present invention, the engine speed NL of the engine during the idling state of the engine 14 will be referred to hereinafter as the "low target engine speed NL."

The engine speed NM at which the engine 14 can substantially generate the maximum torque Tmax, i.e., the engine speed NM of the engine 14 when the torque generated by the engine 14 is the maximum Tmax or approximately maximum, will be referred to as the "medium target engine speed NM."

The engine speed NH at which the engine 14 can substantially generate the maximum output Pmax, i.e., the engine speed NH of the engine 14 when the output generated by the engine 14 is the maximum Pmax or approximately maximum, will be referred to as the "high target engine speed NH."

The engine speeds NL, NM, and NH are related in size according to the relation NL<NM<NH.

The detailed structure of the handle 17 and the operating unit 18 shown in FIG. 1 will next be described based on FIGS. 4 through 7. To facilitate understanding of the description, FIGS. 4 through 7 show the handle 17 and operating unit 18 of FIG. 1 from the right side thereof (back side in FIG. 1).

Figure 4:
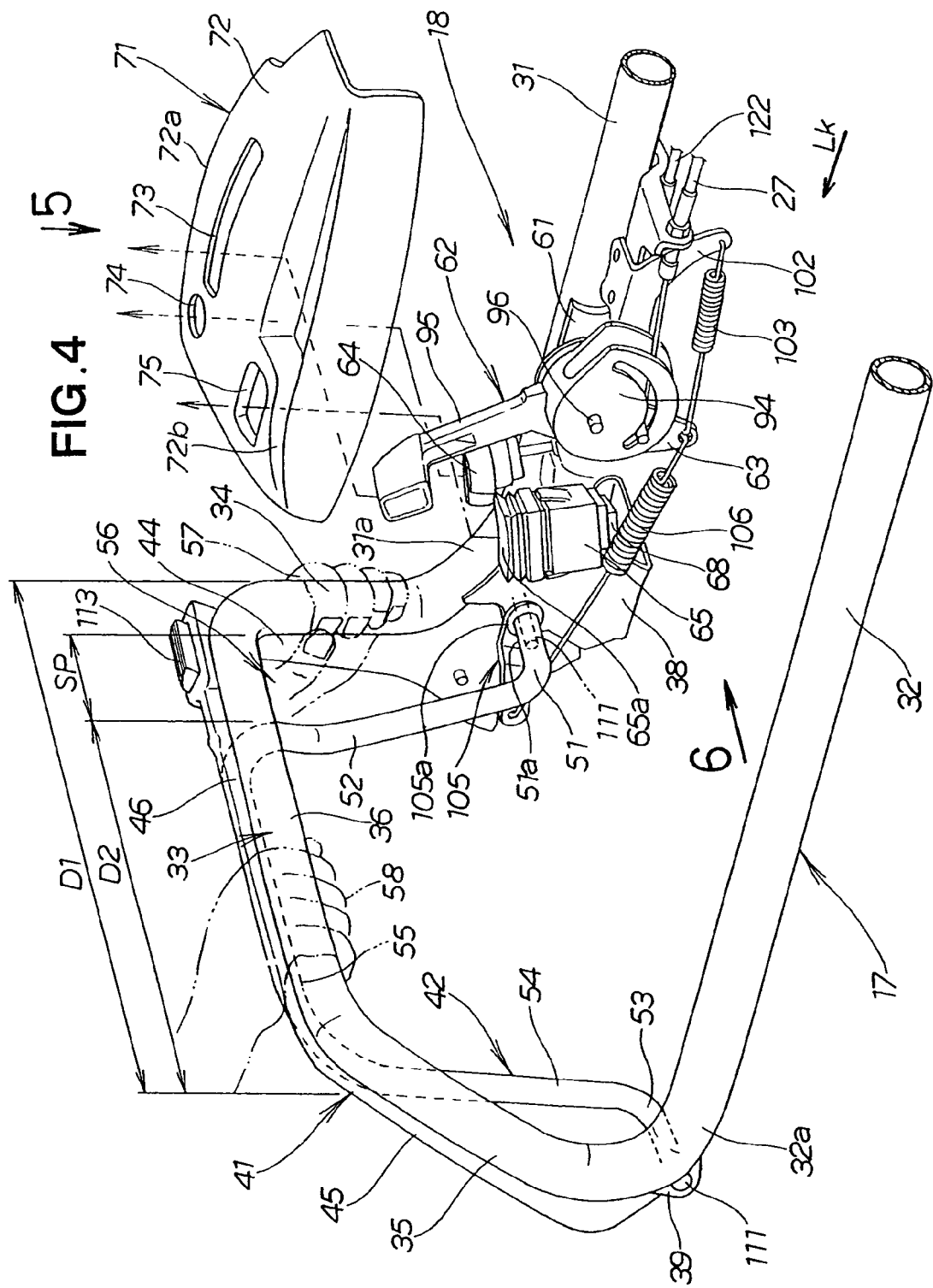
FIG. 4 is a perspective view of the area surrounding the rear portion of the handle of FIG. 1, as seen from the upper right.

As shown in FIG. 4, the handle 17 is composed of left and right handlebars 31, 32 that extend upward and to the rear from the housing 11 (see FIG. 1), and a grip portion 33 that extends between the rear ends of the left and right handlebars 31, 32.

The grip portion 33 is composed of left and right grip leg portions 34, 35 that extend upward and to the front from rear ends of the left and right handlebars 31, 32, and a horizontal grip bar 36 that extends between upper ends of the left and right grip leg portions 34, 35. When the grip portion 33 is viewed from the front side (direction of the arrow Lk in FIG. 4) of the walk-behind lawnmower 10, the overall shape of the grip portion 33 is that of a substantially upside-down "U."

In the left handlebar 31, the operating unit 18 and a cover 71 are provided to the rear end portion 31a. As shown in FIG. 1, the electronic governor 80 is provided integrally with a carburetor 93 to the left side of the engine 14. It is therefore possible to minimize the length of wiring needed to connect from the electronic governor 80 on the left side to the switches of the operating unit 18 on the left side.

Furthermore, in the left handlebar 31, a left mounting bracket 38 is provided to the rear end portion 31a, and a shift lever mounting bracket 61 is provided further forward than the left mounting bracket 38. In the right handlebar 32, a right mounting bracket 39 is provided to the rear end portion 32a.

Figure 6:
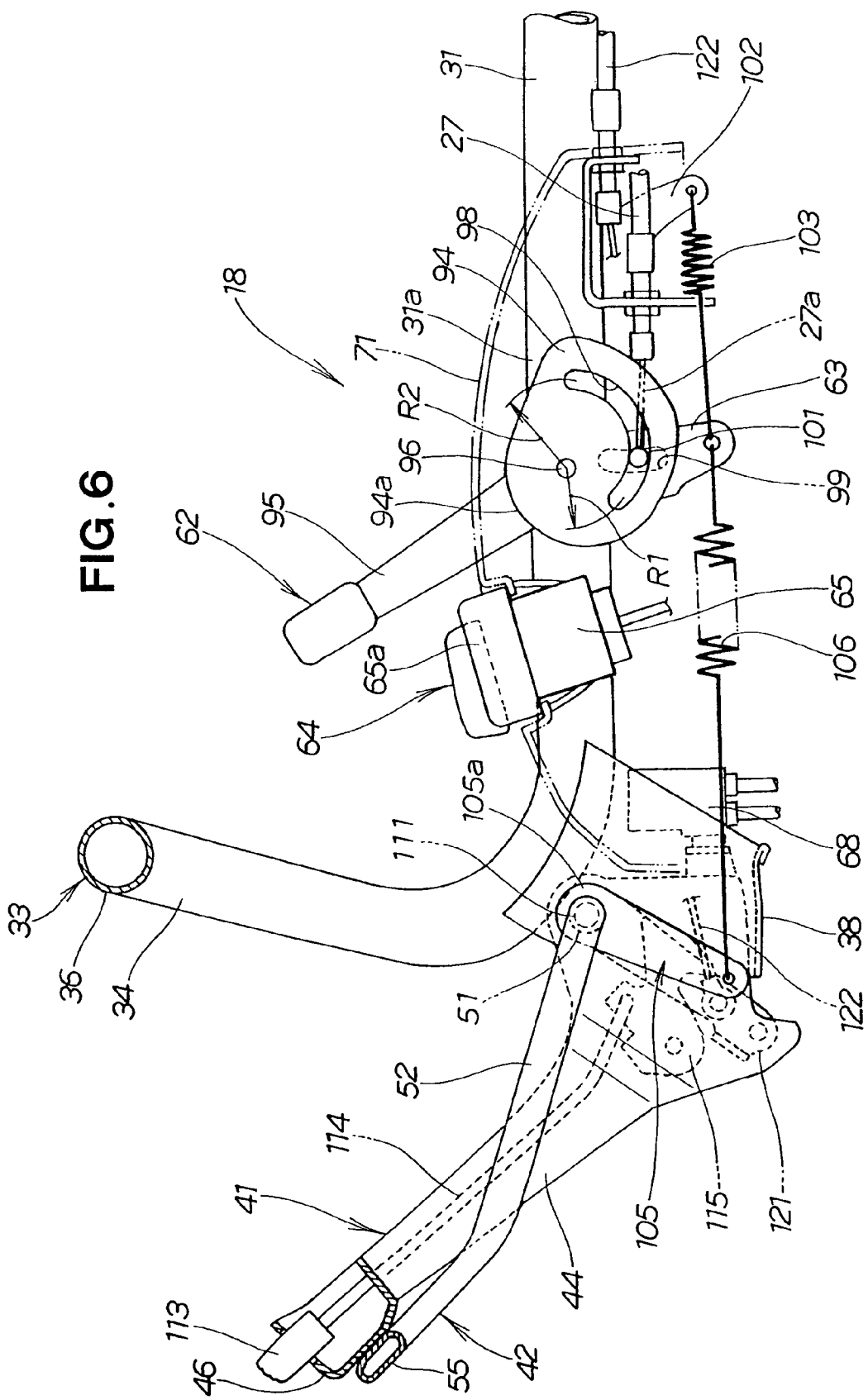
FIG. 6 is a view of the area surrounding the left rear portion of the handle of FIG. 4, as seen from the direction of arrow 6.
Figure 7:
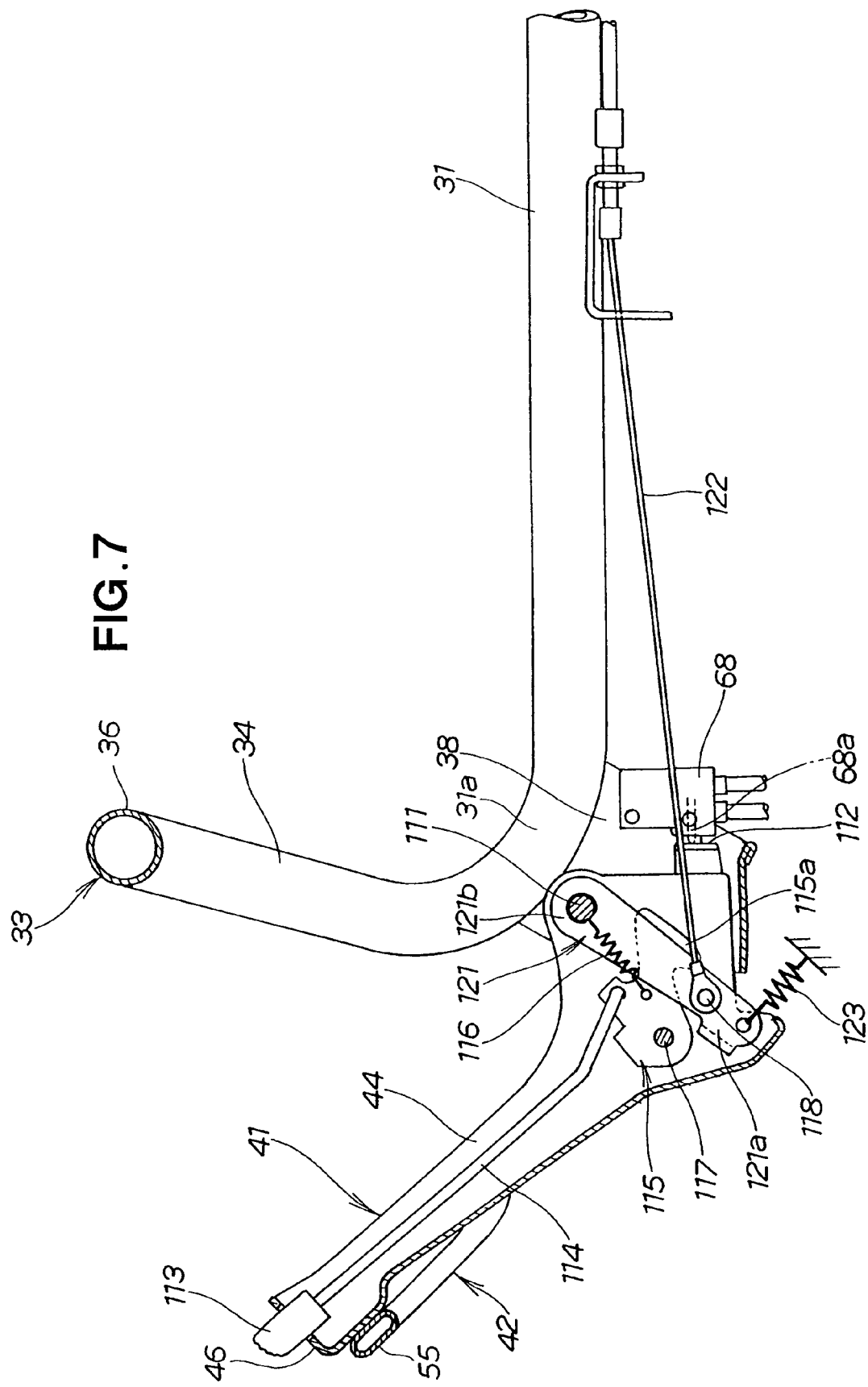
FIG. 7 is a side view showing the relationship between the handle of FIG. 6 and the work clutch lever and work clutch operation detection sensor.

As shown in FIGS. 4, 6, and 7, the work clutch lever 41 and the travel lever 42 are attached to the left and right mounting brackets 38, 39 via left and right support pins 111, 111 so as to be able to swing forward and backward. The work clutch lever 41 and the travel lever 42 are capable of swinging independently of each other about the left and right support pins 111, 111. The work clutch lever 41 and the travel lever 42 are auto-returning operating members that can be swung forward and held against the grip portion 33 by hands 57, 58 (see FIG. 4), and that automatically return to the original position when released by the operating hands 57, 58.

The work clutch lever 41 and the travel lever 42 will be described in detail hereinafter.

As shown in FIGS. 4 through 7, the work clutch lever 41 is an operating member that is shaped in approximate conformity with the rear surface of the grip portion 33, and is composed of narrow, vertically elongated left and right lever leg portions 44, 45, and a horizontal bar 46 that extends between the upper end portions of the left and right lever leg portions 44, 45.

The lower end portions of the left and right lever leg portions 44, 45 are attached to the rear end portions 31a, 32a so as to be able to swing forward and backward via the support pins 111, 111. As shown in FIG. 4, a configuration is adopted whereby the shape of the left lever leg portion 44 approximately conforms to the rear surface of the left grip leg portion 34, the shape of the right lever leg portion 45 approximately conforms to the rear surface of the right grip leg portion 35, and the shape of the horizontal bar 46 approximately conforms to the rear surface of the grip bar 36 when the work clutch lever 41 is swung forward.

The work clutch lever 41 and the work clutch operation detection sensor 68 are related to each other in the following manner. As shown in FIG. 7, the lower end portion of the left lever leg portion 44 in the work clutch lever 41 has a protruding portion 112 that protrudes forward from a position that is lower than the support pin 111.

The work clutch operation detection sensor 68 is disposed in a position that faces the protruding portion 112, and is attached to the left mounting bracket 38. The work clutch operation detection sensor 68 is composed, for example, of a limit switch that is provided with a pushrod 68a. The pushrod 68a is oriented towards the rear so as to face the protruding portion 112. The contact of the limit switch is in the "on" state when the pushrod 68a is in a released state, and the contact switches to the "off" state when the pushrod 68a is pushed in by the protruding portion 112.

The work clutch lever 41 is retained in the "clutch-off" position shown in FIG. 7 by the spring force of a return spring (not shown). When the work clutch lever 41 is in the "clutch-off" position, the pushrod 68a is pushed in by a pressing plate 112. The work clutch operation detection sensor 68 is therefore in the "off" state.

The relationship in which work clutch lever 41 and the clutch 21 (see FIG. 2) are linked is as follows. As shown in FIG. 7, the clutch 21 is configured so as to be placed in the "on" state via the clutch cable 122 only when the operator swings the work clutch lever 41 forward while pressing a push button 113.

Specifically, the left lever leg portion 44 in the work clutch lever 41 is provided with the push button 113, an operating rod 114, a retaining arm 115, a first tension spring 116, a support pin 117, a linking pin 118, a clutch operating arm 121, the clutch cable 122, and a second tension spring 123.

The push button 113 is attached to the upper end of the left lever leg portion 44 and can be pressed downward.

The retaining arm 115 has a locking tab 115a, and is a member that is pushed via the operating rod 114 when the push button 113 is pressed, and that swings in the clockwise direction of FIG. 7. The retaining arm 115 is attached so as to be able to swing vertically to the lower end portion of the left lever leg portion 44 via the support pin 117. The retaining arm 115 is retained in the middle position shown in FIG. 7 by the first tension spring 116.

The proximal end portion 121b of the clutch operating arm 121 is attached via the support pin 111 to the left mounting bracket 38 so that the clutch operating arm 121 can swing forward and backward, and the clutch operating arm 121 is retained in the middle position shown in FIG. 7 by the second tension spring 123. The clutch operating arm 121 has the linking pin 118 at the distal end portion 121a thereof. When the retaining arm 115 is swung in the clockwise direction of FIG. 7 about the support pin 117, the locking tab 115a is retained on the linking pin 118.

The rear end portion of the clutch cable 122 is connected to the distal end portion 121a of the clutch arm 121 via the linking pin 118. The front end portion of the clutch cable 122 is connected to the lever of the clutch 21 (see FIG. 1).

Figure 5:
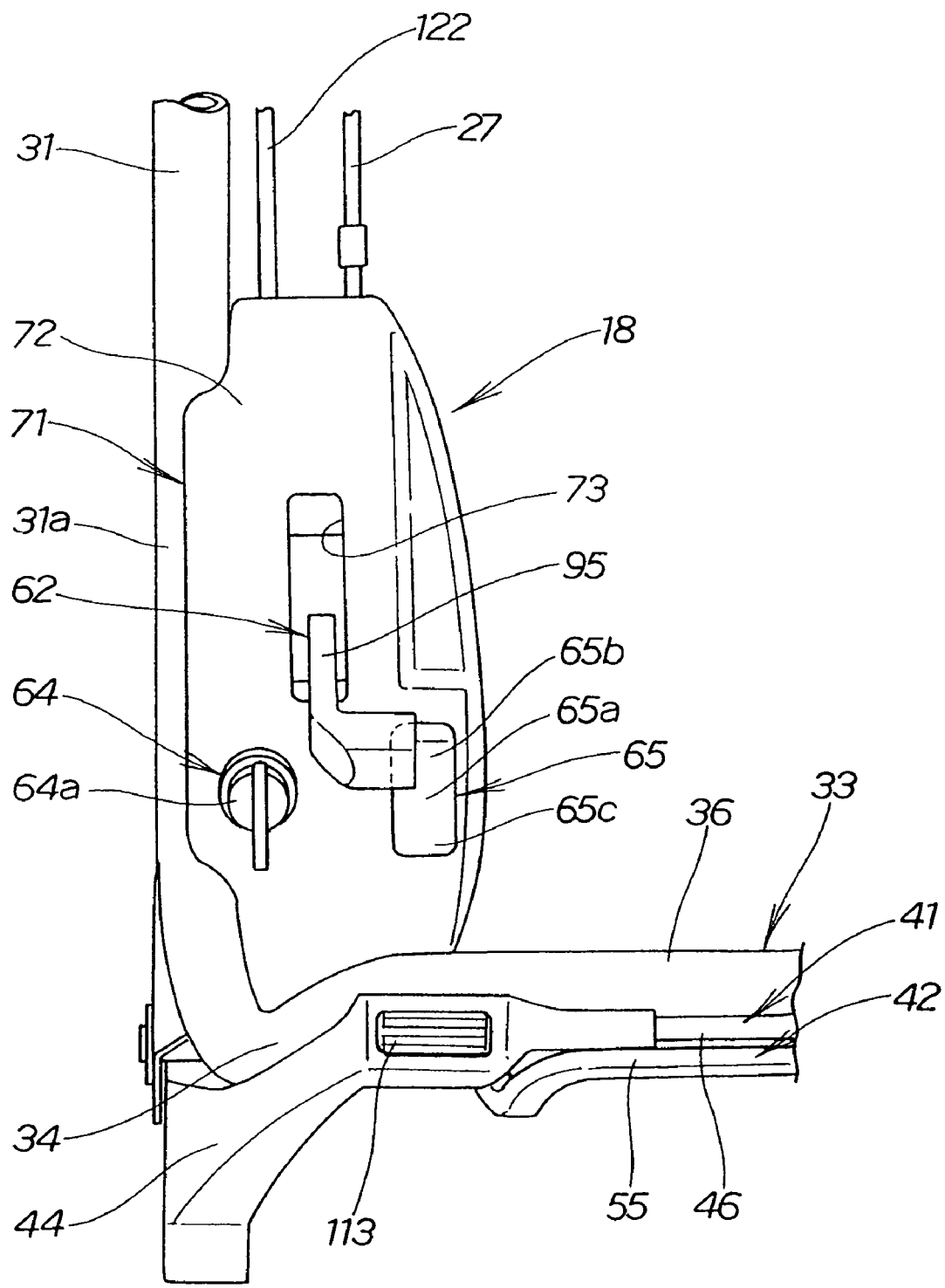
FIG. 5 is a view of the area surrounding the left rear portion of the handle shown of FIG. 4, as seen from the direction of arrow 5.

As shown in FIGS. 4 through 6, the travel lever 42 is an operating member whose shape approximately conforms to the rear surface of the work clutch lever 41. The travel lever 42 is composed of narrow left and right lever leg portions 52, 54 that are vertically elongated, a horizontal bar 55 that extends between the upper end portions of the left and right lever leg portions 52, 54, a left horizontal rod 51 that extends to the left from the lower end of the left lever leg portion 52, and a right horizontal rod 53 that extends to the right from the lower end of the right lever leg portion 54. The left and right horizontal bars 51, 53 are attached via the support pins 111, 111 to the rear end portions 31a, 32a so as to be able to swing forward and backward.

As shown in FIG. 4, a configuration is adopted whereby the shape of the left lever leg portion 52 approximately conforms to the rear surface of the left grip leg portion 34, the shape of the right lever leg portion 54 approximately conforms to the rear surface of the right grip leg portion 35, and the shape of the horizontal bar 55 approximately conforms to the rear surface of the grip bar 36 when the travel lever 42 is swung forward.

The interval D2 between the lever leg portions 52, 54 is set so as to be smaller than the interval D1 between the left and right grip leg portions 34, 35. The left lever leg portion 52 is set in a position that is separated by a gap SP towards the center in the width direction of the machine body (further to the inside than the left lever leg portion 44) with respect to the position of the left lever leg portion 44. Therefore, when the work clutch lever 41 and the travel lever 42 are superposed on the grip portion 33, an operating space 56 equal to the interval SP is provided between the grip leg portion 34 and lever leg portion 52 on the left side.

When the travel lever 42 is swung forward, the horizontal bar 55 is superposed on the rear surface of the horizontal bar 46. The operator can grasp both the left grip leg portion 34 and the left lever leg portion 44 of the work clutch lever 41 in his left hand 57 in the operating space 56. The operator can also grasp the grip bar 36, the horizontal bar 46 of the work clutch lever 41, and the horizontal bar 55 of the travel lever 42 together in his right hand 58.

The relationship in which the travel lever 42, the shift lever 62, and the shifting device 25 (see FIG. 2) are connected is as follows.

As shown in FIGS. 4 and 6, the shift lever 62 is composed of a nearly disk-shaped disk portion (disk) 94, and an operating lever portion 95 that extends upward from the upper end portion 94a of the disk portion 94. When the disk portion 94 is viewed from the front surface (direction of the arrow Lk in FIG. 4) thereof, the disk portion 94 is formed in a forked shape (bifurcate shape), and a shift lever arm 63 is disposed in the space between the forks.

The disk portion 94 and the shift lever arm 63 are both attached to the shift lever mounting bracket 61 of the left handlebar 31 via a support pin 96 so as to be able to swing forward and backward. The shift lever arm 63 is a narrow elongated member that extends further downward than the position of the support pin 96. The disk portion 94 and the shift lever arm 63 can swing forward and backward relative to each other.

As shown in FIG. 6, the disk portion 94 has a narrow elongated first guide hole 98 having a shape that curves about the support pin 96. The radius of the first guide hole 98 is set so as to gradually increase from the rear end portion to the front end portion. In other words, the radius R2 of the front end portion of the first guide hole 98 is larger than the radius R1 of the rear end portion of the first guide hole 98 (R1<R2).

The shift lever arm 63 has a second guide hole 99 that is narrow and elongated downward substantially orthogonal to the first guide hole 98.

The inner cable 27a of the shifting cable 27 has a connecting pin 101 at the rear end thereof. The connecting pin 101 is fitted into both the first guide hole 98 and the second guide hole 99. The front end portion in the inner cable 27a of the shifting cable 27 is connected to the shifting arm 25a of the shifting device 25.

As shown in FIGS. 4 and 6, the left handlebar 31 is provided with a support arm 102. The support arm 102 is disposed in a position that is further forward than the shift lever arm 63. The horizontal rod 51 in the travel lever 42 is provided with a travel arm 105. The travel arm 105 is disposed in a position that is further to the rear than the shift lever arm 63, and can swing forward and backward along with the travel lever 42 about the support pin 111.

A first tension spring 103 (return spring) is provided between the support arm 102 and the distal end portion of the shift lever arm 63. The distal end portion of the shift lever arm 63 is also connected to the travel arm 105 via a second tension spring 106.

The relationship of the positions of the operating members 62, 64, and 65 in the operating unit 18 is as follows. As shown in FIGS. 4 and 5, the main switch 64 is disposed in the vicinity of the left grip leg portion 34 and in the vicinity of the rear end portion 31a in the left handlebar 31. The rotation mode switch 65 is disposed to the right of the main switch 64. The shift lever 62 is disposed to the right of the main switch 64 and to the left of the rotation mode switch 65. The operating members 62, 64, and 65 are attached to the rear end portion 31a of the left handlebar 31.

As shown in FIG. 5, the rotation mode switch 65 issues an "off" signal ("power mode" switching signal) when the front portion 65b of an operating knob 65a is pushed, and issues an "on" signal ("quiet mode" switching signal) when the rear portion 65c of the operating knob 65a is pushed.

Accordingly, the operator can set the control mode of the engine 14 to "power mode" or "quiet mode" by operating the rotation mode switch 65 according to the work conditions of the walk-behind lawnmower 10. When work is performed in the "power mode," the operator may use his left hand 57 (see FIG. 4) to push the front portion 65b of the operating knob 65a. When work is performed in the "quiet mode," the operator may use his left hand 57 to push the rear portion 65c of the operating knob 65a.

As shown in FIGS. 4 and 5, the cover 71 is formed in a shape that is substantially rectangular in plan view, and the cover is attached to the rear end portion 31a of the left handlebar 31. The cover 71 has a shift lever hole 73, a main switch hole 74, and a switch attachment hole 75 in the upper surface 72 of the cover 71. The operating lever portion 95 of the shift lever 62 is passed through the shift lever hole 73, and the shift lever hole 73 is disposed in the vicinity of the outside edge 72a of the upper surface 72. The operating knob 64a of the main switch 64 is passed through the main switch hole 74. The operating knob 65a of the rotation mode switch 65 is passed through the switch attachment hole 75, and the switch attachment hole 75 is disposed in the vicinity of the inside edge 72b of the upper surface 72.

As described above, the main switch 64, the rotation mode switch 65, and the work clutch operation detection sensor 68 are disposed in the left handlebar 31. The electrical components (including the control unit 89) other than the electrical components 64, 65, and 68 are disposed in the housing 11 (see FIG. 1).

A plurality of wire harnesses (not shown) that lead from the electrical components 64, 65, and 68 to the electrical components in the housing 11 can bundled together with the shifting cable 27 and the clutch cable 122 along the left handlebar 31. The cables 27 and 122 and the wire harnesses can therefore by adequately protected by the left handlebar 31. The wire harnesses can also be protected by the cables 27 and 122.

An example of the operation of the work clutch lever 41 and the travel lever 42 will next be described based on FIGS. 6 through 8C and with reference to FIG. 2.

FIG. 7 shows a state in which the work clutch lever 41 and the travel lever 42 are both in the "off" position. Since the work clutch lever 41 is in the "off" position, the clutch portion of the clutch 21 is maintained in the "off" state, and the brake portion is maintained in the "on" state. Since the work clutch lever 41 is in the "off" position, the pressing plate 112 pushes the pushrod 68a. As a result, the work clutch operation detection sensor 68 is in the "off" state. Furthermore, since the travel lever 42 is in the "off" position, the shifting device 25 is in a state in which the output transmitted to the rear wheels 13 from the engine 14 is disengaged.

Then, after the main switch 64 shown in FIG. 2 is placed in the "on" position, the knob 81a of the recoil starter 81 is pulled, whereby the engine 14 is started. As shown in FIG. 7, since the work clutch lever 41 is retained in the "off" position, the work clutch operation detection sensor 68 is in the "off" state. The rotation control mode of the engine 14 is therefore the "idle mode." At this time, the clutch 21 is in the "off" state, and the cutter 15 is therefore stopped. Since the travel lever 42 is retained in the "off" position, travel of the walk-behind lawnmower 10 is stopped.

Figure 8A:
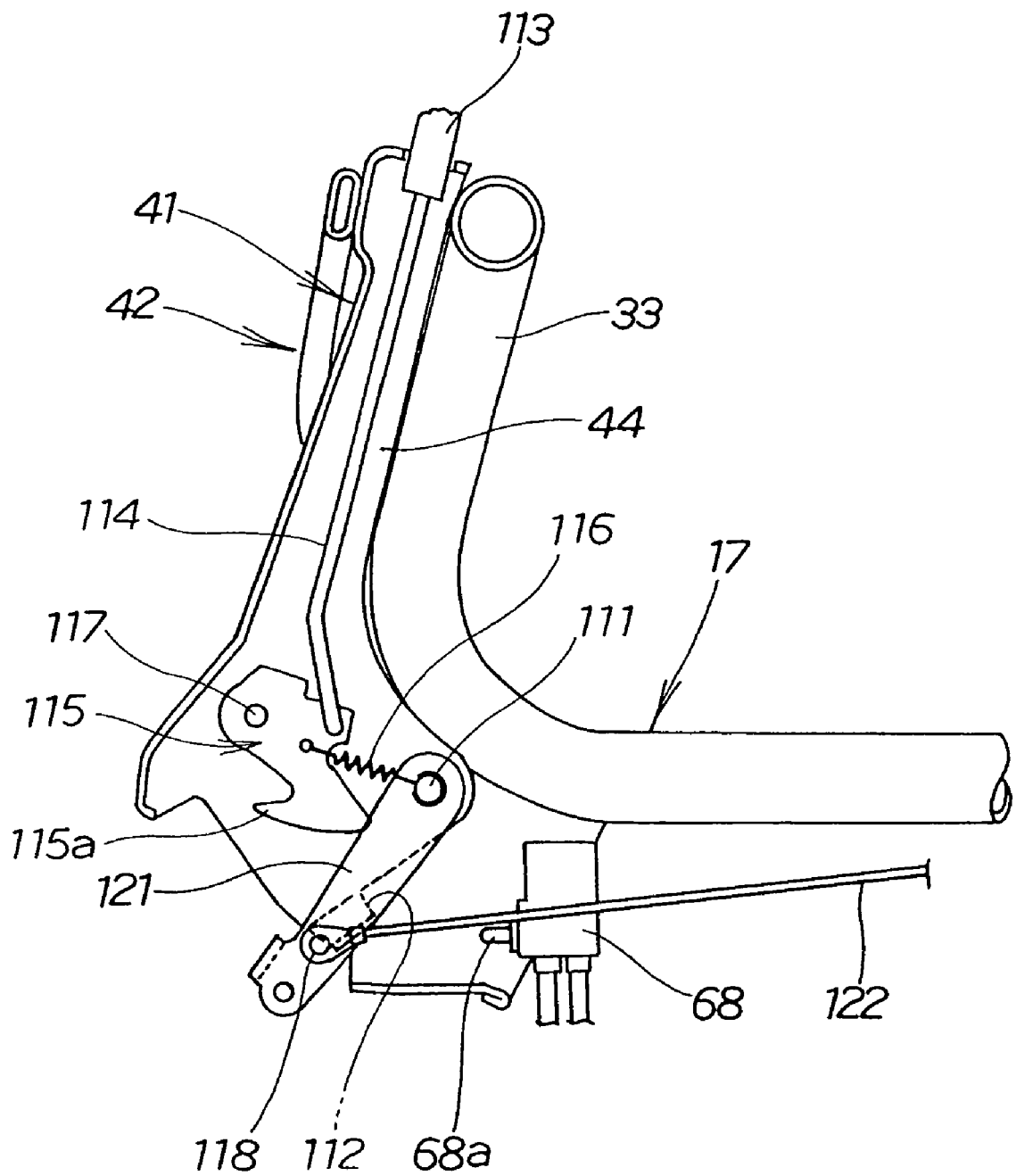
FIGS. 8A through 8C are views showing example operations of the work clutch lever and travel lever of FIGS. 6 and 7.

The work clutch lever 41 and the travel lever 42 are then swung forward. As a result, the work clutch lever 41 and the travel lever 42 are superposed on the grip portion 33, as shown in FIG. 8A. The position of this superposition is the "on" position.

The work clutch lever 41 is moved from the "off" position to the "on" position, whereby the protruding portion 112 separates toward the rear from the pushrod 68a of the work clutch operation detection sensor 68. As a result, the work clutch operation detection sensor 68 is placed in the "on" state. The push button 113 is not being pressed, and the clutch 21 is therefore maintained in the "off" state.

When the travel lever 42 is swung from the "off" position to the "on" position, the travel arm 105 swings backward about the support pin 111 and pulls the shift lever arm 63 backward via the second tension spring 106, as shown in FIG. 6. The shift lever arm 63 swings in the clockwise direction of FIG. 6 and moves the connecting pin 101 to the rear, whereby the inner cable 27a of the shifting cable 27 is pulled. The shifting device 25 (see FIG. 2) therefore transmits the output of the engine 14 to the rear wheels 13. As a result, the rear wheels 13 rotate, and the walk-behind lawnmower 10 therefore travels forward.

As described above, the radius of the first guide hole 98 is set so as to gradually increase from the rear end portion to the front end portion.

The shift lever 62 is swung forward, whereby the connecting pin 101 is moved downward, and the inner cable 27a is therefore pulled further to the rear. The output rotational speed of the shifting device 25 therefore increases. As a result, the travel speed of the walk-behind lawnmower 10 increases.

The shift lever 62 is then swung to the rear, whereby the connecting pin 101 moves upward. There is a reduction in the force with which the inner cable 27a is pulled by the shift lever 62. The output rotational speed of the shifting device 25 therefore decreases. As a result, the travel speed of the walk-behind lawnmower 10 decreases.

The travel speed of the walk-behind lawnmower 10 thus changes according to the amount of swing of the shift lever 62.

An example in which the cutter 15 is rotated while the walk-behind lawnmower 10 is caused to travel will next be described.

Figure 8B:
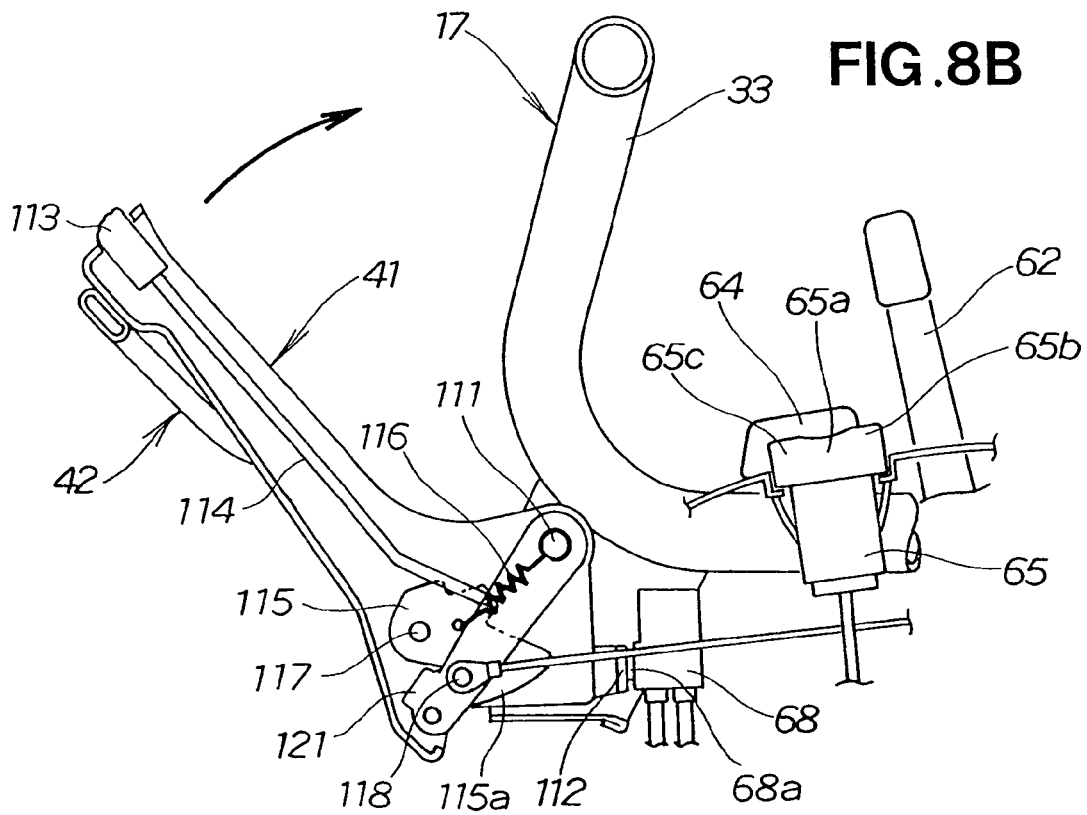

In the state in which the work clutch lever 41 is in the "off" position, the retaining arm 115 swings in the clockwise direction of FIG. 8B about the support pin 117 when the push button 113 is pressed, as shown in FIG. 8B. As a result, the locking tab 115a catches on the linking pin 118 and locks.

Figure 8C:
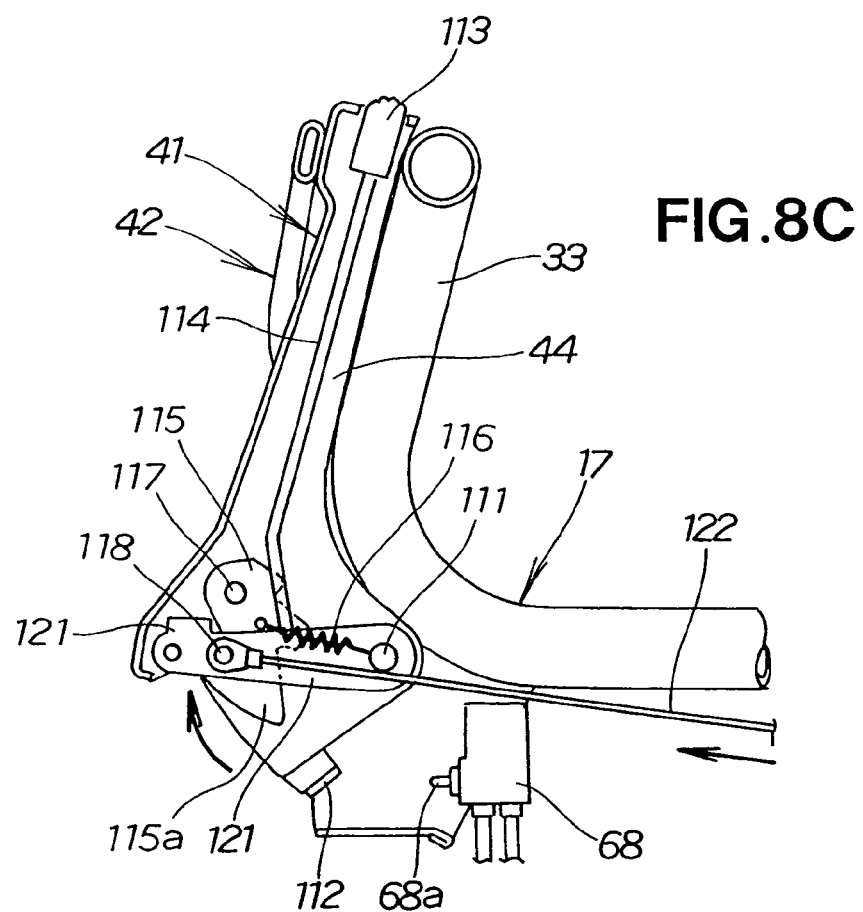

In the locked state, the clutch operating arm 121 swings in the clockwise direction about the support pin 111 and pulls the clutch cable 122 when the work clutch lever 41 is swung forward, as shown in FIG. 8C. Therefore, in the clutch 21 (see FIG. 2), the brake portion is placed in the "off" position, and the clutch portion is placed in the "on" position. As a result, the cutter 15 rotates. The clutch cable 122 can thus be pulled to the rear by swinging the work clutch lever 41 forward while pressing the push button 113. As a result, the clutch 21 is placed in an engaged state.

The protruding portion 112 is separated to the rear from the pushrod 68a of the work clutch operation detection sensor 68 by moving the work clutch lever 41 from the "off" position to the "on" position. As a result, the work clutch operation detection sensor 68 placed in the "on" state.

The sequence of operations and the control flow that occur when the abovementioned control unit 89 shown in FIG. 2 is a microcomputer will next be described based on FIGS. 9 and 10 with reference to FIGS. 2 and 3.

The series of operations from the time the engine 14 is started to the time the control unit 89 executes the control routine will first be described based on FIG. 9.

Step (hereinafter abbreviated as ST) ST01: The operator turns the main switch 64 on.

ST02: In the "on" state of the main switch 64, the operator performs the startup operation using the recoil starter 81 by pulling the knob 81a of the recoil starter 81.

ST03: The engine 14 is started by the startup operation of the recoil starter 81.

ST04: The generator 87 begins generating electricity as the engine 14 is started.

ST05: The output voltage of the generator 87 reaches a stable voltage that is equal to or higher than a certain value, whereby the control unit 89 is automatically activated by electric power supplied from the generator 87.

ST06: The control unit 89 executes an initial setting routine before initiating a prescribed control.

ST07: The control unit 89 automatically executes the "engine speed control routine" beginning at this time. The specific control sequence for executing the engine speed control routine is shown in FIG. 10.

Figure 9:
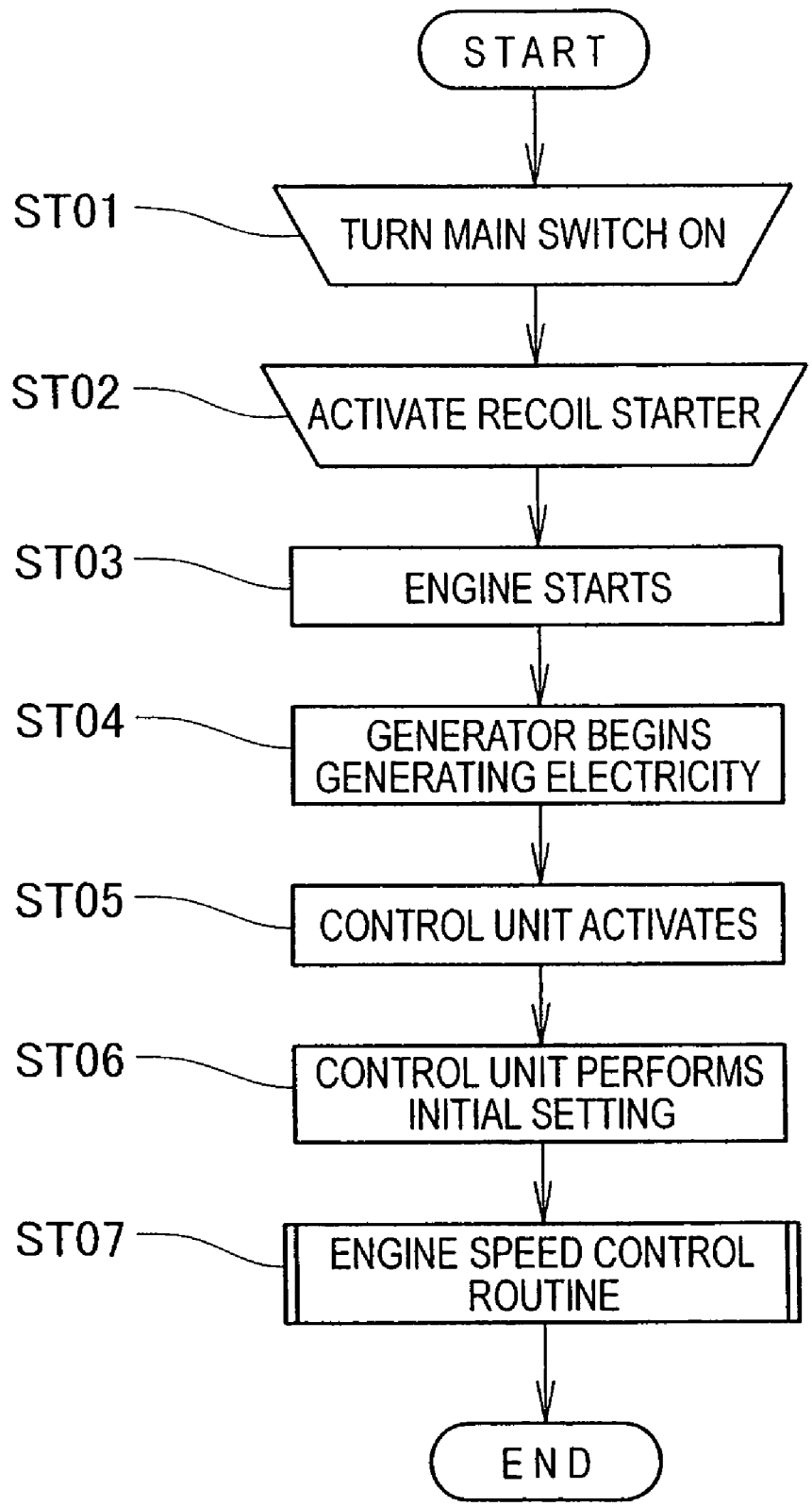
FIG. 9 is a flowchart showing the sequential procedure from the time of the startup operation of the engine of FIG. 2 until the control unit executes the control routine.
Figure 10:
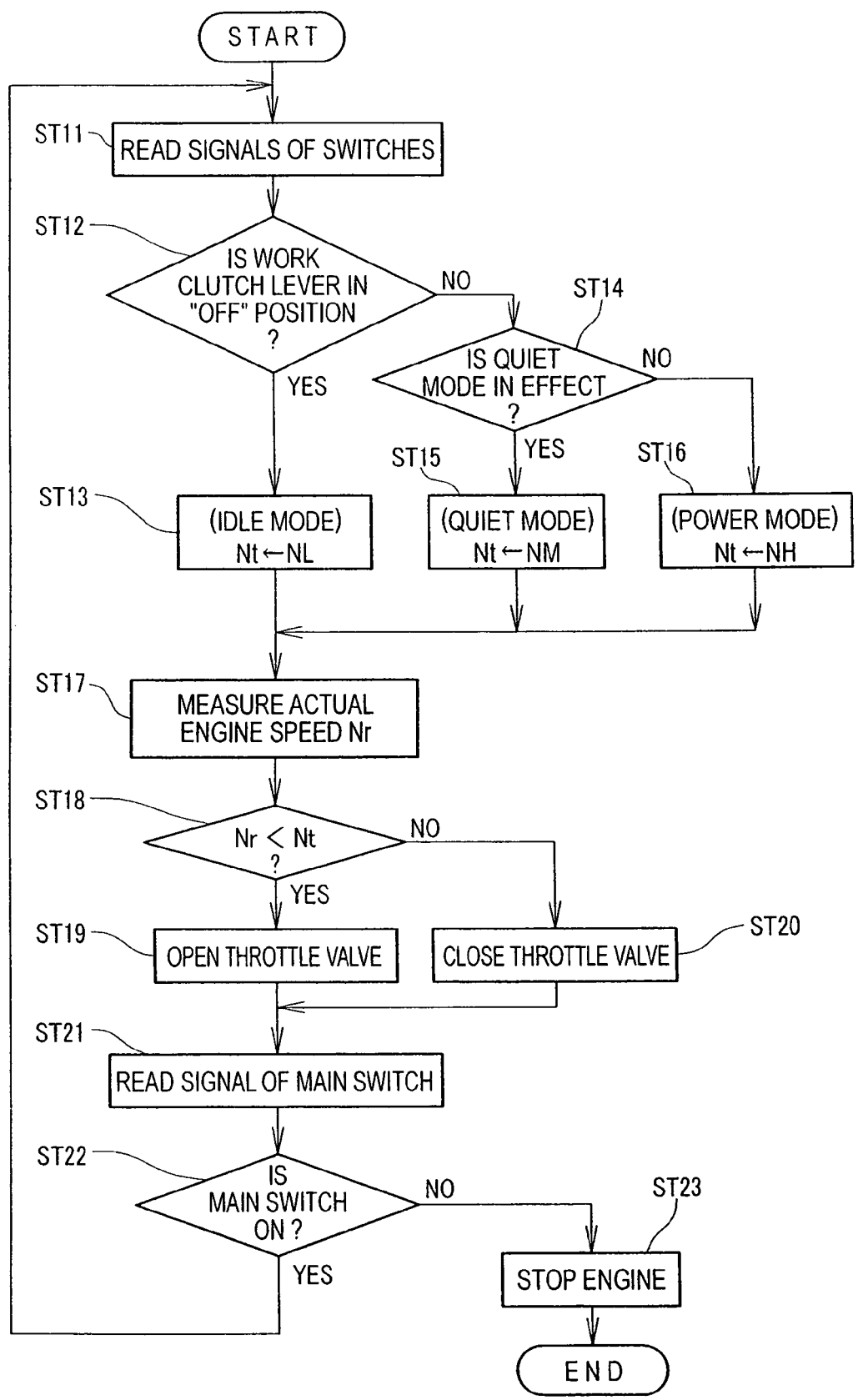
FIG. 10 is a detailed control flowchart of the execution of the steps of the engine speed control routine of FIG. 9.

FIG. 10 is a control flowchart for the control unit 89, and shows the control flow whereby the control unit 89 executes the "engine speed control routine" of step ST07 shown in FIG. 9.

ST11: The switch signals of the switches are read. Specifically, the signals of the rotation mode switch 65 and the work clutch operation detection sensor 68 are read.

ST12: An assessment is made as to whether the work clutch lever 41 is in the "off" position, and when the result is YES, a determination is made that the "idle mode" is in effect, and the process proceeds to ST13. When the result is NO, the process proceeds to ST14. As shown in FIG. 7, the position of the work clutch lever 41 when the operator removes his hand from the work clutch lever 41 is the "off" position. The position of the work clutch lever 41 is determined according to the detection signal of the work clutch operation detection sensor 68.

ST13: Since the rotation control mode of the engine 14 is transferred to the "idle mode," the target engine speed Nt of the engine 14 is set to the low target engine speed NL. The low target engine speed NL is a specific preset engine speed that corresponds to the speed of the engine 14 in the idling state, as shown in FIG. 3.

ST14: An assessment is made as to whether the rotation control mode of the engine 14 is the "quiet mode," and when the result is YES, the process proceeds to ST15. When the result is NO, a determination is made that the "power mode" is in effect, and the process proceeds to ST16. In ST14, a determination of YES is made when the rotation mode switch 65 is on, and a determination of NO is made when the rotation mode switch 65 is off.

ST15: Since the rotation control mode of the engine 14 is transferred to the "quiet mode," the target engine speed Nt of the engine 14 is set to the medium target engine speed NM. The medium target engine speed NM is a specific preset engine speed that corresponds to the engine speed NM at which the engine 14 is substantially capable of generating the maximum torque Tmax, as shown in FIG. 3.

ST16: Because the rotation control mode of the engine 14 is transferred to the "power mode," the target engine speed Nt of the engine 14 is set to the high target engine speed NH. The high target engine speed NH is a specific preset engine speed that corresponds to the engine speed NH at which the engine 14 is substantially capable of generating the maximum output Pmax, as shown in FIG. 3.

As is apparent from ST13, ST15, and ST16 described above, the target engine speed Nt is set in stepwise fashion to the three values that include the low target engine speed NL, the medium target engine speed NM, and the high target engine speed NH. The medium target engine speed NM is higher than the low target engine speed NL, and the high target engine speed NH is higher than the medium target engine speed NM (NL<NM<NH).

ST17: The actual engine speed Nr (hereinafter referred to as the "actual engine speed Nr") is measured by the engine rotation sensor 86.

ST18: An assessment is made as to whether the actual engine speed Nr is below the target engine speed Nt, and when the result is YES, the process proceeds to ST19. When the result is NO, the process proceeds to ST20.

ST19: The control motor 83 is driven in the positive rotation direction, whereby the throttle valve 92 is opened. As a result, the actual engine speed Nr increases.

ST20: The control motor 83 is driven in the negative rotation direction, whereby the throttle valve 92 is closed. As a result, the actual engine speed Nr decreases.

ST21: The switch signal of the main switch 64 is read.

ST22: An assessment is made as to whether the main switch 64 is on, and when the result is YES, a determination is made to continue operation of the engine 14, and the process returns to ST11. When the result is NO, a determination is made that a stop command has been issued for the engine 14, and the process proceeds to ST23.

ST23: After the engine 14 is stopped, control according to the control flow described above is ended.

The operation of the walk-behind lawnmower 10 (engine-driven work machine 10) described using the control flowchart of FIG. 10 will next be described based on FIG. 11 with reference to FIG. 2.

Figure 11:
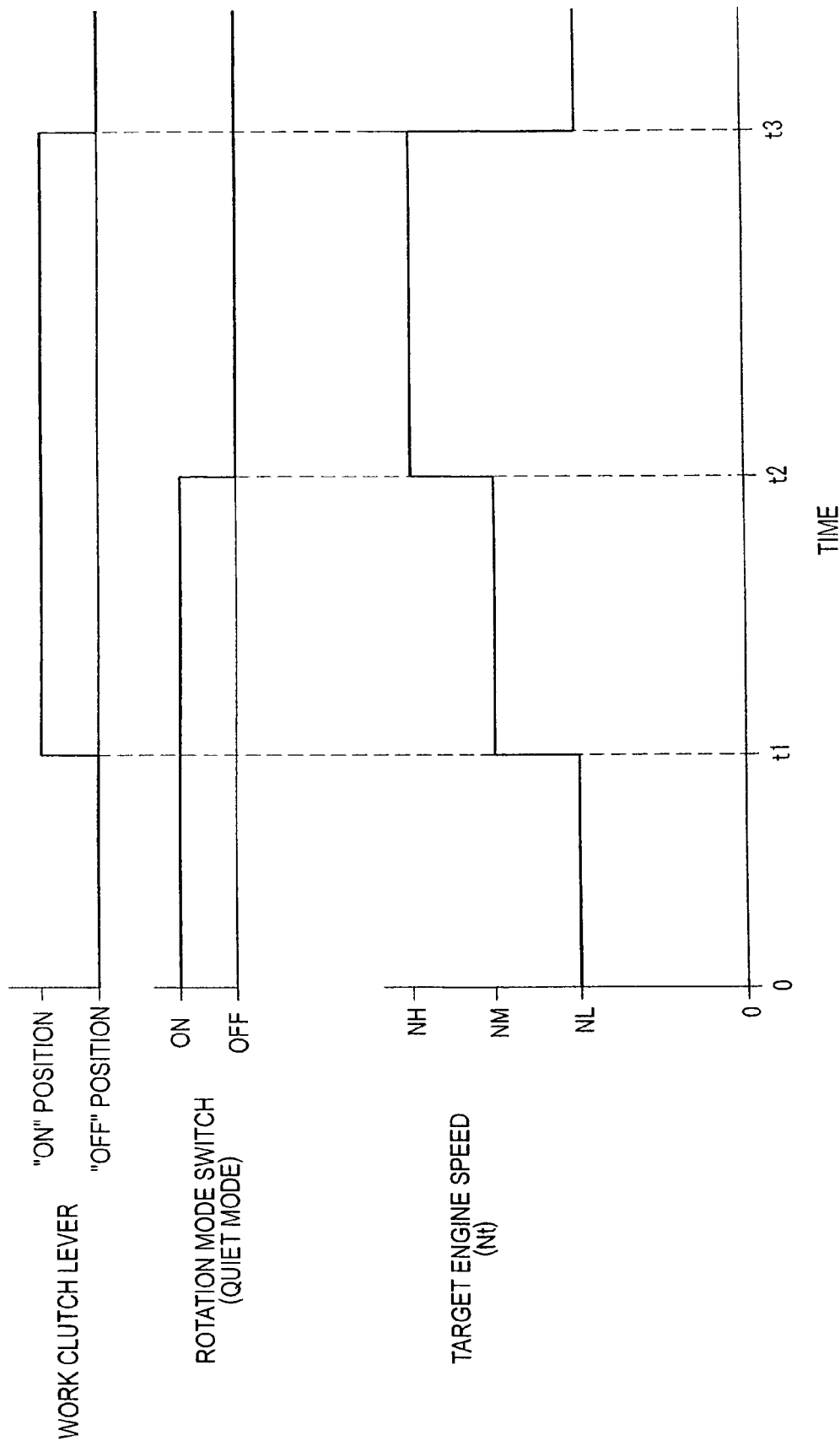
FIG. 11 is a diagram showing the actions in the control flowchart of FIG. 10.

FIG. 11 is a timing chart in which the horizontal axis indicates time, and shows the operation of each component in the walk-behind lawnmower 10.

When the work clutch lever 41 is in the "off" position, the rotation control mode of the engine 14 is the "idle mode" regardless of whether the rotation mode switch 65 is operated (ST12 of FIG. 10). Therefore, the target engine speed Nt of the engine 14 remains at the low target engine speed NL (ST13 of FIG. 10).

When the rotation mode switch 65 is in the "on" state, the rotation control mode of the engine 14 changes to the "quiet mode" when the work clutch lever 41 is placed in the "on" position at time t1 (ST12 and ST14 of FIG. 10). The target engine speed Nt of the engine 14 therefore changes to the medium target engine speed NM (ST15 of FIG. 10).

When the rotation mode switch 65 is then turned off at time t2, the rotation control mode of the engine 14 changes to the "power mode" (ST14 of FIG. 10). The target engine speed Nt of the engine 14 therefore changes to the high target engine speed NH (ST16 of FIG. 10).

When the work clutch lever 41 is then placed in the "off" position at time t3, the rotation control mode of the engine 14 changes to the "idle mode" (ST12 of FIG. 10). The target engine speed Nt of the engine 14 therefore changes to the low target engine speed NL (ST13 of FIG. 10).

A second embodiment will next be described based on FIGS. 12 through 15 using a walking-type tiller as an example of the engine-driven work machine. The same reference symbols are used for structures and actions in the second embodiment that are the same as those of the first embodiment shown in FIGS. 1 through 11, and description thereof is omitted.

Figure 12:
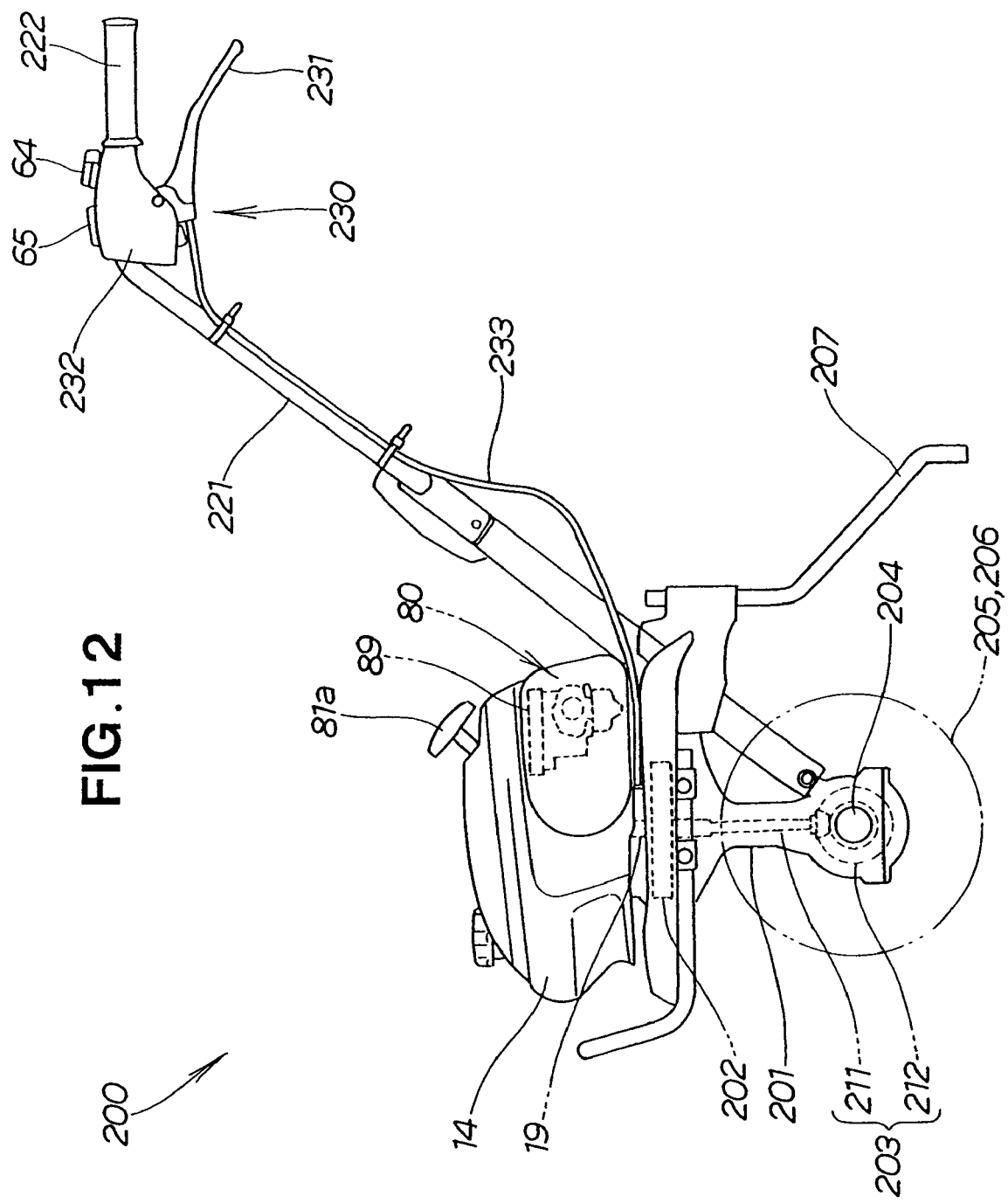
FIG. 12 is a side elevational view of an engine-driven work machine according to a second embodiment of the present invention.
Figure 13:
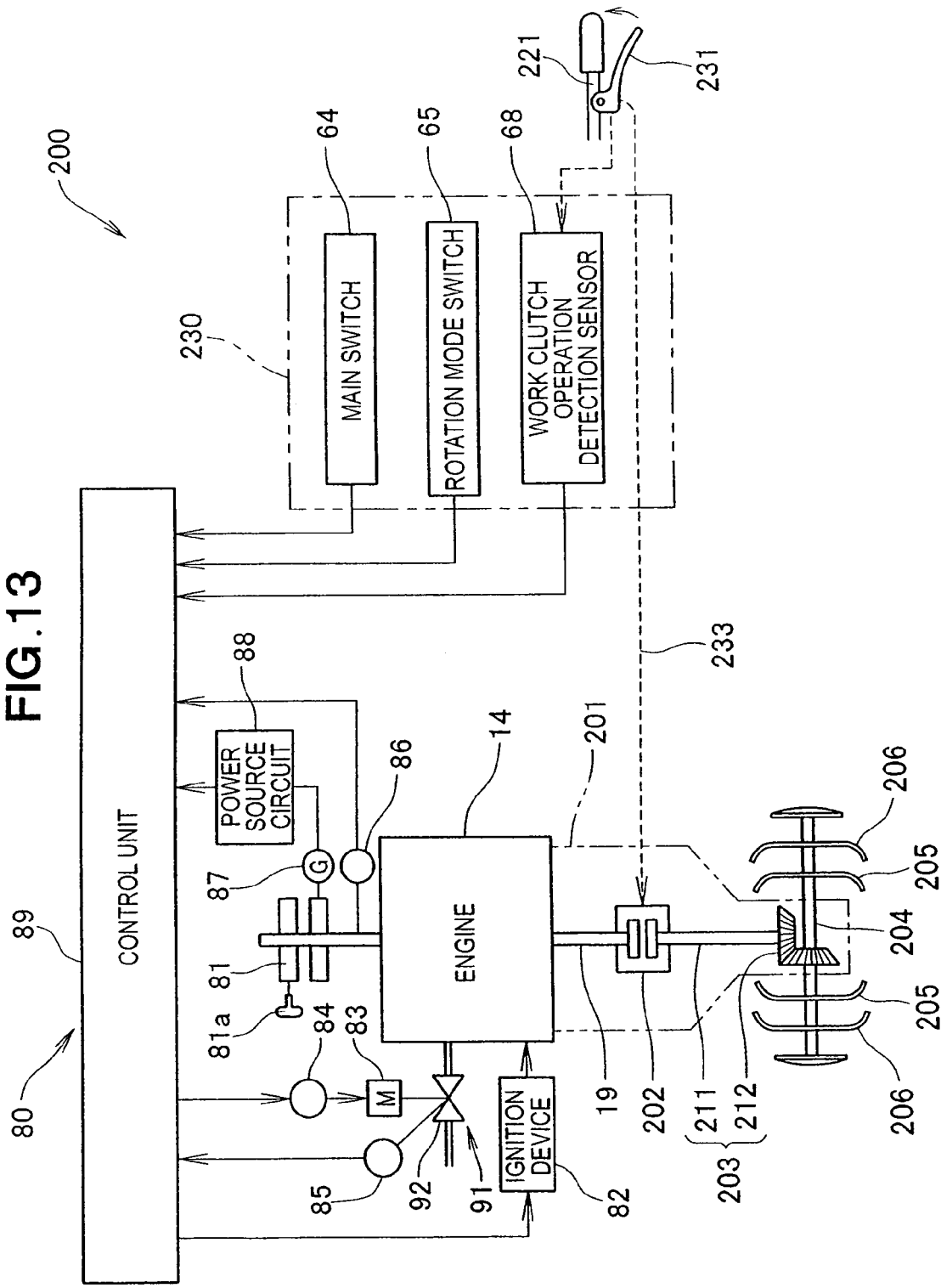
FIG. 13 is a schematic system diagram of the engine-driven work machine shown in FIG. 12.

As shown in FIGS. 12 and 13, the walking-type tiller 200 of the second embodiment is a type of engine-driven work machine that is steered by a walking operator using a handle 221, and is propelled (is self-propelled) by the output of an engine 14. The walking-type tiller 200 is composed of a case 201, an engine 14, a clutch 202, 1 power transmission mechanism 203, a tiller axle 204, a first tilling plate 205, a second tilling plate 206, a resistance rod 207, a pair of left and right handles 221, and an operating unit 230.

The engine 14 of the second embodiment is mounted on the upper portion of a casing 201, and is a power source having an output shaft 19 that extends downward from the lower end portion of the engine 14.

As described above, the casing 201 is provided with the engine 14, a power transmission mechanism 203, the first and second tilling plates 205, 206, the resistance rod 207, and other main components, and therefore also functions as the machine body (frame) of the walking-type tiller 200. The casing 201 will be referred to hereinafter as the "machine body 201", or "frame 201" as appropriate.

A clutch 202 disengages and engages the output transmitted from the engine 14 to the first and second tilling plates 205, 206. The power transmission mechanism 203 is connected to the output shaft 19 of the engine 14 in the casing 201 via the clutch 202, and is composed of a transmission shaft 211 and a bevel gear mechanism 212 for transmitting the output of the engine 14 to the tiller axle 204.

The tiller axle 204 is a horizontal shaft that connects to the power transmission mechanism 203 and extends to the left and right. The first and second tilling plates 205, 206 are implements for performing the work of tilling, and are provided to the tiller axle 204. The resistance rod 207 extends downward from the rear portion of the casing 201, and is a rod that is inserted into the soil to set the tilling depth of the first and second tilling plates 205, 206, and that applies resistance to the pulling force of the first and second tilling plates 205, 206.

The pair of left and right handles 221 extend upward and to the rear from the rear portion of the casing 201, and grips 222 are provided to the rear ends thereof. An operating unit 230 is provided in the vicinity of the grip 222 of the left handle 221.

The walking-type tiller 200 having this type of configuration is a small-sized walking-type self-propelled tiller that tills using the rotation of the first and second tilling plates 205, 206 and travels using the first and second tilling plates 205, 206. The walking-type tiller 200 is referred to as a front-tined farm cultivator. The first and second tilling plates 205, 206 act as travel units. The first and second tilling plates 205, 206 will be referred to hereinafter as "implements 205, 206" or "travel units 205, 206" as appropriate.

The area surrounding the rear portion of the left handle 221, and the detailed structure of the operating unit 230 will next be described.

Figure 14:
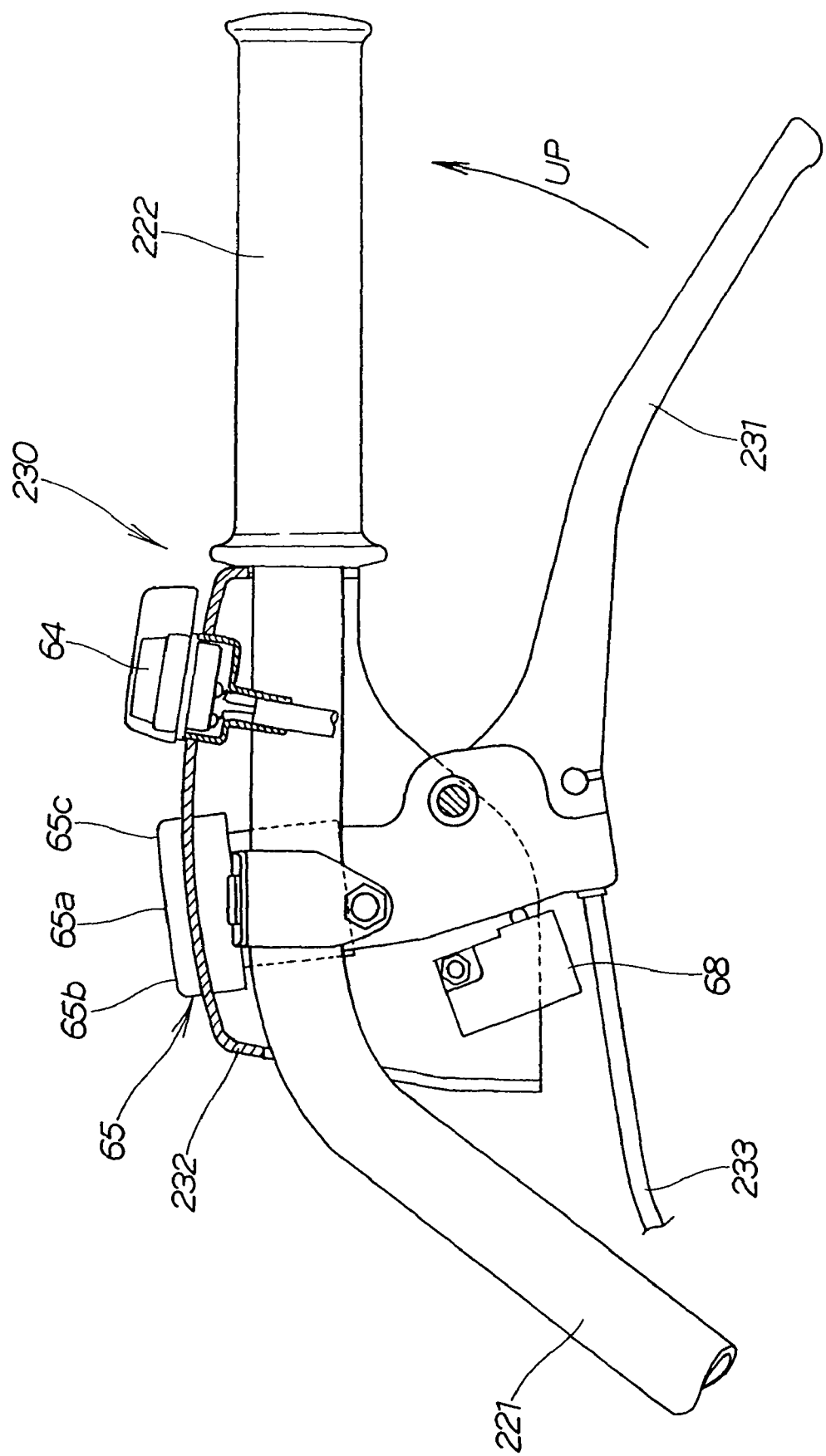
FIG. 14 is a partial cutaway view of the area surrounding the rear portion of the handle of FIG. 12, as seen from the left side.
Figure 15:
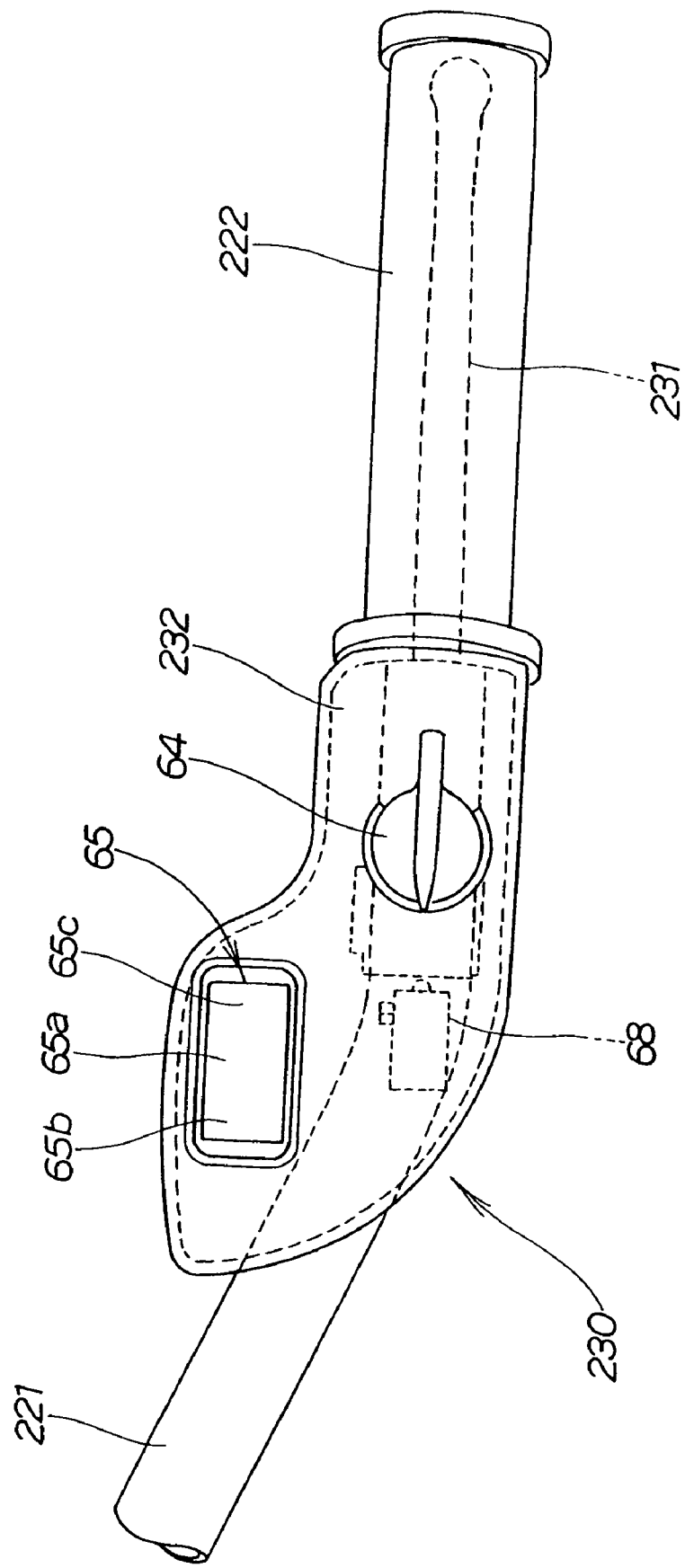
FIG. 15 is a plan view showing the area surrounding the back portion of the handle of FIG. 14.

As shown in FIGS. 14 and 15, the operating unit 230 is provided with a main switch 64, a rotation mode switch 65, a work clutch lever 231 (work clutch operating unit 231), a work clutch operation detection sensor 68, and a cover 232.

The work clutch lever 231 is an operating member whereby the clutch can be operated by grasping the work clutch lever 231 together with the grip 222, and is connected to the clutch 202 (see FIG. 12) via a clutch cable 233. Specifically, the work clutch lever 231 is a member that operates the clutch 202 in the same manner as the work clutch lever 41 shown in FIGS. 1 through 11.

The work clutch operation detection sensor 68 detects the engagement operation of the clutch 202 through the use of the work clutch lever 231, and is composed of a limit switch, for example. When the work clutch lever 231 is operated and the clutch 202 is engaged (clutch on) via the clutch cable 233, the work clutch operation detection sensor 68 detects that engagement has taken place and issues a detection signal to the control unit 89 shown in FIG. 13.

As shown in FIG. 14, the work clutch lever 231 is in the "off" position when the operator removes his hand from the work clutch lever 231. When the operator grips the work clutch lever 231 together with the grip 222 and swings the work clutch lever 231 in the direction of the arrow UP, the work clutch lever 231 is in the "on" position.

As shown in FIG. 12, the control unit 89 mounted on the walking-type tiller 200 has the structure and operation shown in FIGS. 10 and 11. Accordingly, the walking-type tiller 200 performs the actions shown in FIG. 11.

The descriptions of the first and second embodiments are summarized as follows.

As shown in FIGS. 2 and 13, in the first and second embodiments, the values of a plurality of target engine speeds Nt are preset in stepwise fashion in the control unit 89. The operator can select any single target engine speed Nt from among the plurality of target engine speeds Nt set in stepwise fashion, and operate the target engine speed selection unit 65 (rotation mode switch 65). The target engine speed selection unit 65 specifies the selected single target engine speed Nt to the control unit 89. The control unit 89 electrically controls the opening and closing of the throttle valve 92 so that the actual engine speed Nr of the engine 14 conforms to the specified target engine speed Nt. The operator can thus shift to the target engine speed Nt of the selected value with extreme convenience merely by operating the target engine speed selection unit 65. There is therefore no need for the operator to operate a throttle lever and to finely adjust the target engine speed Nt, as in the prior art.

For example, even when the load placed on the engine 14 varies significantly due to significant variation of the load on the implement 15, 205, 206, the operator can easily adjust the actual engine speed Nr according to the load on the engine. It is therefore possible to increase the ease of operation and the working efficiency of the engine-driven work machine 10, 200.

When the load is small, engine noise can be reduced by operating the target engine speed selection unit 65 to reduce the actual engine speed Nr. As a result, the amount of noise generated by the engine-driven work machine 10, 200 can be further reduced, and the work environment can be further improved. By reducing the actual engine speed Nr when the load is small, the fuel consumption of the engine 14 can be reduced, and the amount of dust generated by the implement 15, 205, 206 during operation can also be reduced.

Furthermore, in the first and second embodiments, the values of the plurality of target engine speeds Nt selected by the target engine speed selection unit 65 are set to two values that include a medium target engine speed NM and a high target engine speed NH. The medium target engine speed NM is set to the engine speed at which the engine 14 is substantially capable of generating the maximum torque Tmax. The high target engine speed NH is set to the engine speed at which the engine 14 is substantially capable of generating the maximum output Pmax.

When the load on the engine 14 is small, the output of the engine 14 is adequate even when work is performed in a state in which the actual engine speed Nr is reduced. The implement 15, 205, 206 can be driven at a high torque by setting the target engine speed Nt to the medium target engine speed NM. It is therefore possible to adequately respond to variation in the load on the implement 15, 205, 206.

Furthermore, by switching the target engine speed Nt to the medium target engine speed NM, the actual engine speed Nr can be reduced, and engine noise can be reduced.

When the load on the engine 14 is large (for example, when cutting long grass and in other situations in which the lawnmower 10 is used), the target engine speed Nt is switched to the high target engine speed NH. As a result, the actual engine speed Nr increases, and work can be efficiently performed in a state in which the output of the engine 14 is increased.

The operator can thus conveniently switch the actual engine speed Nr between the two levels that include the middle speed NM and the high speed NH according to the load when the load on the engine 14 varies significantly during work performed by the engine-driven work machine 10, 200. There are only two levels of speeds selected by the target engine speed selection unit 65. The target engine speed Nt can therefore be selected with extreme ease.

Furthermore, in the first and second embodiments, the work clutch operation detection sensor 68 can reliably detect that an engaging operation has taken place when the work clutch operating unit 41, 231 is used to cause the clutch 21, 202 to engage. The work state (working state or stopped state) of the implement 15, 205, 206 that functions using the output of the engine 14 can therefore be reliably detected.

The control unit 89 also controls the throttle valve 92 so as to cause the actual engine speed Nr to conform to the single selected target engine speed Nt only when the work clutch operation detection sensor 68 detects that the clutch 21, 202 is engaged. Variations in the target engine speed Nt that are unnecessary for the operator can therefore be prevented. In other words, in a state in which the implement 15, 205, 206 is stopped, the target engine speed Nt does not vary even when the target engine speed selection unit 65 is operated.

A third embodiment will next be described based on FIGS. 16 through 21 using a walk-behind lawnmower as an example of the engine-driven work machine. The same reference symbols are used for structures and actions in the third embodiment that are the same as those of the first embodiment shown in FIGS. 1 through 11, and description thereof is omitted.

Figure 16:
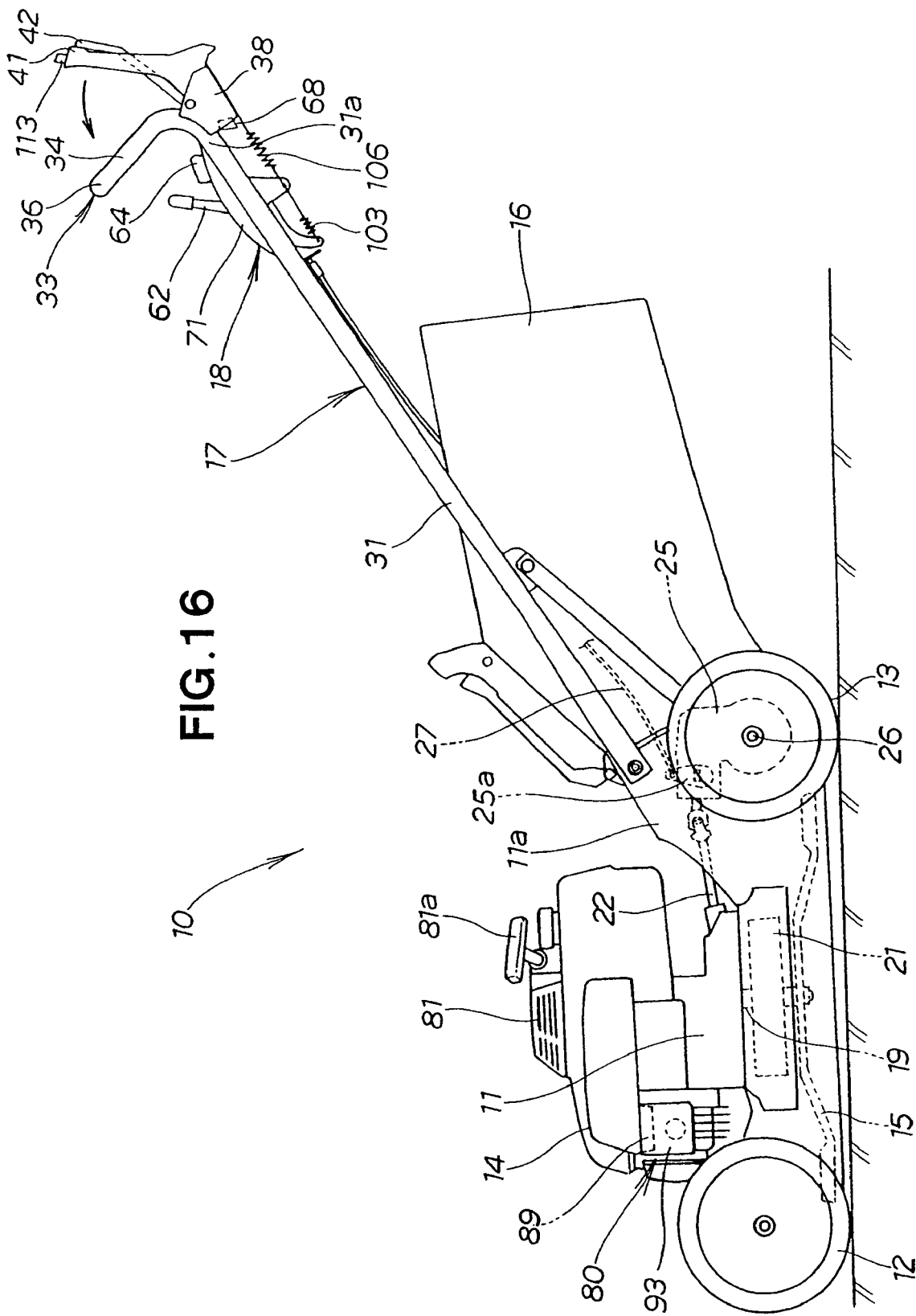
FIG. 16 is a side elevational view of an engine-driven work machine according to a third embodiment of the present invention.
Figure 17:
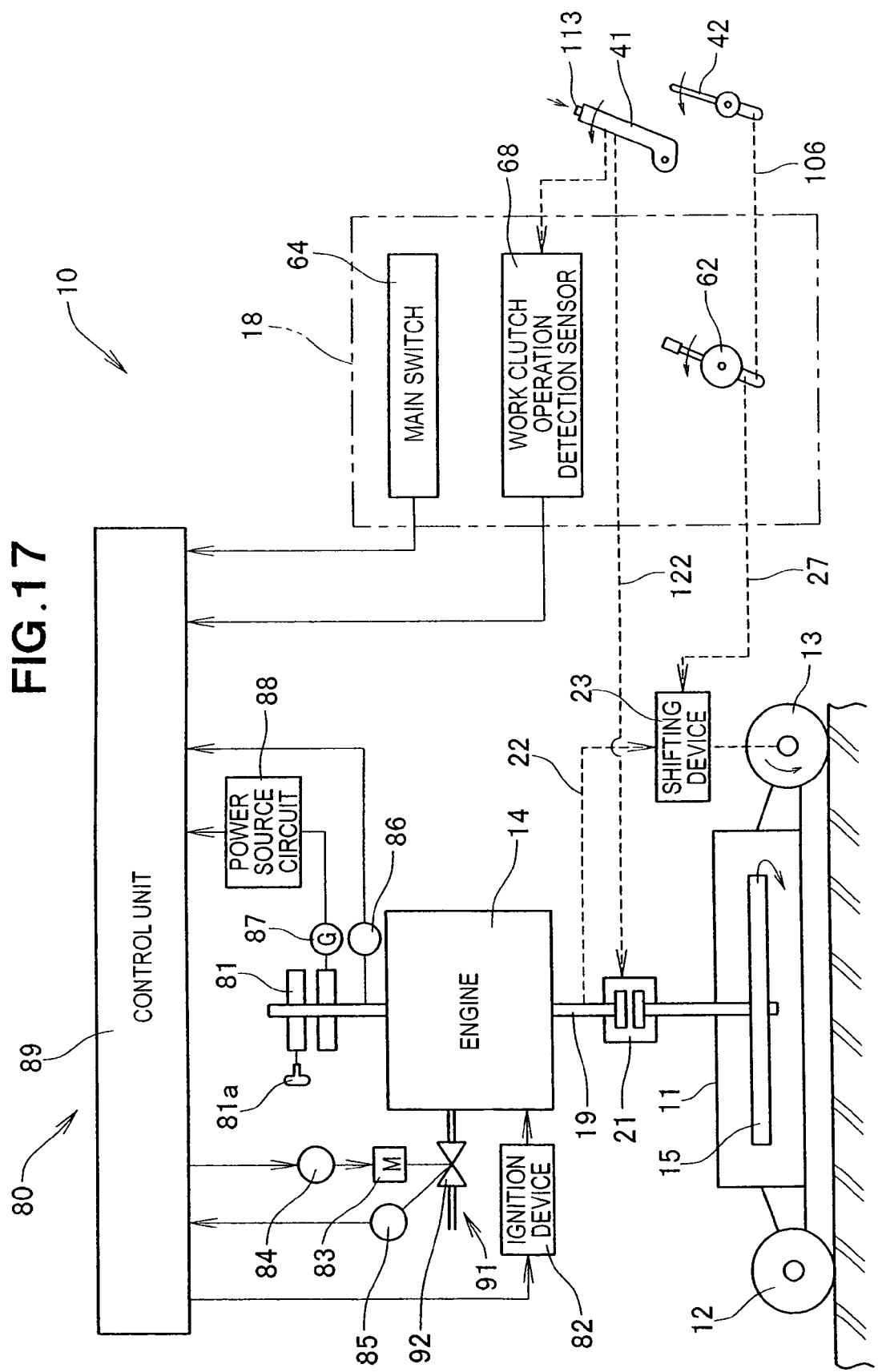
FIG. 17 is a schematic system diagram of the engine-driven work machine of FIG. 16.

The walk-behind lawnmower 10 of the third embodiment has substantially the same basic structure as that of the first embodiment. As shown in FIGS. 16 and 17, the rotation mode switch 65 (see FIG. 2) of the first embodiment is dispensed with, and the structure of the control unit 89 is modified.

The control modes whereby the control unit 89 of the third embodiment controls the speed of the engine 14 are broadly classified into two rotation control modes. These rotation control modes are defined as described below.

The first rotation control mode is an "idle mode" for controlling the engine speed so as to obtain the engine speed of an idling state. The second rotation control mode is a "work mode" in which the work clutch lever 41 is operated to engage the clutch 21 (clutch on), whereby control is performed to obtain the engine speed of a state in which work is performed using the torque generated by the engine 14.

The concept of control whereby the control unit 89 controls the speed of the engine 14 according to the work mode will next be described based on FIG. 18.

Figure 18:
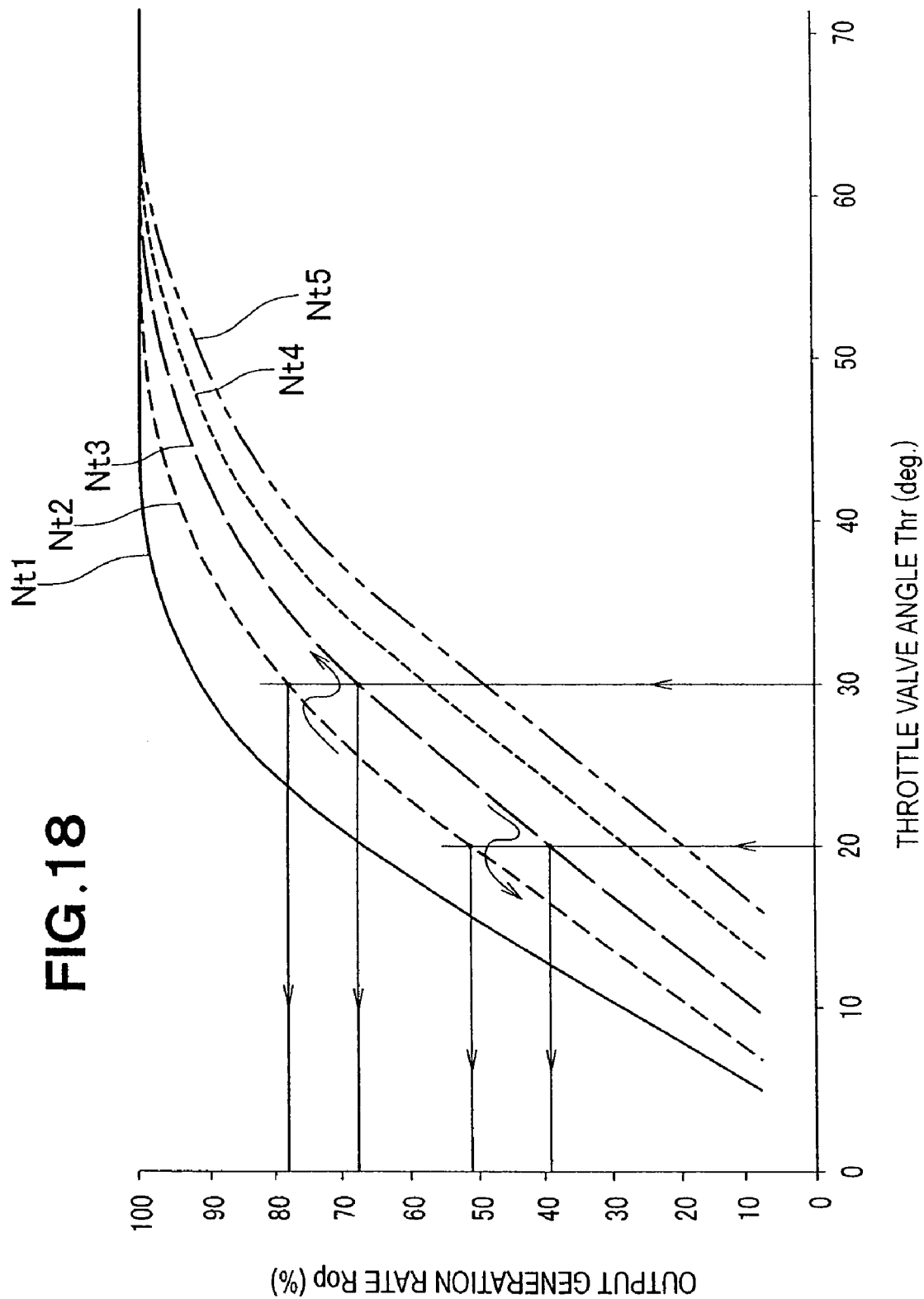
FIG. 18 is a diagram showing a conceptual control performed by the control unit shown in FIG. 17.

FIG. 18 is a conceptual diagram of the control performed by the control unit of the third embodiment, wherein the horizontal axis indicates the throttle valve angle Thr (deg.), and the vertical axis indicates the output generation rate Rop (%) of the engine. The output generation rate Rop of the engine is calculated based on the target engine speed of the engine and the throttle valve angle Thr.

The target engine speed of the engine 14 is indicated, for example, by five characteristic curves Nt1 through Nt5. In these characteristic curves, the target engine speed of the characteristic curve Nt1 is smallest, and the target engine speeds of the characteristic curves increase in the sequence Nt1, Nt2, Nt3, Nt4, Nt5 (Nt1<Nt2<Nt3<Nt4<Nt5).

The characteristic curve Nt1 is the characteristic curve of the target engine speed of the engine 14 in the idle mode. The other characteristic curves Nt2 through Nt5 are characteristic curves of the target engine speed of the engine 14 in the work mode. According to the characteristic curves Nt1 through Nt5, the output generation rate Rop of the engine tends to decrease with respect to the throttle valve angle Thr as the target engine speed increases.

The output generation rate Rop of the engine 14 (see FIG. 17) herein is a value (parameter) that indicates the size of the load on the engine 14. A large output generation rate Rop indicates a large load on the engine 14.

When the target engine speed is constant, the output generation rate Rop increases as the angle Thr of the throttle valve 92 (see FIG. 17) increases. A reason for this is that the output of the engine 14 generally increases as the angle Thr of the throttle valve 92 is increased even when the speed of the engine 14 is the same. In other words, the output generation rate Rop increases. When the angle Thr is at maximum, the output generation rate Rop is at maximum (100%).

In the walk-behind lawnmower 10 shown in FIG. 17, the load on the engine 14 increases at the start of grass cutting by the cutter 15. The control unit 89 performs control at this time to increase the angle Thr of the throttle valve 92 in order to maintain the actual speed of the engine 14 at the current target engine speed. As a result, the output generation rate Rop increases.

When the target engine speed is Nt2, for example, the output generation rate Rop has a large value of approximately 78% as soon as the angle Thr is 30 deg. At this time, when the target engine speed is increased from Nt2 to Nt3, the output generation rate Rop decreases to approximately 68% even when the angle Thr is 30 deg. Since the output generated by the engine 14 increases when the actual speed of the engine 14 increases, the output generation rate Rop decreases. The engine 14 can adequately respond to the load.

When the target engine speed is Nt3, the output generation rate Rop has a small value of approximately 39% as soon as the angle Thr is 20 deg. When the target engine speed is reduced from Nt3 to Nt2 at this time, the output generation rate Rop decreases to approximately 52% even when the angle Thr is 20 deg. The output generation rate Rop still remains small. In other words, since the load on the engine 14 is reduced, no problems are caused by the target engine speed decreasing to Nt2. By reducing the target engine speed, engine noise can be reduced, and fuel efficiency can be increased.

Although the actual speed of the engine 14 is controlled by the control unit 89, the angle Thr of the throttle valve 92 and the target engine speed of the engine 14 can be set to optimal values with consideration for the optimum output generation rate Rop of the engine 14. As a result, the engine 14 can be operated under optimum conditions.

Automatically setting the angle Thr of the throttle valve 92 makes it unnecessary for the operator to operate the throttle lever and adjust the target engine speed of the engine 14 to the appropriate value each time the load on the engine 14 varies during work.

The third embodiment is configured so that the speed of the engine 14 is controlled by the control unit 89 on the basis of the abovementioned control concept.

The flow of control performed by the control unit 89 shown in FIG. 17 will next be described. The series of operations from the time the engine 14 is started to the time the control unit 89 executes the control routine is the same as in the first embodiment shown in FIG. 9, and description thereof is omitted.

Figure 19A:
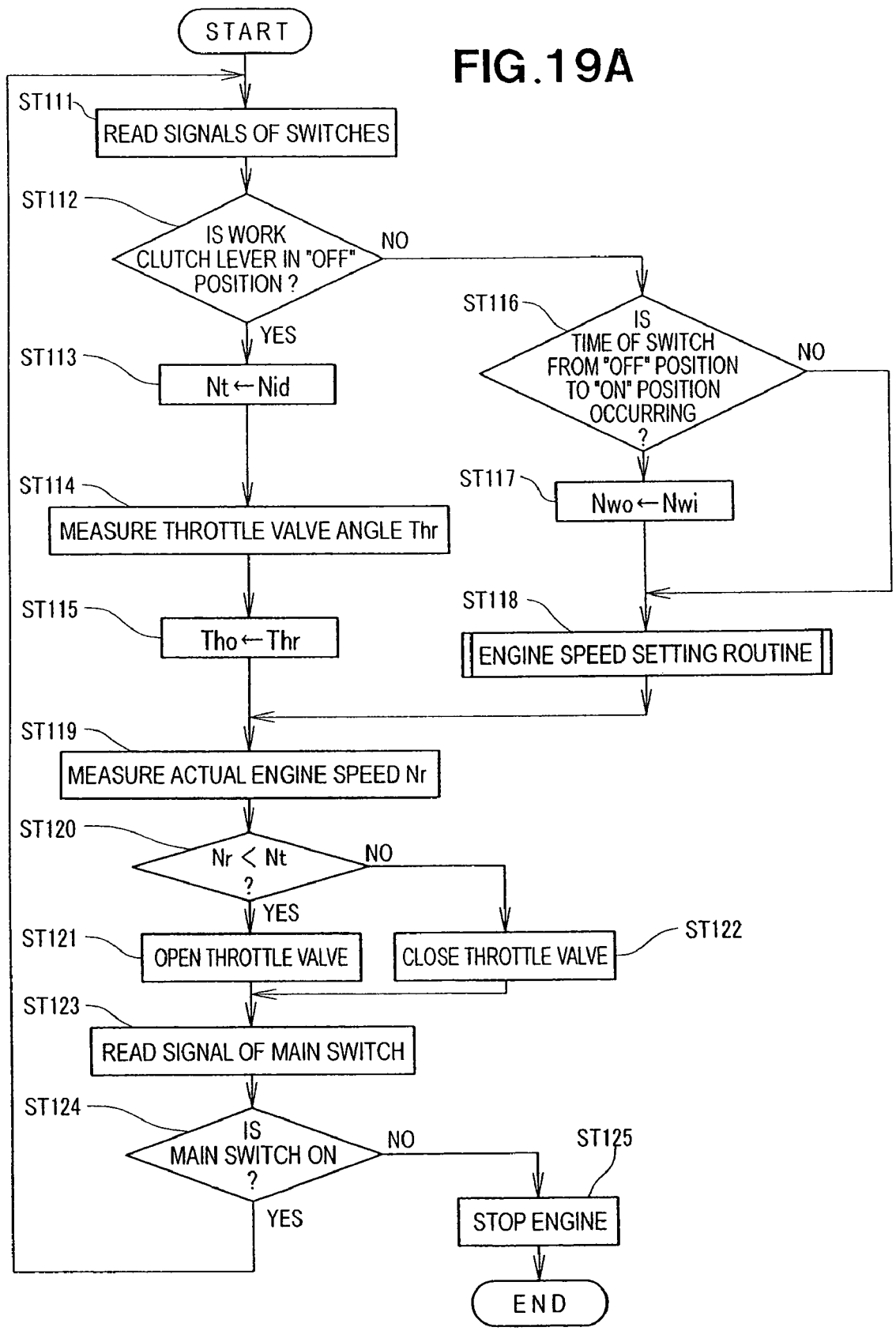
FIGS. 19A and 19B are control flowcharts of the control unit shown in FIG. 17.

FIG. 19A is a control flowchart (main routine) for the control unit 89 according to the third embodiment, and shows the basic control flow whereby the control unit 89 executes the "engine speed control routine" of step ST07 shown in FIG. 9.

ST111: The signal of the work clutch operation detection sensor 68 is read.

ST112: An assessment is made as to whether the work clutch lever 41 is in the "off" position, and when the result is YES, the "idle mode" is determined to be in effect, and the process proceeds to ST113. When the result is NO, the "work mode" is determined to be in effect, and the process proceeds to ST116. As shown in FIG. 7, the position of the work clutch lever 41 when the operator removes his hand from the work clutch lever 41 is the "off" position. The position of the work clutch lever 41 is determined according to the detection signal of the work clutch operation detection sensor 68.

ST113: Since the rotation control mode of the engine 14 is transferred to the "idle mode," the target engine speed Nt of the engine 14 is set to the idling target value Nid. The idling target value Nid is a specific preset engine speed that corresponds to the speed of the engine 14 in the idling state. The idling target value Nid has the same value as the low target engine speed NL (see FIG. 3 and ST13 of FIG. 10) of the first embodiment.

ST114: The angle Thr of the throttle valve 92 is measured by the throttle angle sensor 85.

ST115: After the "former throttle angle Tho" whose initial value is 0 measured in ST114 is updated to the new angle Thr (new angle Thr) value, the process proceeds to ST119. In other words, the "new angle Thr" obtained in ST114 is stored in memory as the "former throttle angle Tho."

ST116: Since the rotation control mode of the engine 14 is the "work mode," an assessment is made as to whether the time is the time at which the work clutch lever 41 is switched from the "off" position to the "on" position, and when the result is YES, the process proceeds to ST117. When the result is NO, the process proceeds to ST118. A determination of YES is made when the time is the moment at which the work clutch lever 41 is switched on. A determination of NO is made when the "on" operation of the work clutch lever 41 is continuing from a prior time.

ST117: The "former target value Nwo during work" is initially set to the value of a certain preset "work-time initial target value Nwi," and the process proceeds to ST118. The initial value of the "former target value Nwo during work" is thus set to the work-time initial target value Nwi only at the time the work clutch lever 41 is placed in the "on" position. The former target value Nwo during work is used in ST205, ST206, ST209, and ST210 of FIG. 20 described hereinafter.

Figure 20:
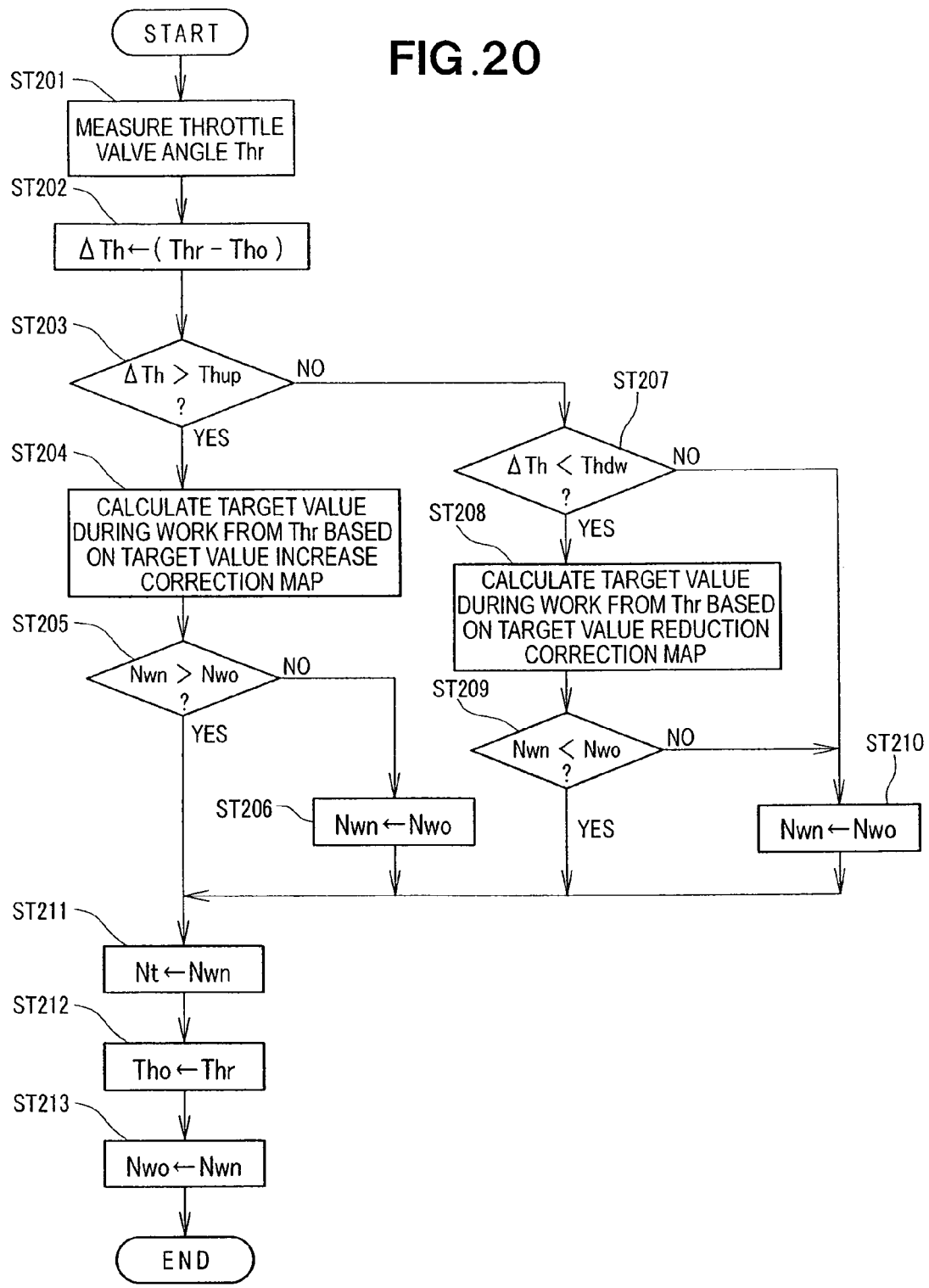
FIG. 20 is a detailed control flowchart of the execution of the steps in the engine speed setting routine shown in FIGS. 19A and 19B.

ST118: The "engine speed setting routine" is executed, whereby the target engine speed Nt of the engine 14 in the work mode is set, and the process then proceeds to ST119. The subroutine for specifically executing ST118 is shown in FIG. 20 described hereinafter.

ST119: The actual engine speed Nr of the engine 14 is measured by the engine rotation sensor 86.

ST120: An assessment is made as to whether the actual engine speed Nr is lower than the target engine speed Nt that was set in ST113 or ST118, and when the result is YES, the process proceeds to ST121. When the result is NO, the process proceeds to ST122.

ST121: The control motor 83 is driven in the positive rotation direction, whereby the throttle valve 92 is opened. As a result, the actual engine speed Nr increases.

ST122: The control motor 83 is driven in the negative rotation direction, whereby the throttle valve 92 is closed. As a result, the actual engine speed Nr decreases.

ST123: The switch signal of the main switch 64 is read.

ST124: An assessment is made as to whether the main switch 64 is on, and when the result is YES, a determination is made to continue operation of the engine 14, and the process returns to ST111. When the result is NO, a determination is made that a stop command has been issued for the engine 14, and the process proceeds to ST125.

ST125: After the engine 14 is stopped, control according to the control flow described above is ended.

A modified example configuration may be adopted in the third embodiment in which the rotation mode switch 65 of the first embodiment shown in FIGS. 1 and 2 is included without modification. The structure of the first embodiment shown in FIGS. 1 and 2 is used in the modification of the third embodiment. However, the structure of the control unit 89 is modified.

In the modification of the third embodiment, the control modes whereby the control unit 89 controls the speed of the engine 14 include the following three general rotation control modes: an "idle mode," a "quiet mode," and a "power mode," the same as in the first embodiment.

Figure 19B:
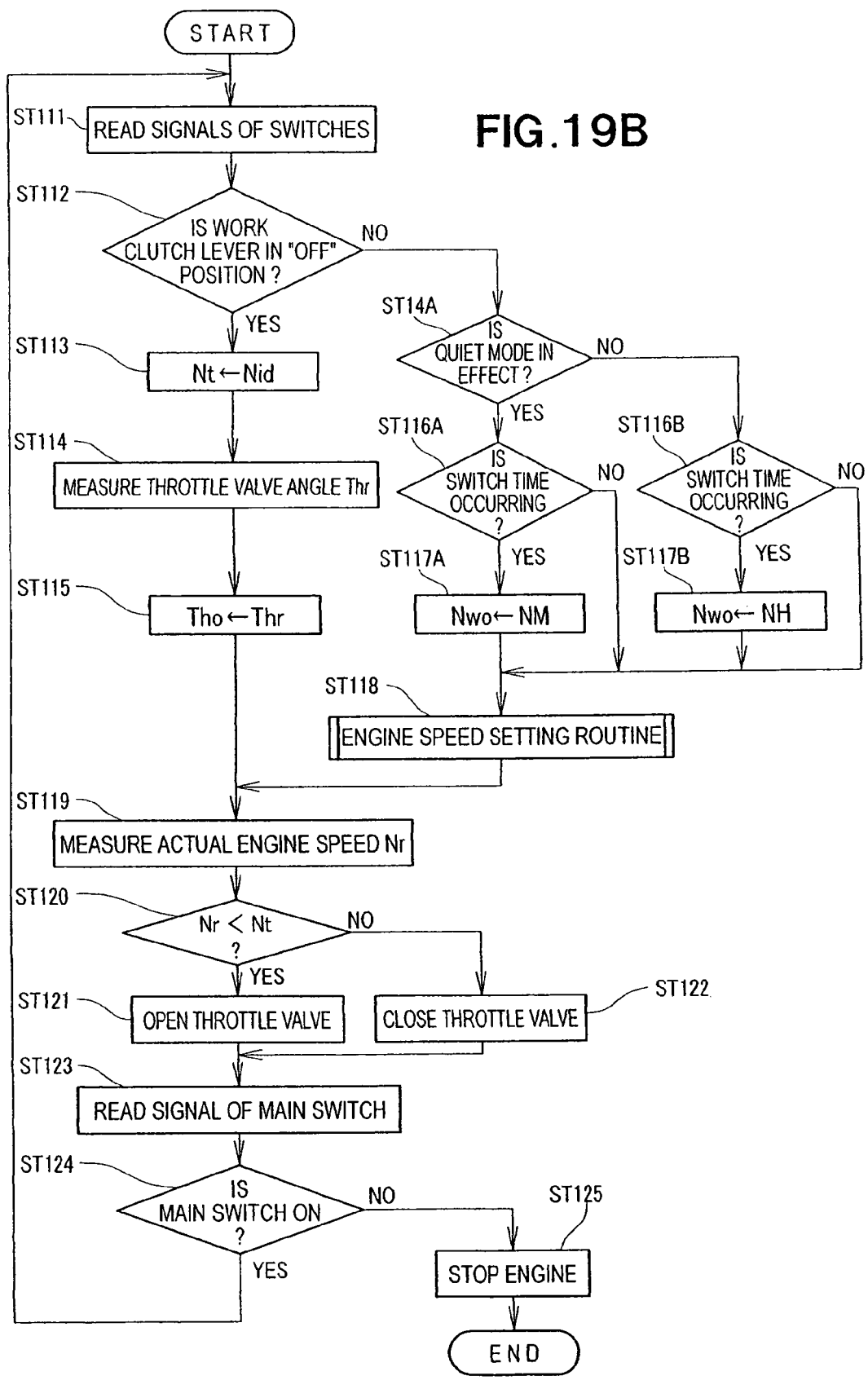

FIG. 19B is a flowchart of the control (main routine) performed by the control unit 89 of the modification of the third embodiment. In this modification, ST14A, ST116A, ST116B, ST117A, and ST117B shown in FIG. 19B are provided instead of ST116 through ST117 in the control flowchart shown in FIG. 19A.

ST111: The switch signals of the switches are read. Specifically, the signals of the rotation mode switch 65 and the work clutch operation detection sensor 68 are read.

ST112: An assessment is made as to whether the work clutch lever 41 is in the "off" position, and when the result is YES, a determination is made that the "idle mode" is in effect, and the process proceeds to ST113. When the result is NO, the process proceeds to ST14A.

ST113: Same as ST113 shown in FIG. 19A.

ST114: Same as ST114 shown in FIG. 19A.

ST115: After the "former throttle angle Tho" whose initial value is 0 measured in ST114 is updated to the new angle Thr (new angle Thr) value, the process proceeds to ST119.

ST14A: An assessment is made as to whether the rotation control mode of the engine 14 is the "quiet mode," and when the result is YES, the process proceeds to ST116A. When the result is NO, a determination is made that the "power mode" is in effect, and the process proceeds to ST116B. In ST14A, a determination of YES is made when the rotation mode switch 65 is on, and a determination of NO is made when the rotation mode switch 65 is off.

ST116A: An assessment is made as to whether a condition selected from the first condition and second condition described below is satisfied, and when the result is YES, the process proceeds to ST117A. When the result is NO, the process proceeds to ST118.

The first condition is that the time be one at which the work clutch lever 41 is switched from the "off" position to the "on" position. The second condition is that the time be one at which the rotation control mode is switched from the power mode to the quiet mode.

A determination of YES is made in ST116A only when the time is one which the work clutch lever 41 is turned on, or when the time is one which the rotation mode switch 65 is used to switch from the power mode to the quiet mode.

ST117A: The "former target value Nwo during work" is initially set to the value of a certain preset medium target engine speed NM, and the process proceeds to ST118. As in the first embodiment shown in FIG. 3, the medium target engine speed NM corresponds to the engine speed NM at which the engine 14 is substantially capable of generating the maximum torque Tmax. The former target value Nwo during work is used in ST205, ST206, ST209, and ST210 of FIG. 20 described hereinafter.

ST116B: An assessment is made as to whether a condition selected from the third condition and fourth condition described below is satisfied, and when the result is YES, the process proceeds to ST117B. When the result is NO, the process proceeds to ST118.

The third condition is that the time be one at which the work clutch lever 41 is switched from the "off" position to the "on" position. The fourth condition is that the time be one at which the rotation control mode is switched from the quiet mode to the power mode.

A determination of YES is made in ST116B only when the time is one at which the work clutch lever 41 is turned on, or when the time is one at which the rotation mode switch 65 is used to switch from the quiet mode to the power mode.

ST117B: The "former target value Nwo during work" is initially set to the value of a certain preset high target engine speed NH, and the process proceeds to ST118. As in the first embodiment shown in FIG. 3, the high target engine speed NH corresponds to the engine speed NH at which the engine 14 is substantially capable of generating the maximum output Pmax. The former target value Nwo during work is used in ST205, ST206, ST209, and ST210 of FIG. 20 described hereinafter.

ST118: The "engine speed setting routine" is executed, whereby the target engine speed Nt of the engine 14 in the quiet mode or power mode is set, and the process then proceeds to ST119. The subroutine for specifically executing ST118 is shown in FIG. 20 described hereinafter.

ST119 through ST125: The same as ST119 through ST125 shown in FIG. 19A.

The specific control flow whereby the control unit 89 executes the routine shown in ST118 (see FIGS. 19A and 19B) for setting the speed of the engine 14 will next be described based on FIG. 20.

FIG. 20 is a flowchart of the control (subroutine) performed by the control unit 89 of the third embodiment.

ST201: The angle Thr of the throttle valve 92 is measured by the throttle angle sensor 85.

ST202: The former throttle angle Tho is subtracted from the new angle Thr to calculate the difference between the former throttle angle Tho and the new angle Thr, i.e., the throttle angle difference $\Delta Th$ ($\Delta Th = Thr - Tho$). It is apparent that the throttle angle difference $\Delta Th$ is a negative (minus) value when the new angle Thr is smaller than the former throttle angle Tho.

The "new angle Thr" is the new angle Thr of the throttle valve 92 measured in ST201 when "the current cycle" of the control flow shown in FIG. 20 is executed.

The "former throttle angle Tho" is the original angle of the throttle valve 92 measured in ST201 when "a prior cycle" of the control flow shown in FIG. 20 is executed. However, the "former throttle angle Tho" obtained in ST115 (see FIGS. 19A and 19B) is used as the "former throttle angle Tho" in ST202 as an exception only when a determination of NO is made in ST112 (see FIGS. 19A and 19B).

ST203: An assessment is made as to whether the throttle angle difference ΔTh is larger than an "angle difference reference value Thup during an increase" (ΔTh>Thup), and when the result is YES, the process proceeds to ST204. When the result is NO, the process proceeds to ST207. The "angle difference reference value Thup during an increase" is a certain "positive (plus)" value that is preset as a determination reference when a determination is made as to whether to increase the speed of the engine 14.

ST204: The new target value Nwn during work (new target value Nwn during work, i.e., new target engine speed Nwn) of the engine 14 is calculated from the angle Thr of the throttle valve 92 measured in ST201 on the basis of a target value increase correction map. The details of the target value increase correction map will be described hereinafter based on FIG. 21.

ST205: An assessment is made as to whether the new target value Nwn during work is larger than the former target value Nwo during work (Nwn>Nwo), and when the result is YES, the process proceeds to ST211. When the result is NO, the process proceeds to ST206. The term "former target value Nwo during work" herein refers to the previously calculated target value (target engine speed) of the engine 14 during work.

ST206: Since "Nwn<Nwo" in ST205, the new target value Nwn during work is updated to the former target value Nwo during work, after which the process proceeds to ST211.

ST207: An assessment is made as to whether the throttle angle difference ΔTh is smaller than an "angle difference reference value Thdw during a reduction" (ΔTh<Thdw), and when the result is YES, the process proceeds to ST208. When the result is NO, the process proceeds to ST210. The "angle difference reference value Thdw during a reduction" is a certain "negative (minus)" value that is preset as a determination reference when a determination is made as to whether to reduce the speed of the engine 14.

ST208: The new target value Nwn during work (new target value Nwn during work, i.e., new target engine speed Nwn) of the engine 14 is calculated from the angle Thr of the throttle valve 92 measured in ST201 on the basis of a target value reduction correction map. The details of the target value reduction correction map will be described hereinafter based on FIG. 21.

ST209: An assessment is made as to whether the new target value Nwn during work is smaller than the former target value Nwo during work (Nwn<Nwo), and when the result is YES, the process proceeds to ST211. When the result is NO, the process proceeds to ST210.

Since "Thdw≦ΔTh≦Thup" in ST203 and ST207, or "Nwn≧Nwo" in ST209, the new target value Nwn during work is updated to the former target value Nwo during work, after which the process proceeds to ST211.

ST211: The target engine speed Nt of the engine 14 is updated to the new target value Nwn during work.

ST212: The former throttle angle Tho is updated to the new angle Thr measured in ST201.

ST213: The former target value Nwo during work is updated to the new target value Nwn during work, after which the control according to the control flow of FIG. 20 is ended.

The target value increase correction map and the target value decrease correction map will next be described based on FIG. 21.

Figure 21:
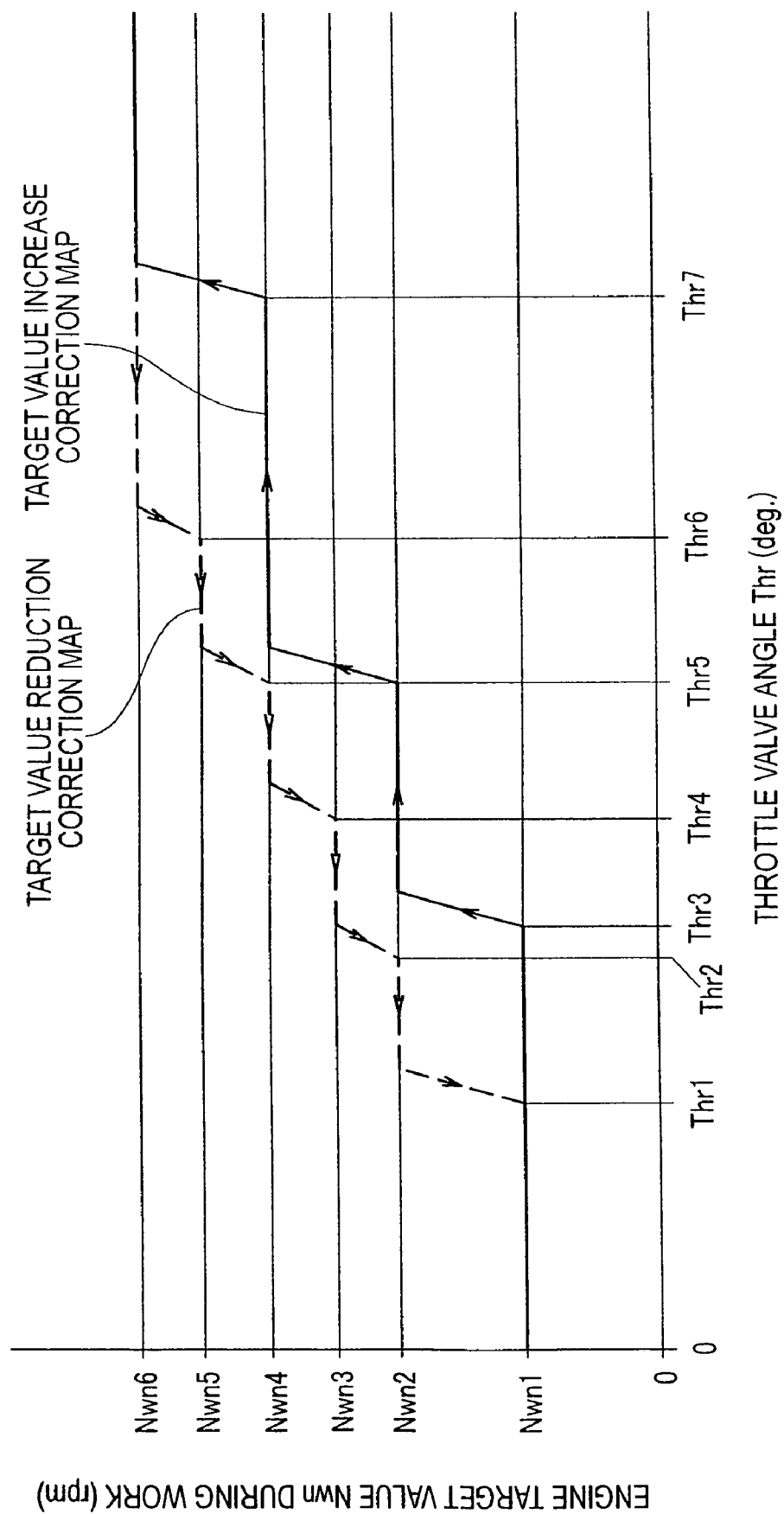
FIG. 21 shows a target value increase correction map and a target value reduction correction map used in the control flowchart shown in FIG. 20.

FIG. 21 is used to describe a target value increase correction map and a target value reduction correction map according to the present invention, and shows a target value increase correction map and a target value reduction correction map whereby a target value Nwn during work that corresponds to the angle Thr is obtained. The horizontal axis in FIG. 21 indicates the throttle valve angle Thr (deg.), and the vertical axis indicates the target value Nwn (rpm) of the engine during work.

In FIG. 21, the angle Thr of the throttle valve 92 (see FIG. 17) is set to seven values that increase in the sequence Thr1, Thr2, Thr3, Thr4, Thr5, Thr6, Thr7.

The target value Nwn of the engine 14 during work (see FIG. 17) is set to six values that increase in the sequence Nwn1, Nwn2, Nwn3, Nwn4, Nwn5, Nwn6.

The interval from Nwn1 to Nwn2 is approximately the same as the interval from Nwn2 to Nwn4 and the interval from Nwn4 to Nwn6. The value of Nwn3 is midway between Nwn2 and Nwn4. The value of Nwn5 is midway between Nwn4 and Nwn6. The intervals between Nwn2, Nwn3, Nwn4, Nwn5, and Nwn6 are therefore small.

The characteristics of the target value increase correction map indicated by the solid line are set so that the target value Nwn of the engine 14 during work increases in stepwise fashion as the angle Thr of the throttle valve 92 increases.

Specifically, the target value increase correction map is a characteristic whereby the target value Nwn during work is set to the four incremental values described below. When the angle Thr is smaller than Thr3 (Thr<Thr3), the target value Nwn during work is set to Nwn1 (Nwn=Nwn1). When the angle Thr is smaller than Thr5 and greater than or equal to Thr3 (Thr3≦Thr<Thr5), the target value Nwn during work is set to Nwn2 (Nwn=Nwn2). In the same manner, when "Thr5≦Thr<Thr7," a setting of "Nwn=Nwn4" is made. When "Thr7≦Thr," a setting of "Nwn=Nwn6" is made.

A large interval value is set for both the prescribed amount of increase in the angle Thr (the intervals from Thr3 to Thr5 and Thr5 to Thr7), and the prescribed interval by which the target value Nwn during work is incrementally increased (the intervals from Nwn1 to Nwn2, Nwn2 to Nwn4, and Nwn4 to Nwn6).

The characteristics of the target value reduction correction map indicated by the dashed line are set so that the target value Nwn during work is incrementally reduced as the angle Thr decreases.

Specifically, the target value reduction correction map is a characteristic whereby the target value Nwn during work is set to the six incremental values described below. When the angle Thr is larger than Thr6 (Thr>Thr6), the target value Nwn during work is set to Nwn6 (Nwn=Nwn6). When the angle Thr is smaller than Thr6 and greater than or equal to Thr5 (Thr5≦Thr<Thr6), the target value Nwn during work is set to Nwn5 (Nwn=Nwn5). In the same manner, when "Thr4≦Thr<Thr5," a setting of "Nwn=Nwn4" is made. When "Thr2≦Thr<Thr4," a setting of "Nwn=Nwn3" is made. When "Thr1≦Thr<Thr2," a setting of "Nwn=Nwn2" is made. When "Thr<Thr1," a setting of "Nwn=Nwn1" is made.

Small incremental values are set for both the prescribed amount of reduction in the angle Thr (the intervals from Thr6 to Thr5, Thr5 to Thr4, Thr4 to Thr2, and Thr2 to Thr1), and the prescribed interval by which the target value Nwn during work is incrementally reduced (the intervals from Nwn6 to Nwn5, Nwn5 to Nwn4, and Nwn4 to Nwn4, and Nwn3 to Nwn2).

As is apparent from the description given above, the target value increase correction map and the target value reduction correction map have hysteresis characteristics with respect to each other. The angle Thr in the target value increase correction map is set in a range from Thr3 to Thr7, and is 20 deg., for example. The angle Thr in the target value reduction correction map is set in a range of Thr1 to Thr6, and is 15 deg., for example.

Since the intervals between the plurality of increments Nwn1, Nwn2, Nwn4, and Nwn6 are set to large values in advance, a target value Nwn during work (target engine speed Nt) having a larger value can be selected when the angle Thr of the throttle valve 92 is increased by a sudden increase in the load on the engine 14. The actual engine speed Nr can therefore be further increased, which results in the ability to further increase the engine output. Accordingly, a sudden increase in the load on the implement 15 during work can be responded to more quickly. The working properties can be further improved, and the quality of work performed by the implement 15 can be stabilized in cases in which the load on the implement 15 suddenly increases.

According to the target value reduction correction map, the target value Nwn during work can be gradually reduced in small increments when the load on the engine 14 decreases. A reduction in engine noise can therefore be anticipated by reducing the engine speed while providing an adequate response when the load on the engine 14 decreases.

As shown in FIG. 20, the throttle angle difference ΔTh calculated in ST202 markedly varies when there is significant variation in the load on the engine 14. As a result, the determinations made in ST203 and ST207 frequently change. Therefore, there can sometimes be frequent transitions, i.e., hunting, between the target value Nwn during work that is set in ST204 and the target value Nwn during work that is set in ST208.

Hysteresis between the increase characteristics of the target value increase correction map and the reduction characteristics of the target value reduction correction map is therefore provided in the third embodiment. Furthermore, the range in which the angle Thr is set in the characteristics of the target value reduction correction map is larger than in the characteristics of the target value increase correction map, and the number of increments in which the target value Nwn during work is set is also increased to six. Accordingly, it is possible to adequately restrict situations in which a transmission is made to setting the target value Nwn during work in accordance with the target value increase correction map while the target value Nwn during work is being set according to the target value reduction correction map.

There are therefore no sudden changes in the actual engine speed Nr of the engine 14 during work. In other words, hunting of the actual engine speed Nr can be prevented. Accordingly, since the state of work by the implement 15 can be maintained to the extent possible, the quality of work performed by the implement 15 can be improved. In a walk-behind lawnmower 10, for example, the results obtained when performing grass cutting work can be even further improved.

The descriptions of the third embodiment and its modification according to the third embodiment are summarized below (see FIG. 17).

As shown in FIGS. 19A and 20, the control unit 89 of the third embodiment specifies a target engine speed Nwi from among a plurality of incrementally set target engine speeds Nt (Nid, NWi) when the work clutch lever 41 is turned on (see ST112, ST116, ST117, and ST211).

As shown in FIGS. 19B and 20, the control unit 89 according to the modification of the third embodiment specifies a target engine speed NM or NH from among a plurality of incrementally set target engine speeds Nt (Nid, NM, NH) when the work clutch lever 41 is turned on.

The control unit 89 of the third embodiment shown in FIG. 19A and the modification shown in FIG. 19B also controls the opening and closing of the throttle valve 92 so that the actual engine speed Nr conforms to the specified target engine speed Nt (Nwi, NM, or NH) (see ST119 through ST122).

When the opening and closing of the throttle valve 92 is controlled, the angle Thr sharply increases according to an increase in the load on the engine 14. As shown in FIG. 20, when the throttle angle difference ΔTh is larger than a certain value Thup, the control unit 89 incrementally increases the specified target engine speed Nt by a prescribed value each time the angle Thr increases by a prescribed amount (see ST203, ST204, ST211, and the target value increase correction map of FIG. 21).

In other words, the control unit 89 determines that the load on the engine 14 has increased in accordance with the increase of the angle Thr, and selects a target engine speed Nt (a value selected from the values Nwn1, Nwn2, Nwn4, and Nwn6 in the target value increase correction map) that has a large value commensurate with the increase in load.

The control unit 89 also controls the opening and closing of the throttle valve 92 so that the actual engine speed Nr conforms to the large target engine speed Nt. The engine output increases according to the increase of the actual engine speed Nr. As a result, the rotation of the implement 15 also increases. Accordingly, the working efficiency of the engine-driven work machine 10 can be increased, and work can be performed stably. There is therefore no need for the operator to operate a throttle lever and to finely adjust the target engine speed, as in the prior art.

In the same manner, when the opening and closing of the throttle valve 92 are controlled, the angle Thr of the throttle valve 92 sharply decreases according to a decrease in the load on the engine 14. As shown in FIG. 20, when the throttle angle difference ΔTh is smaller than a certain value Thdw, the control unit 89 incrementally reduces the specified target engine speed Nt (see ST207, ST208, ST211, and the target value reduction correction map of FIG. 21).

In other words, the control unit 89 determines that the load on the engine 14 has decreased in accordance with the decrease of the angle Thr, and selects a target engine speed Nt (a value selected from the values that range from Nwn1 to Nwn6 in the target value reduction correction map) that has a small value commensurate with the decrease in load.

The control unit 89 also controls the opening and closing of the throttle valve 92 so that the actual engine speed Nr conforms to the small target engine speed Nt. The engine output gradually decreases according to the decrease of the actual engine speed Nr. The actual engine speed Nr can thus be gradually reduced.

Accordingly, since the rotational speed of the implement 15 and the engine output can be gradually reduced, the working properties can be further improved, and the quality of work performed by the implement 15 can be stabilized. In a walk-behind lawnmower 10, for example, good results can be consistently obtained when performing grass cutting work. The working efficiency of the engine-driven work machine 10 is thus increased, and work can be performed stably.

Furthermore, since the rotational speed decreases, less noise is generated by the engine-driven work machine 10, and the work environment can be improved. There is also no need for the operator to operate a throttle lever and to finely adjust the target engine speed, as in the prior art.

A fourth embodiment will next be described based on FIGS. 22 through 34 using a walk-behind lawnmower as an example of the engine-driven work machine. The same reference symbols are used for structures and actions in the fourth embodiment that are the same as those of the first embodiment shown in FIGS. 1 through 11, and a description thereof is omitted.

Figure 22:
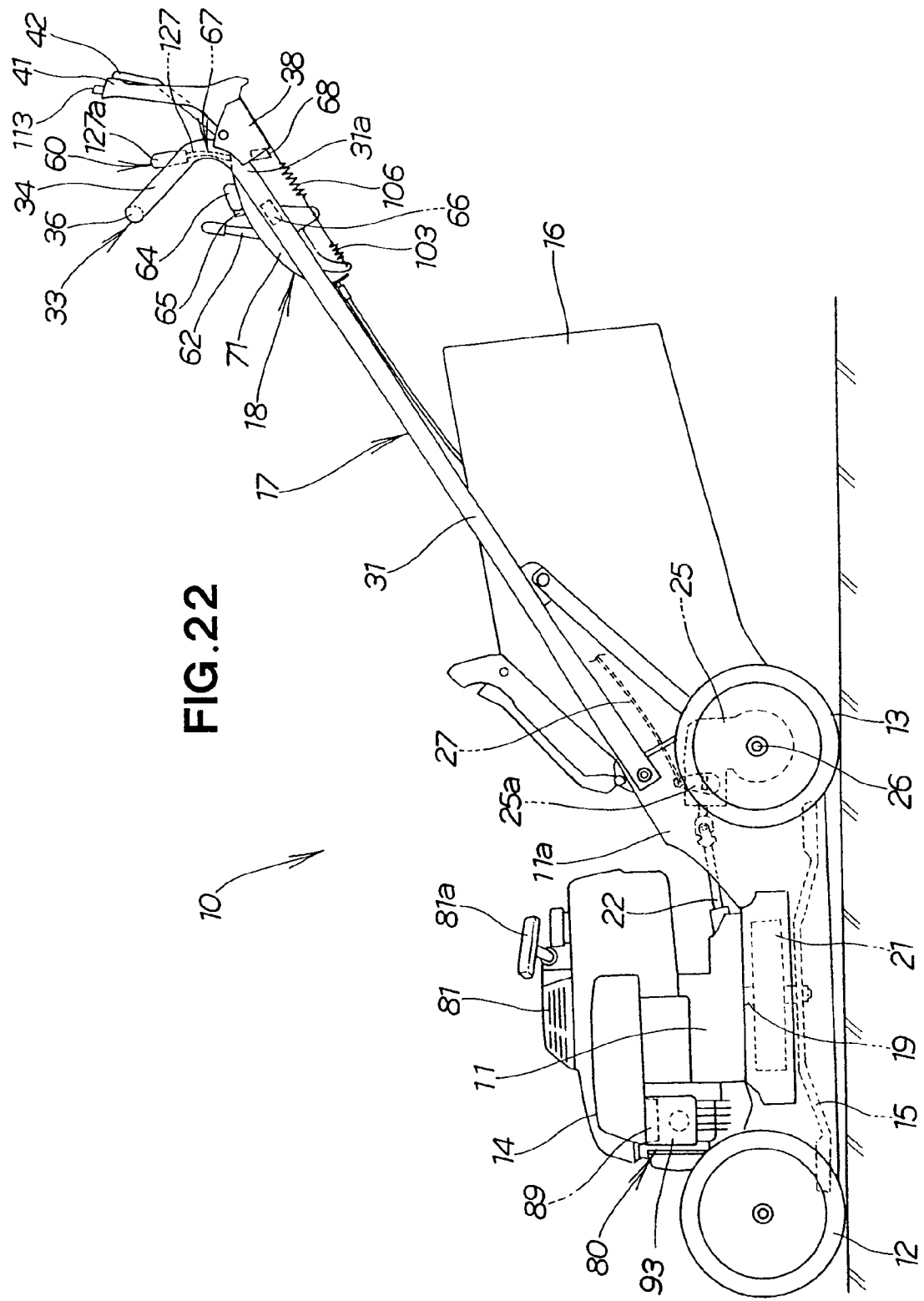
FIG. 22 is a side elevational view of an engine-driven work machine according to a fourth embodiment of the present invention.
Figure 23:
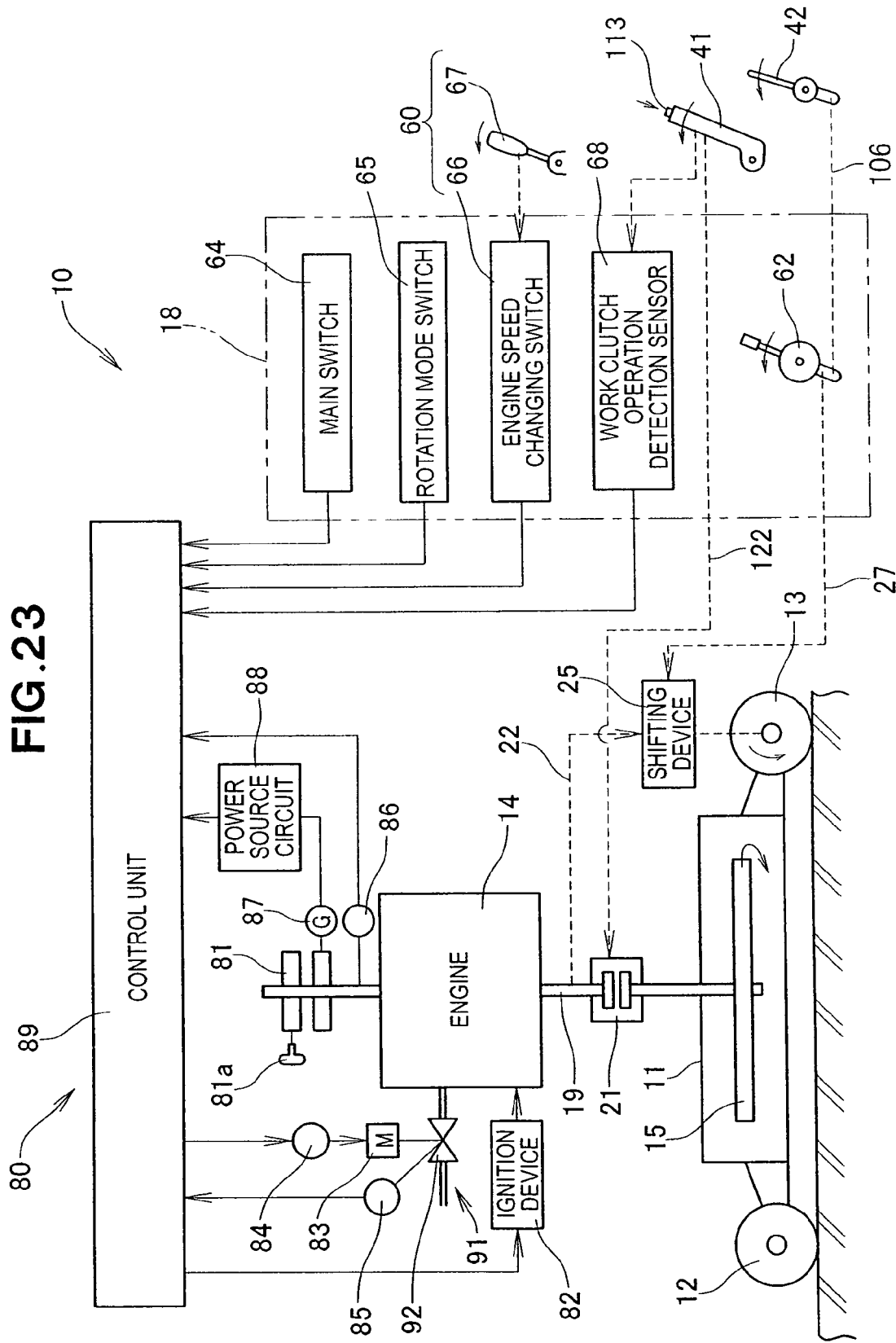
FIG. 23 is a schematic system diagram of the engine-driven work machine shown in FIG. 22.

As shown in FIGS. 22 and 23, the walk-behind lawnmower 10 of the fourth embodiment has substantially the same basic structure as that of the first embodiment. Characteristic features of the walk-behind lawnmower 10 of the fourth embodiment are that a target engine speed change operation unit 60 is added to the operating unit 18 in the first embodiment, and the structure of the control unit 89 is modified.

The control unit 89 of the fourth embodiment receives the signals of the main switch 64, the rotation mode switch 65, an engine speed changing switch 66, the work clutch operation detection sensor 68, the throttle angle sensor 85, and the engine rotation sensor 86, and controls the engine 14.

As shown in FIGS. 22 and 23, the operating unit 18 of the fourth embodiment is provided with a target engine speed change operation unit 60 (target engine speed changing unit 60). The target engine speed changing unit 60 issues a temporary change command to incrementally and temporarily change the target engine speed of the engine 14 according to a human operation, and is composed of an engine speed changing switch 66 and a boost lever 67.

The boost lever 67 is an auto-returning member that automatically returns to the original position when the hand is removed from the lever during operation. The engine speed changing switch 66 switches according to the operation of the boost lever 67. For example, the engine speed changing switch 66 turns on when the boost lever 67 is operated, and turns off when the boost lever 67 is returned to the original position.

Figure 24:
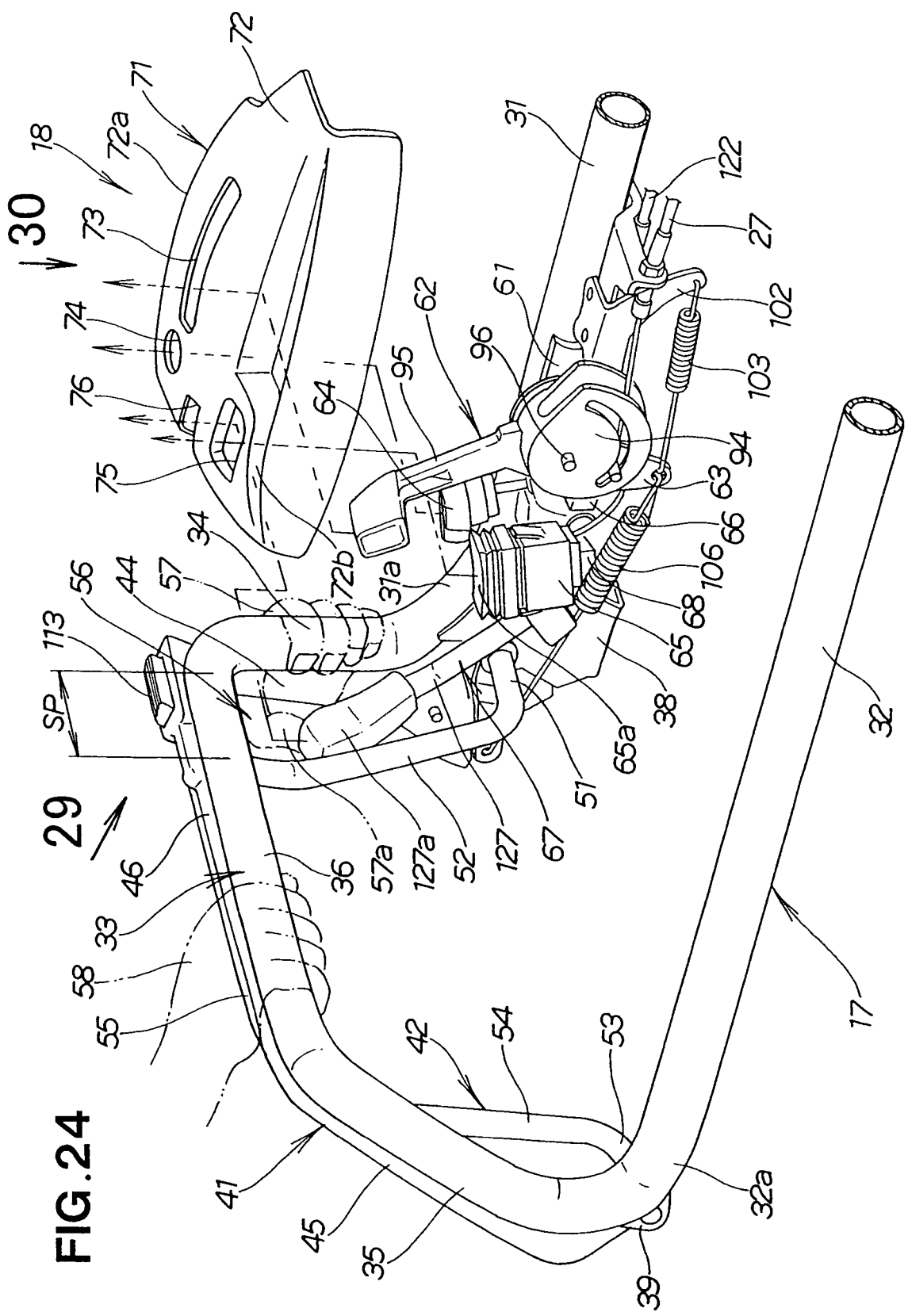
FIG. 24 is a perspective view showing the area surrounding the rear portion of the handle shown in FIG. 22, as seen from the upper right.
Figure 25:
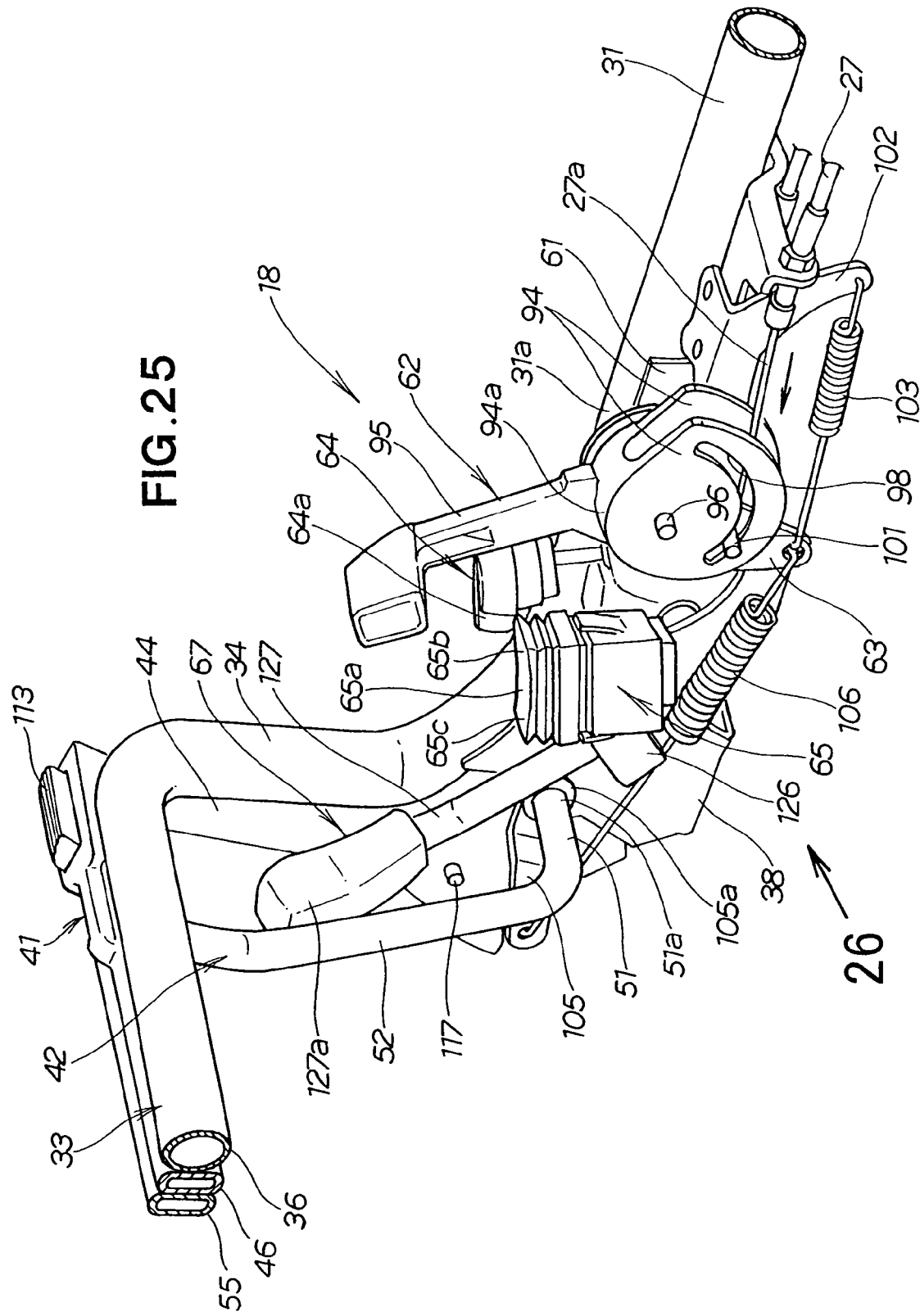
FIG. 25 is an enlarged view of the area surrounding the left rear portion of the handle shown in FIG. 24.
Figure 26:
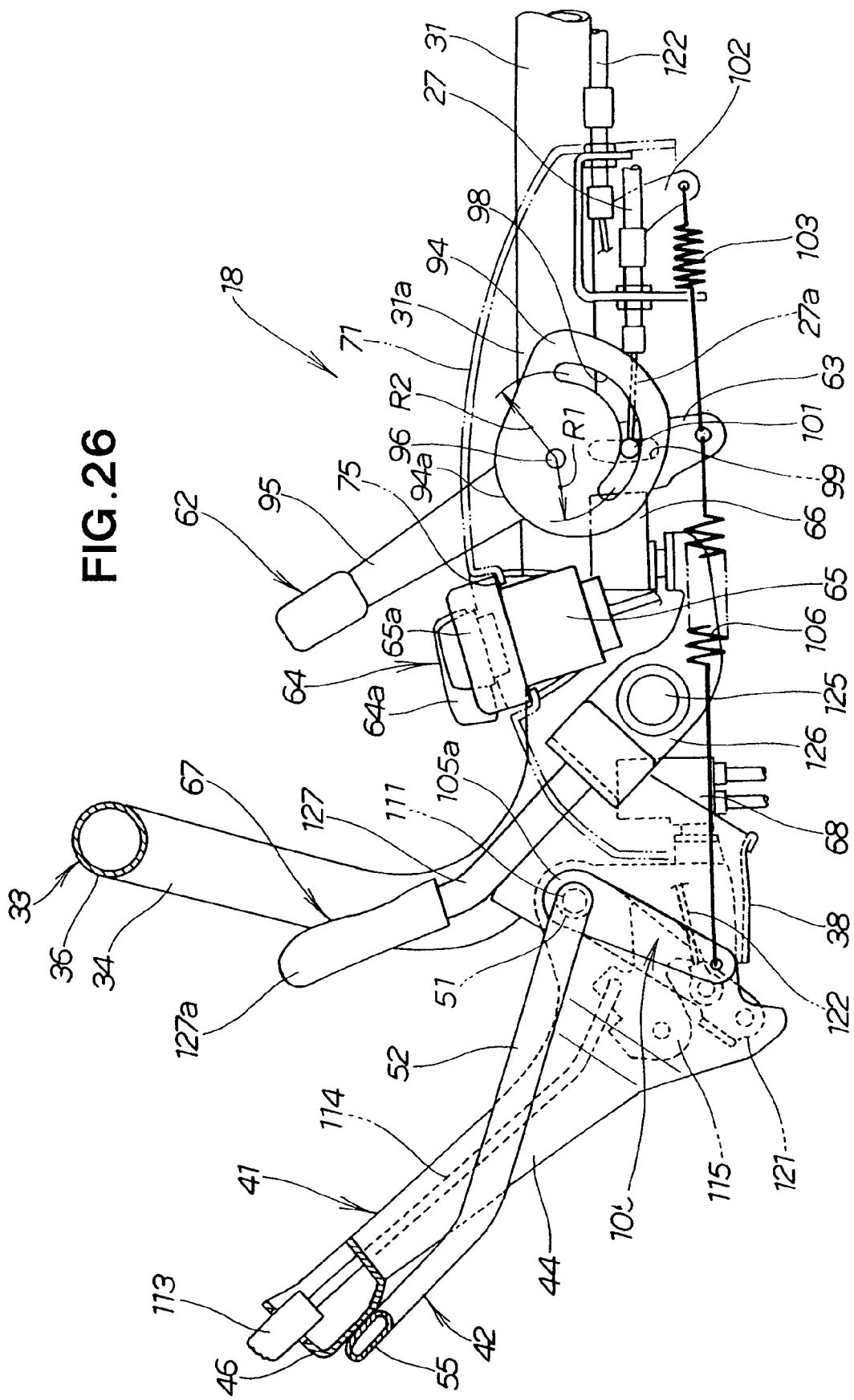
FIG. 26 is a view showing the area surrounding the left rear portion of the handle shown in FIG. 25, as seen from the direction of arrow 26.

As shown in FIGS. 24 through 26, the boost lever 67 is disposed in the vicinity of the rear end portion 31a in the left handlebar 31 and in the vicinity of the left grip leg portion 34.

Figure 27:
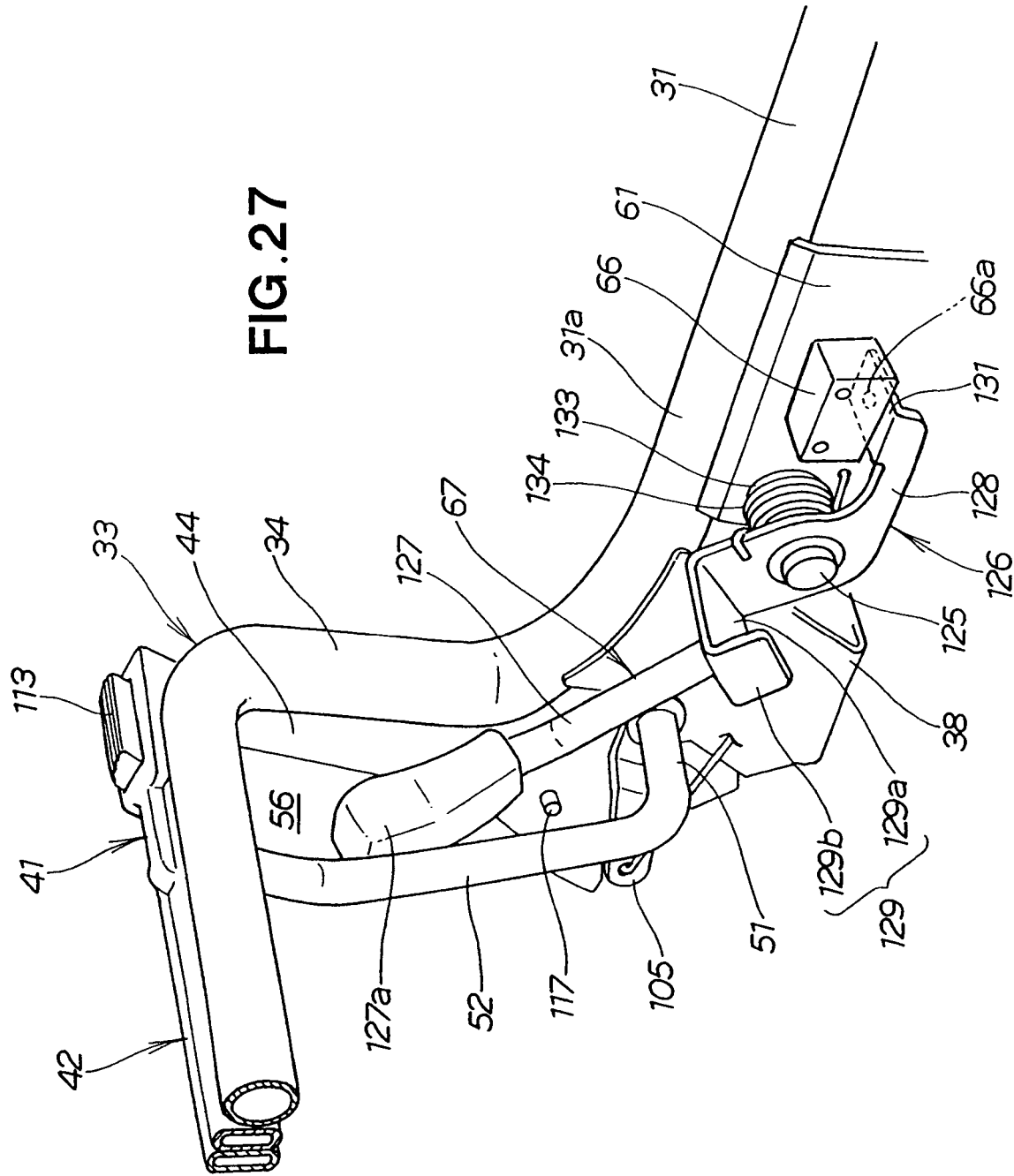
FIG. 27 is a perspective view showing a relationship between the handle of FIG. 25 and the engine speed changing switch and boost lever.
Figure 28:
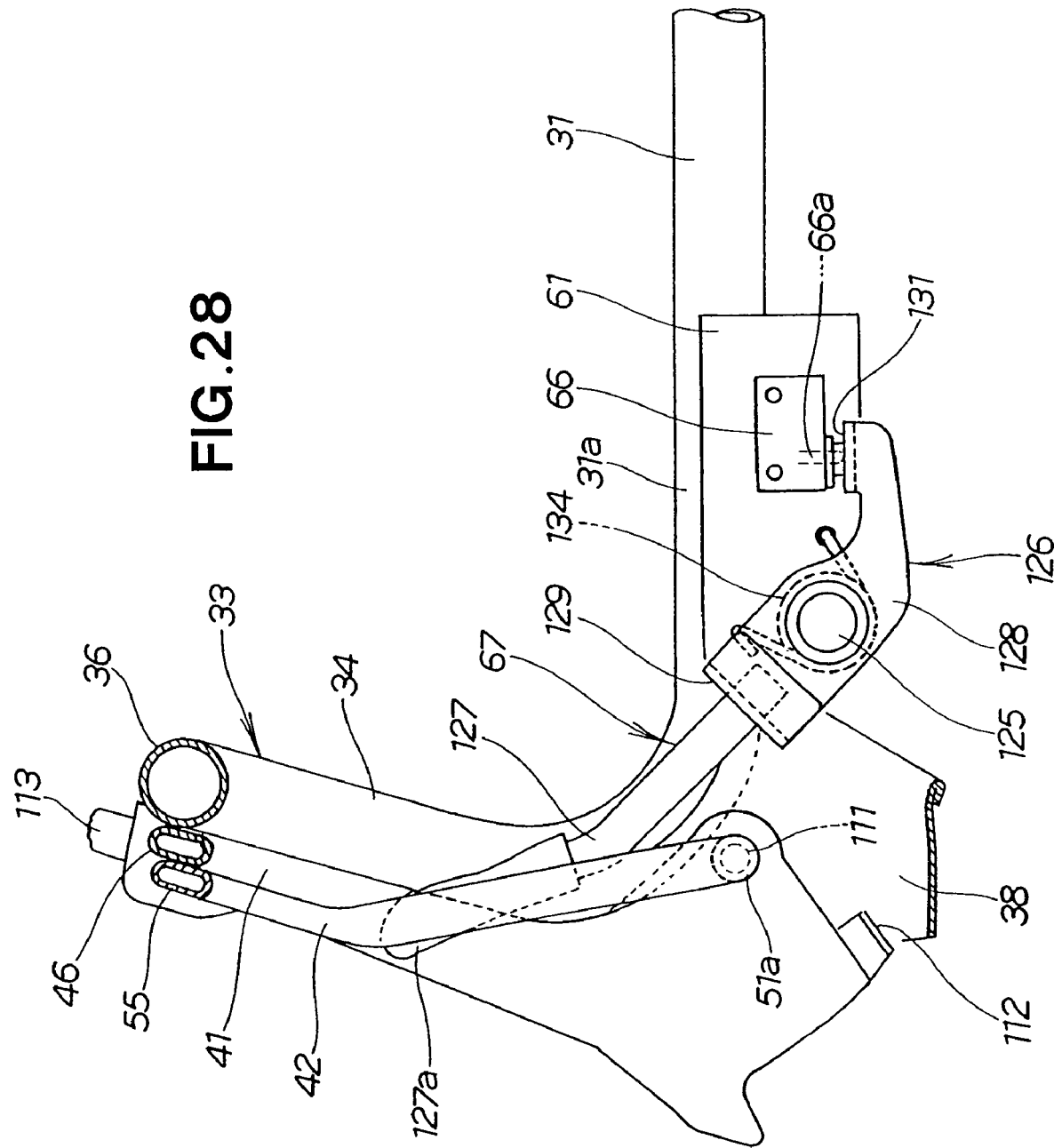
FIG. 28 is a is a side view showing the relationship between the handle shown in FIG. 27 and the engine speed changing switch and boost lever.

Specifically, the shift lever mounting bracket 61 has a cylindrical boss 133, as shown in FIGS. 27 and 28. The boss 133 is provided with a support pin 125. The boost lever 67 is composed of an arm portion 126 and an operating lever portion 127. The arm portion 126 is composed of an arm plate 128, a mounting portion 129, and a pressing plate 131.

The center portion of the arm plate 128 is attached to the support pin 125 so as to be able to swing forward and backward, and is urged in the counterclockwise direction of FIG. 28 by a torsion spring 134 (return spring).

The mounting portion 129 is integrally with the elongated end of a portion of the arm plate 128 that extends upward and to the rear from the center portion of the arm plate 128. The mounting portion 129 is a substantially L-shaped member that has a horizontal flat portion 129a folded in the width direction of the machine body from the upper end of the arm plate 128, and that also has a folded portion 129b that is folded forward and down from the end of the flat portion 129a. The operating lever portion 127 extends upward and to the rear from the flat portion 129a and has a grip 127a at the distal end thereof.

The pressing plate 131 is integrally with the elongated end of a portion of the arm plate 128 that extends forward from the center portion of the arm plate 128. The pressing plate 131 is a horizontal portion that is folded toward the shift lever mounting bracket 61 from the end of the arm plate 128.

The engine speed changing switch 66 is disposed in front of the boost lever 67 in a position that faces the pressing plate 131. The engine speed changing switch 66 is composed, for example, of a limit switch that is provided with a pushrod 66a. The pushrod 66a is disposed in a downward orientation opposite the pressing plate 131. The contact of the limit switch is "on" when the pushrod 66a is in a released state, and the contact switches "off" when the pushrod 66a is pushed in by the pressing plate 131.

As described above, the boost lever 67 is urged in the counterclockwise direction by the torsion spring 134. The pressing plate 131 is therefore retained in a state in which the pushrod 66a is pushed in.

Figure 29:
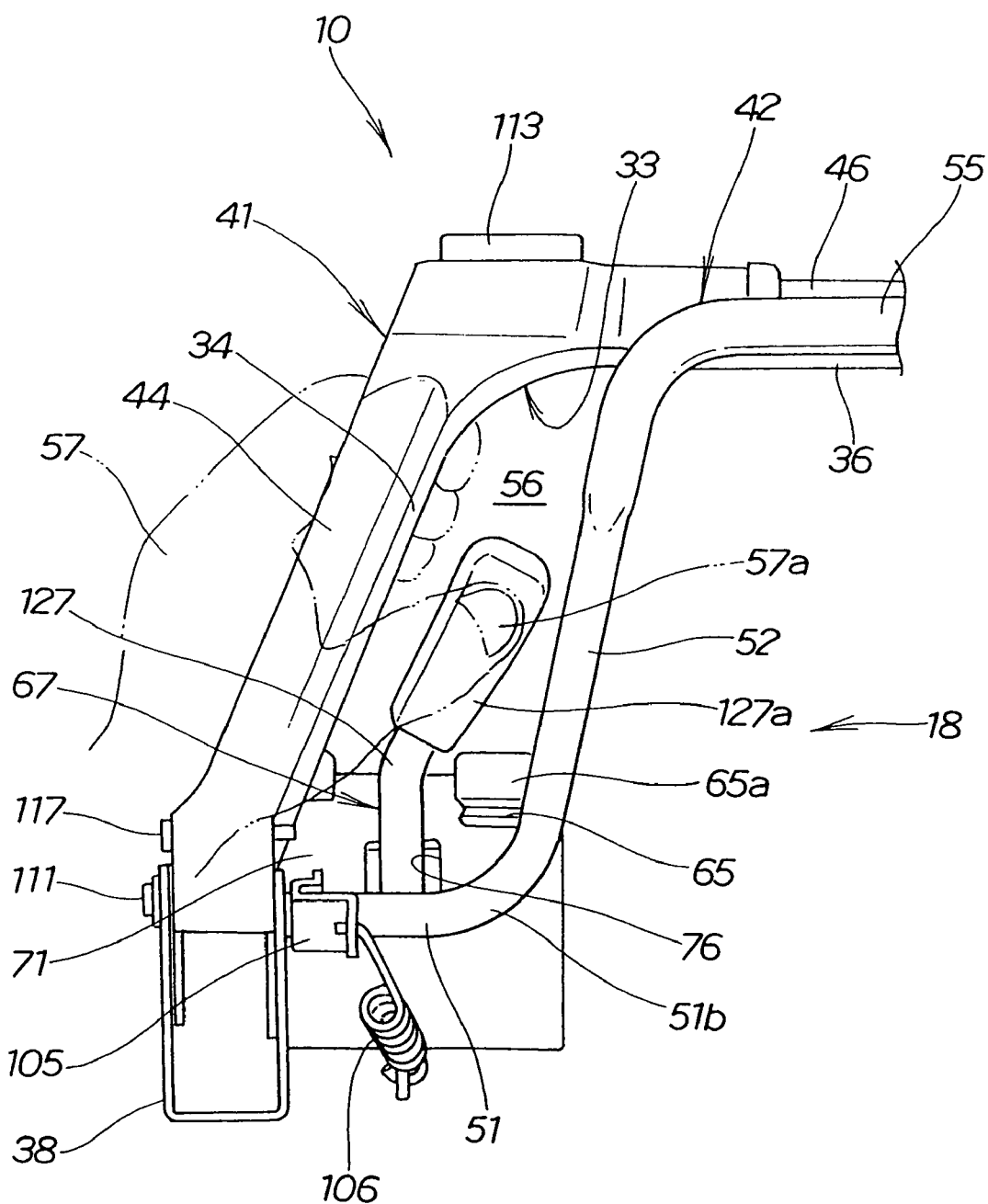
FIG. 29 is a view showing the area surrounding the left rear portion of the handle shown in FIG. 24, as seen from the direction of arrow 29.

The relationship of the position of the operating lever portion 127 with respect to the grip portion 33 of the handle 17 is as follows. As shown in FIGS. 24, 28, and 29, the grip 127a of the boost lever 67 is disposed in the operating space 56. The distal end of the grip 127a is positioned slightly further to the rear than the left grip leg portion 34. In other words, the boost lever 67 is disposed in a position that is adjacent to the rotation mode switch 65 so as to be operable by a left hand 57 grasping the left grip leg portion 34 of the grip portion 33.

Therefore, when the operator is grasping the left grip leg portion 34 with his left hand 57, the operator can hang his thumb 57a on the grip 127a by moving his thumb 57a into the operating space 56 from behind the grip portion 33. In this state, the grip 127a can be pushed forward by the thumb 57a.

Figure 30:
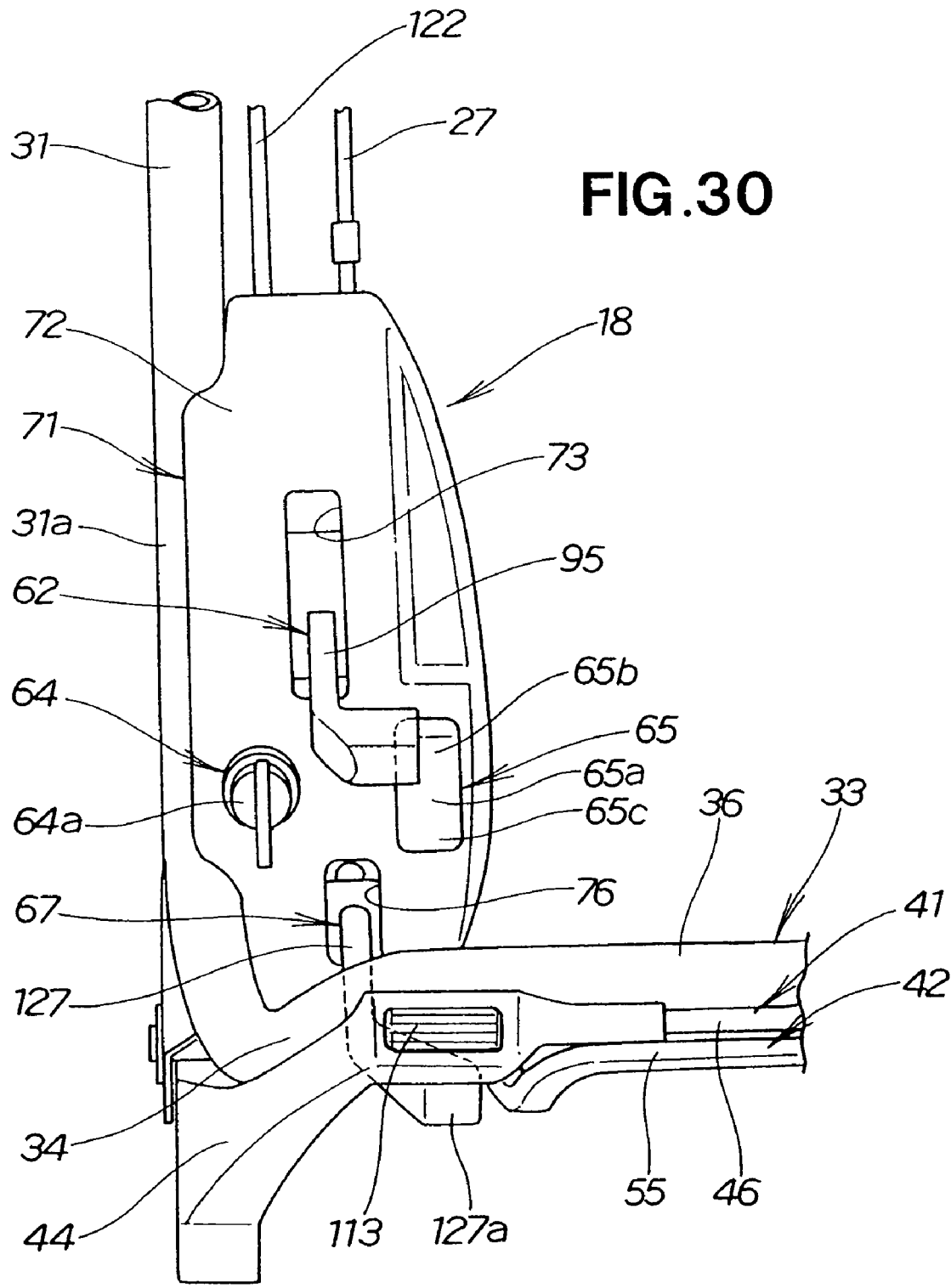
FIG. 30 is a view showing the area surrounding the left rear portion of the handle of FIG. 24, as seen from the direction of arrow 30.

As shown in FIGS. 24 and 30, the boost lever 67 is disposed behind and to the right of the main switch 64, and behind and to the left of the rotation mode switch 65.

The cover 71 is provided with a boost lever guide hole 76 between the main switch attachment hole 74 and the switch attachment hole 75. The operating lever portion 127 of the boost lever 67 protrudes upward from the boost lever guide hole 76. The cover 71 covers and protects the engine speed changing switch 66 and the boost lever 67, and also conceals these members to improve the outer appearance.

As shown in FIGS. 24, 26, and 30, the arm portion 126 of the boost lever 67 is covered by the cover 71, and the operating lever portion 127 is retained while protruding upward from the boost lever guide hole 76.

As shown in FIGS. 24 and 25, the operating unit 18 is provided to the rear end portion 31a of the left handlebar 31, whereby the shift lever 62, the main switch 64, and the rotation mode switch 65, as well as the engine speed changing switch 66 and the boost lever 67, can be grouped together at the left-hand side of the operator. Operation can therefore be prevented from becoming complex, and ease of operation can be enhanced.

The wire harnesses (not shown) of the main switch 64, the rotation mode switch 65, the engine speed changing switch 66, and the work clutch operation detection sensor 68 can be bundled together with the shifting cable 27 and the clutch cable 122. The wire harnesses of the switches can thereby be protected by the shifting cable 27 and the clutch cable 122.

Examples of the operation of the work clutch lever 41 and the travel lever 42 will next be described based on FIGS. 31A through 31D with reference to FIG. 23.

Figure 31A:
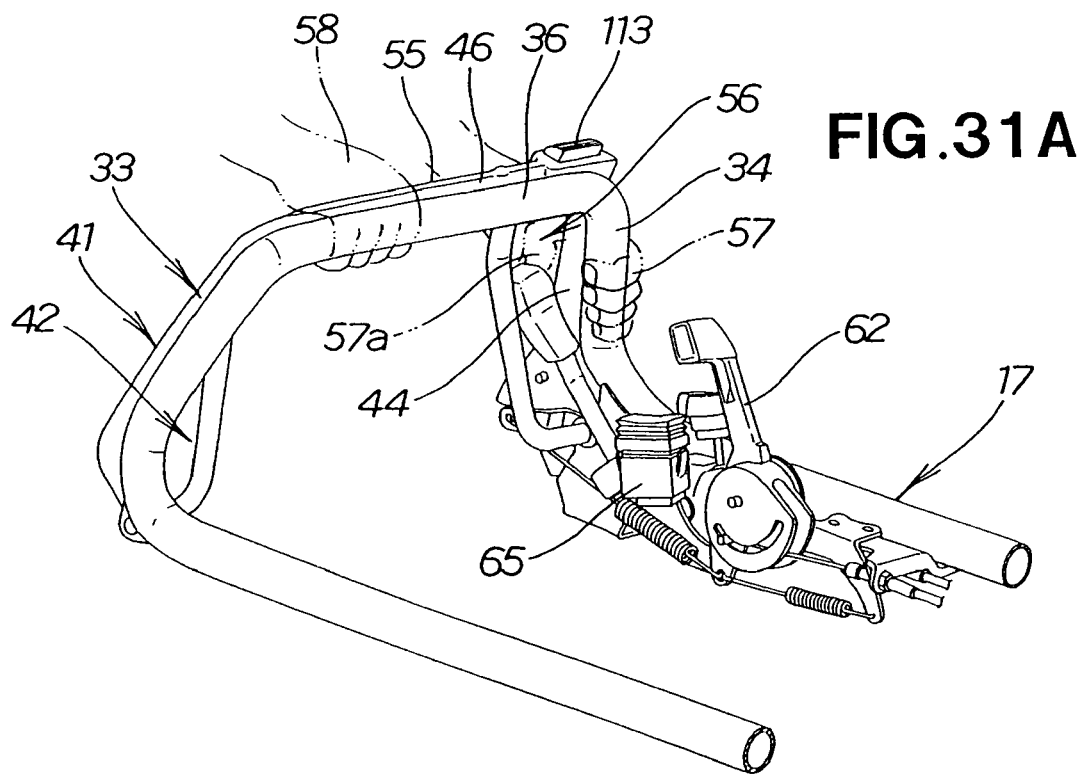
FIGS. 31A through 31D are views showing example operations of the work clutch lever, travel lever, and boost lever shown in FIGS. 24 and 27.

As shown in FIG. 31A, the operator grasps the left grip leg portion 34 and the left lever leg portion 44 of the work clutch lever 41 with the left hand 57, and grips the three horizontal levers 36, 46, 55 stacked together with the right hand 58.

Figure 31B:
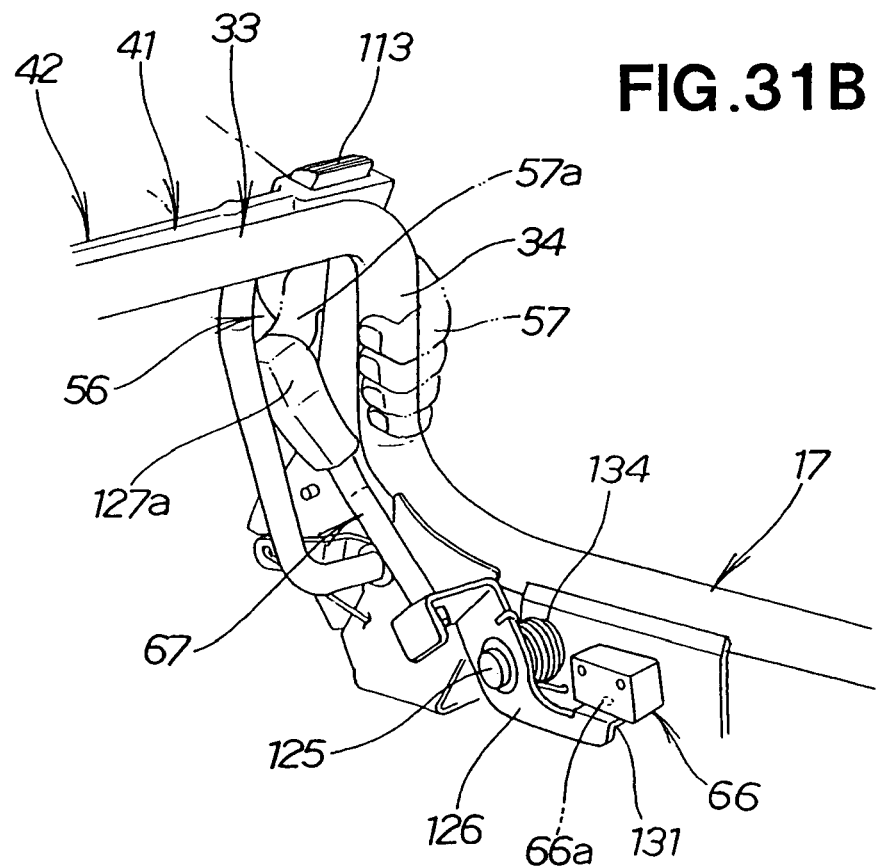

In this state, it is possible for the operator to extend only the thumb 57a of the left hand 57 into the operating space 56 and to hook the thumb 57a on the grip 127a (place the thumb 57a on the grip 127a), as shown in FIG. 31B.

Figure 31C:
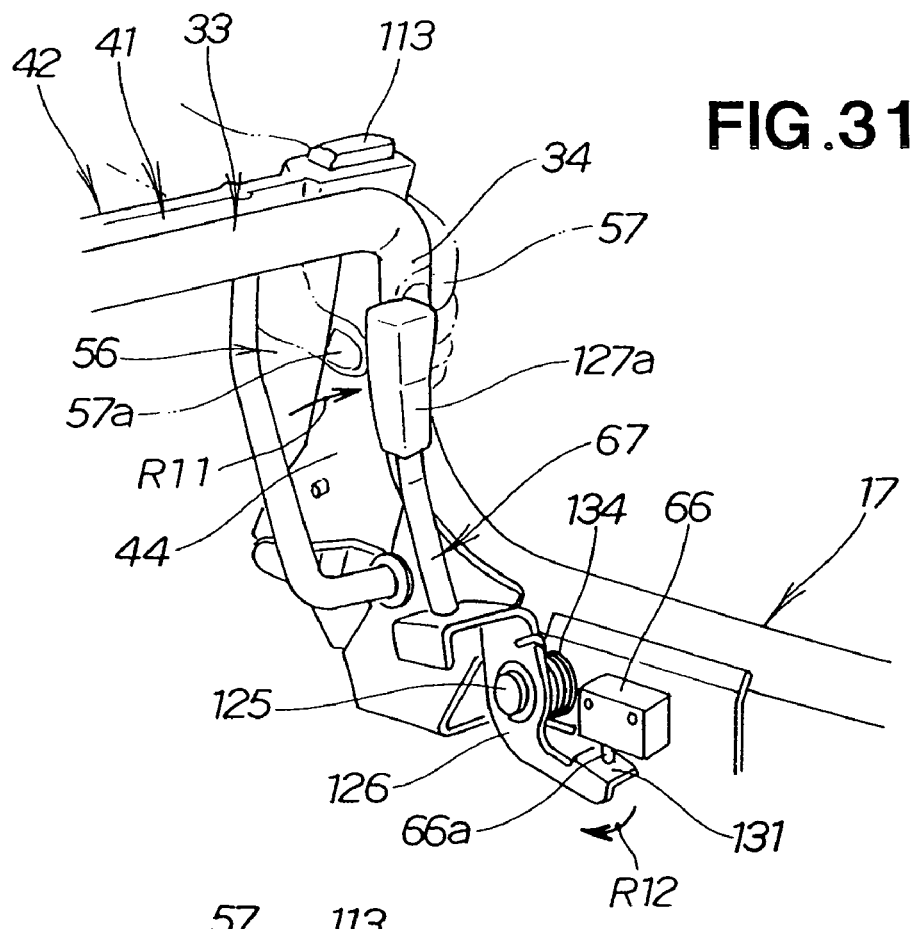
Figure 31D:
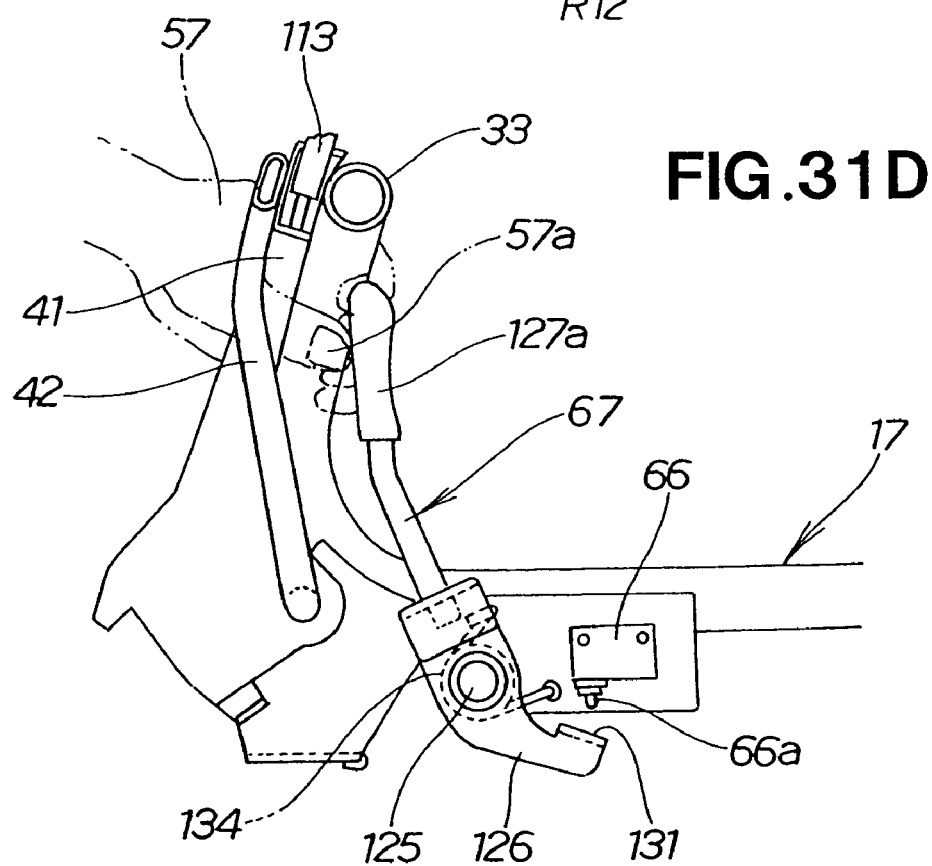

As shown in FIG. 31C, the thumb 57a hooked on the grip 127a pushes forward, whereby the grip 127a is pushed forward. As a result, the boost lever 67 swings in the clockwise direction in FIG. 31C (direction of the arrow R11) about the support pin 125. The pressing plate 131 therefore swings in the clockwise direction of FIG. 31C (direction of the arrow R12) and separates from the pushrod 66a. As shown in FIG. 31D, the pushrod 66a protrudes downward, whereby the engine speed changing switch 66 is switched to the "on" state.

The thumb 57a is then separated from the grip 127a, whereby the boost lever 67 is swung in the counterclockwise direction of FIG. 31D (direction of the arrow R11) by the urging force of the torsion spring 134 and is automatically returned to the original position shown in FIGS. 31A and 31B. As a result, the pressing plate 131 pushes against the pushrod 66a, whereby the engine speed changing switch 66 is switched to the original "off" state.

As is apparent from the description given above, in the walk-behind lawnmower 10 of the fourth embodiment, an operating space 56 is provided to a side selected from the left and right sides of the grip portion 33 (the side on which there is less switching of the grip portion 33 from one hand to the other hand), i.e., the left side, and the grip 127a of the boost lever 67 is disposed in the operating space 56.

The operator can therefore temporarily increase the speed of the engine 14 by operating the grip 127a with only the thumb 57a and without moving the left hand 57 that grips the left grip leg portion 34. The thumb 57a is then separated from the grip 127a to release the pressure on the grip 127a, whereby the boost lever 67 can be returned to the original position by the urging force of the torsion spring 134.

Furthermore, the grip 127a is disposed in the vicinity of the left grip leg portion 34. The operator can comfortably (without awkwardness) place his thumb 57a on the grip 127a while gripping the left grip leg portion 34 in the left hand 57. The boost lever 67 can easily be operated while the walk-behind lawnmower 10 is working, and the target engine speed of the engine 14 (see FIG. 23) can be temporarily and rapidly changed according to the working conditions.

For example, when the load on the implement 15 temporarily increases during work in the "quiet mode," a temporary switch to the "power mode" can rapidly be made by operating the boost lever 67. A rapid return to the "quiet mode" can then be made when the load returns to the original state.

The engine speed can also be instantaneously increased without interrupting or slowing the pace of work, and an even further increase in work efficiency can be anticipated.

As shown in FIGS. 28 and 29, when the grip 127a is pushed forward by the thumb 57a of the left hand 57 that is gripping the left grip leg portion 34, the range through which the grip 127a is pushed is limited by the range of movement of the thumb 57a.

However, the left grip leg portion 34 is tilted forward and upward. The boost lever 67 also extends further to the rear than the grip portion 33. In other words, the grip 127a protrudes to the rear further than the left grip leg portion 34.

The operator can comfortably (without awkwardness) push the grip 127a forward to the vicinity of the left grip leg portion 34 using the thumb 57a of the operator's left hand 57, which is gripping the left grip leg portion 34 and the left lever leg portion 44 of the work clutch lever 41.

The range through which the grip 127a is pushed is limited to the range of movement of the thumb 57a, and the grip 127a therefore does not move too far forward.

The control flow of the control unit 89 shown in FIG. 23 will next be described based on FIGS. 32 and 33. The series of operations from the time the engine is started to the time the control unit executes the control routine is the same as in the first embodiment shown in FIG. 8, and will not be described.

FIG. 32 is a control flowchart (main routine) for the control unit 89 according to the fourth embodiment, and shows the basic control flow whereby the control unit 89 executes the "engine speed control routine" of step ST07 shown in FIG. 9.

The control flowchart of the fourth embodiment shown in FIG. 32 differs from the control flowchart of the first embodiment shown in FIG. 10 in that a step ST310 is added. Other aspects of the control flowchart of the fourth embodiment are substantially the same as in FIG. 10.

In ST11 of the fourth embodiment, the switch signals of the switches are read. Specifically, the signals of the rotation mode switch 65, the engine speed changing switch 66, and the work clutch operation detection sensor 68 are read.

ST310 of the fourth embodiment is executed subsequent to ST13, subsequent to ST15, and subsequent to ST16, and is a step in which a routine for temporarily changing the speed of the engine 14 is executed. A subroutine for specifically executing ST310 is shown in FIG. 33 described hereinafter. After ST310 is executed, the process proceeds to ST18.

Figure 33:
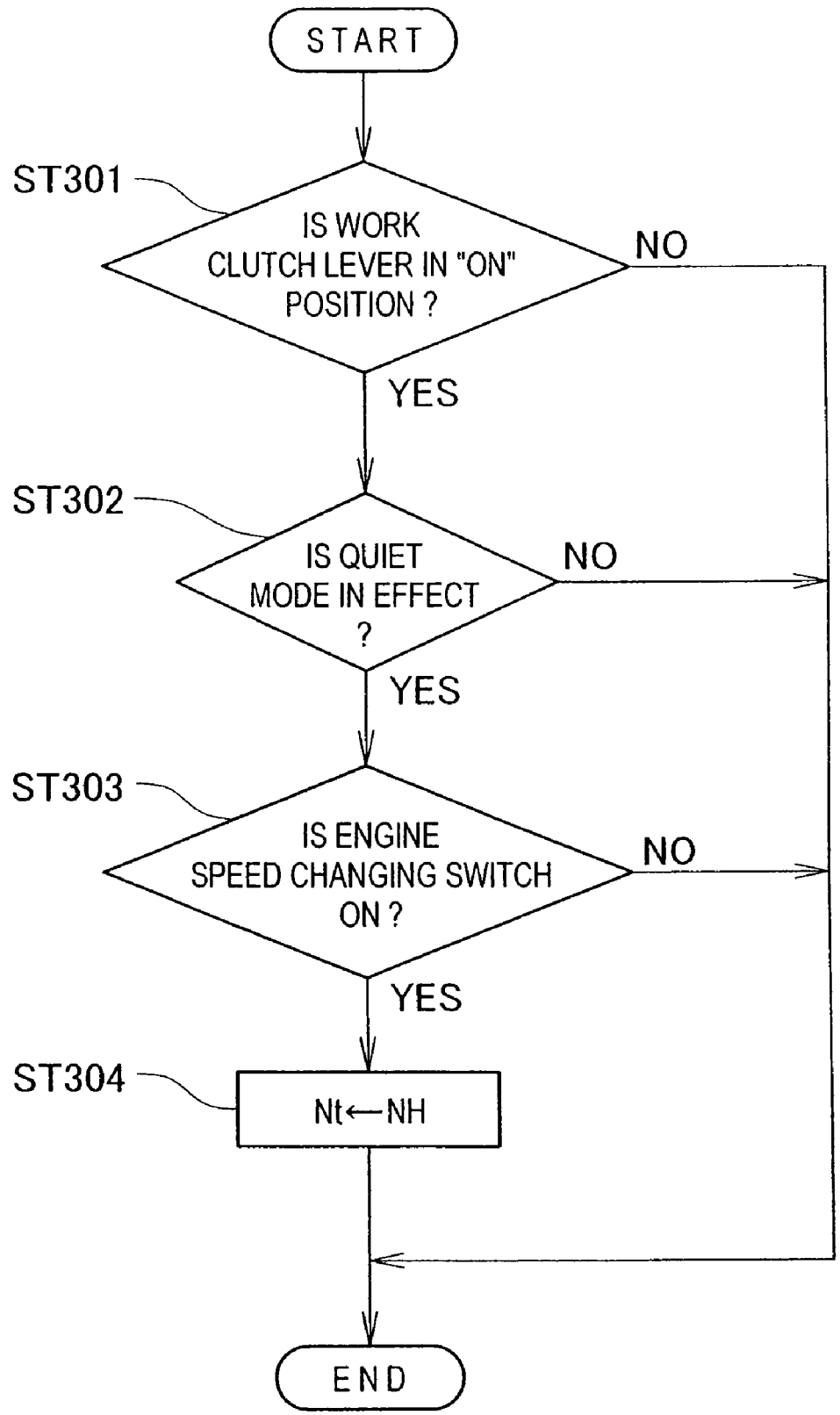
FIG. 33 is a detailed control flowchart of the execution of the steps in the engine speed temporary change routine shown in FIG. 32.

FIG. 33 is a flowchart of the control (subroutine) performed by the control unit 89 of the fourth embodiment, and shows the specific control flow for executing the routine of temporarily changing the speed of the engine 14, shown in ST310 of FIG. 32.

ST301: An assessment is made as to whether the work clutch lever 41 is in the "on" position, and when the result is YES, the process proceeds to ST302. When the result is NO, a determination is made that the rotation control mode of the engine 14 is the "idle mode," and control according to the subroutine of FIG. 33 is ended. As shown in FIG. 24, the position to which the operator swings the work clutch lever 41 forward is the "on" position. The position of the work clutch lever 41 is determined according to the detection signal of the work clutch operation detection sensor 68 (see FIG. 23).

ST302: An assessment is made as to whether the rotation control mode of the engine 14 is the "quiet mode," and when the result is YES, the process proceeds to ST303. When the result is NO, the rotation control mode is determined to be the "power mode," and control according to the subroutine of FIG. 33 is ended. In ST302, a determination of YES is made when the rotation mode switch 65 is on, and a determination of NO is made when the rotation mode switch 65 is off.

ST303: Because a transition to the "quiet mode" has taken place, an assessment is made as to whether the engine speed changing switch 66 is on, and when the result is YES, a determination is made that the "power mode" has been entered temporarily, and the process proceeds to ST304. When the result is NO, control according to the subroutine of FIG. 33 is ended. The engine speed changing switch 66 is on only when the boost lever 67 is swung forward.

ST304: After the target engine speed Nt of the engine 14 is set to the high target engine speed NH, control according to the subroutine of FIG. 33 is ended.

The operation of the walk-behind lawnmower 10 (engine-driven work machine 10) described by the control flowcharts in FIGS. 32 and 33 will next be described based on FIG. 34 with reference to FIG. 23.

Figure 34:
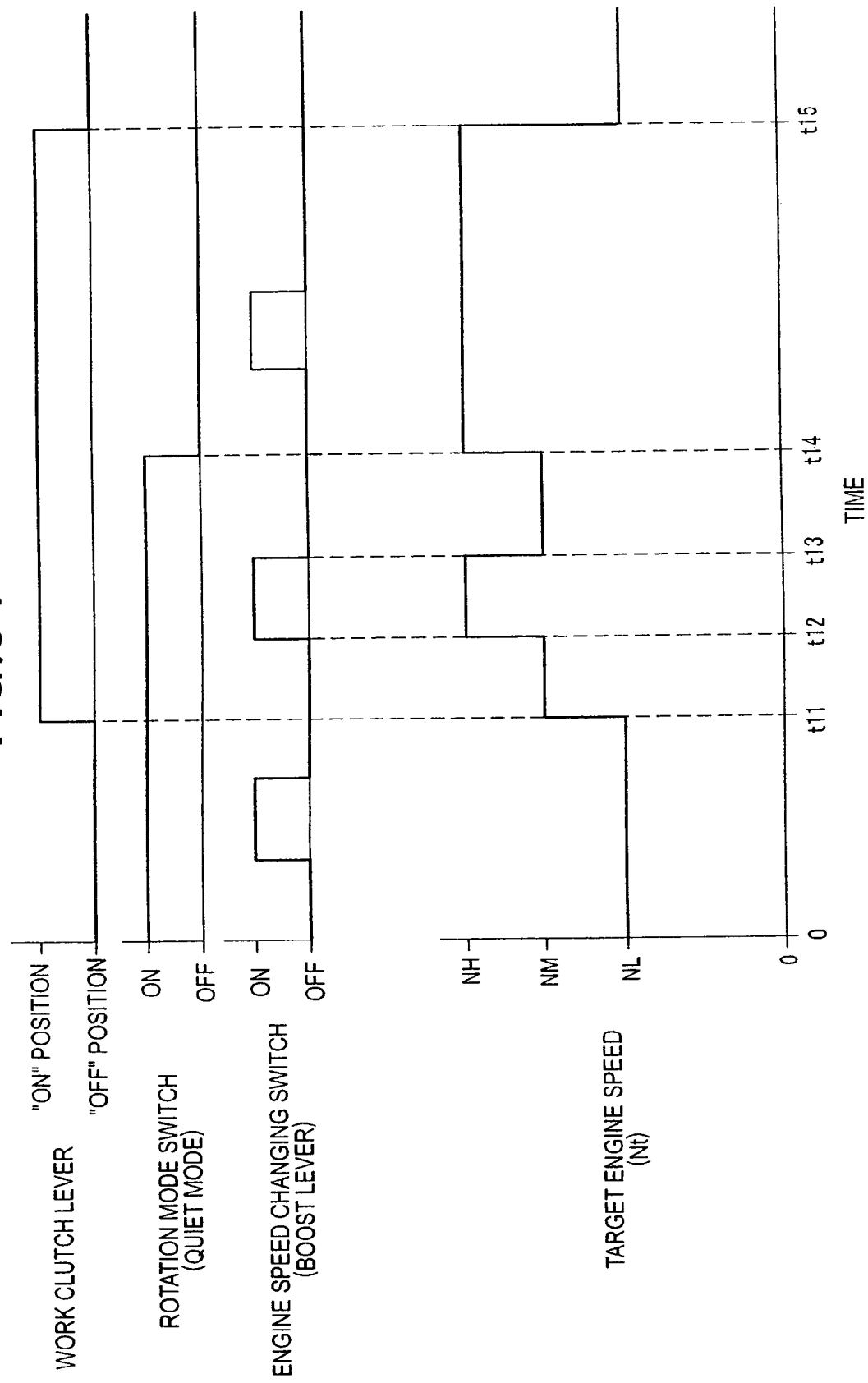
FIG. 34 is a diagram showing the actions in the control flowchart shown in FIG. 33.

FIG. 34 is a timing chart in which time is indicated on the horizontal axis, and FIG. 34 shows the operation of each component in the walk-behind lawnmower 10.

When the work clutch lever 41 is in the "off" position, the rotation control mode of the engine 14 is the "idle mode" regardless of the operation of the rotation mode switch 65 or the engine speed changing switch 66 (ST12 of FIG. 32). The target engine speed Nt of the engine 14 is therefore maintained at the low target engine speed NL (ST13 of FIG. 32).

When the rotation mode switch 65 is on, the rotation control mode of the engine 14 changes to the "quiet mode" as soon as the work clutch lever 41 is placed in the "on" position at time t11 (ST12 and ST14 of FIG. 32). The target engine speed Nt of the engine 14 therefore changes to the medium target engine speed NM (ST15 of FIG. 32).

When the engine speed changing switch 66 is then switched from "off" to "on" by swinging forward the boost lever 67 at time t12, the rotation control mode of the engine 14 changes to the "power mode" (ST303 of FIG. 33). The target engine speed Nt of the engine 14 therefore changes to the high target engine speed NH (ST304 of FIG. 33). The "power mode" continues while the boost lever 67 is operated, i.e., from time t12 to time t13.

The change to the "power mode" occurs during the time that the boost lever 67 is operated only when the condition is satisfied in which the rotation control mode of the engine 14 is the "quiet mode."

At time t13, when operation of the boost lever 67 is stopped, the rotation control mode returns to the original "quiet mode" (ST303 of FIG. 33 and ST14 of FIG. 32). The target engine speed Nt of the engine 14 therefore changes to the medium target engine speed NM (ST 15 of FIG. 32).

When the rotation mode switch 65 is then turned off at time t14, the rotation control mode of the engine 14 changes to the "power mode" (ST14 of FIG. 32 and ST302 of FIG. 33). The target engine speed Nt of the engine 14 therefore changes to the high target engine speed NH (ST16 of FIG. 32). In the "power mode" state, the "power mode" is maintained regardless of the operating state of the engine speed changing switch 66, i.e., the operating state of the boost lever 67. The target engine speed Nt of the engine 14 is also maintained at the high target engine speed NH.

When the work clutch lever 41 is then placed in the "off" position at time t15, the rotation control mode of the engine 14 changes to the "idle mode" (ST12 of FIG. 32 and ST301 of FIG. 33). The target engine speed Nt of the engine 14 therefore changes to the low target engine speed NL (ST13 of FIG. 32).

The description of the fourth embodiment is summarized as follows.

The control unit 89 controls the opening and closing of the throttle valve 92 so as to temporarily change the target engine speed Nt according to the change command of the target engine speed changing unit 60 and to cause the actual engine speed Nr to conform to the changed target engine speed Nt only when the condition is satisfied in which the engine-driven work machine 10 is operating.

In the fourth embodiment, the opening and closing of the throttle valve 92 can be electrically controlled by the control unit 89 so as to incrementally and temporarily change the target engine speed Nt of the engine 14 and to cause the actual engine speed Nr to conform to the changed target engine speed Nt according to human operation of the target engine speed changing unit 60 only when the walk-behind lawnmower 10 is operating (only during travel or work, for example). Accordingly, the operator can change to any target engine speed Nt with extreme ease merely by operating the target engine speed changing unit 60 to incrementally and temporarily change the target engine speed Nt. There is therefore no need for the operator to operate a throttle lever and to finely adjust the target engine speed Nt, as in the prior art.

The operator can thus easily adjust the target engine speed Nt of the engine 14 according to the load on the engine 14 even when the load placed on the engine 14 varies significantly due to significant variation of the load of the walk-behind lawnmower 10. As a result, the ease of operation and the working efficiency of the walk-behind lawnmower 10 can be improved. Since the operator can also arbitrarily and temporarily change the target engine speed Nt of the engine 14 according to the work conditions of the walk-behind lawnmower 10, good results in grass cutting and various other types of work can be consistently obtained.

When the load is small, engine noise can also be conveniently reduced by operating the target engine speed changing unit 60 to reduce the target engine speed Nt (actual engine speed Nr) of the engine 14. As a result, the amount of noise generated by the walk-behind lawnmower 10 can be reduced, and the work environment can be improved. By reducing the actual engine speed Nr of the engine 14 when the load is small, the fuel consumption of the engine can be reduced, and the amount of dust generated by the walk-behind lawnmower 10 during operation can also be reduced.

Furthermore, the target engine speed Nt that is incrementally changed according to the change command of the target engine speed changing unit 60 in the fourth embodiment is set to two levels that include a medium target engine speed NM and a high target engine speed NH. Operation of the target engine speed changing unit 60 produces the same actions and effects as the operation of the target engine speed selection unit 65.

When work is performed for a relatively long time in the "quiet mode" or the "power mode," the target engine speed switching unit 65 is preferably switched as appropriate to maintain a constant rotation control mode.

A temporary switch is made to the "power mode," the mode is quickly returned to the "quiet mode," and work is continued only when the load temporarily increases when work is being performed in the "quiet mode." In such cases, the target engine speed changing unit 60 is preferably switched as appropriate.

The target engine speed switching unit 65 and the target engine speed changing unit 60 can thus be selected to change the rotation control mode according to the work conditions. As a result, the ease of operation and the working efficiency of the engine-driven work machine 10 can be increased.

A modified example of the routine shown in FIG. 33 for temporarily changing the speed of the engine 14 will next be described based on FIG. 35.

Figure 35:
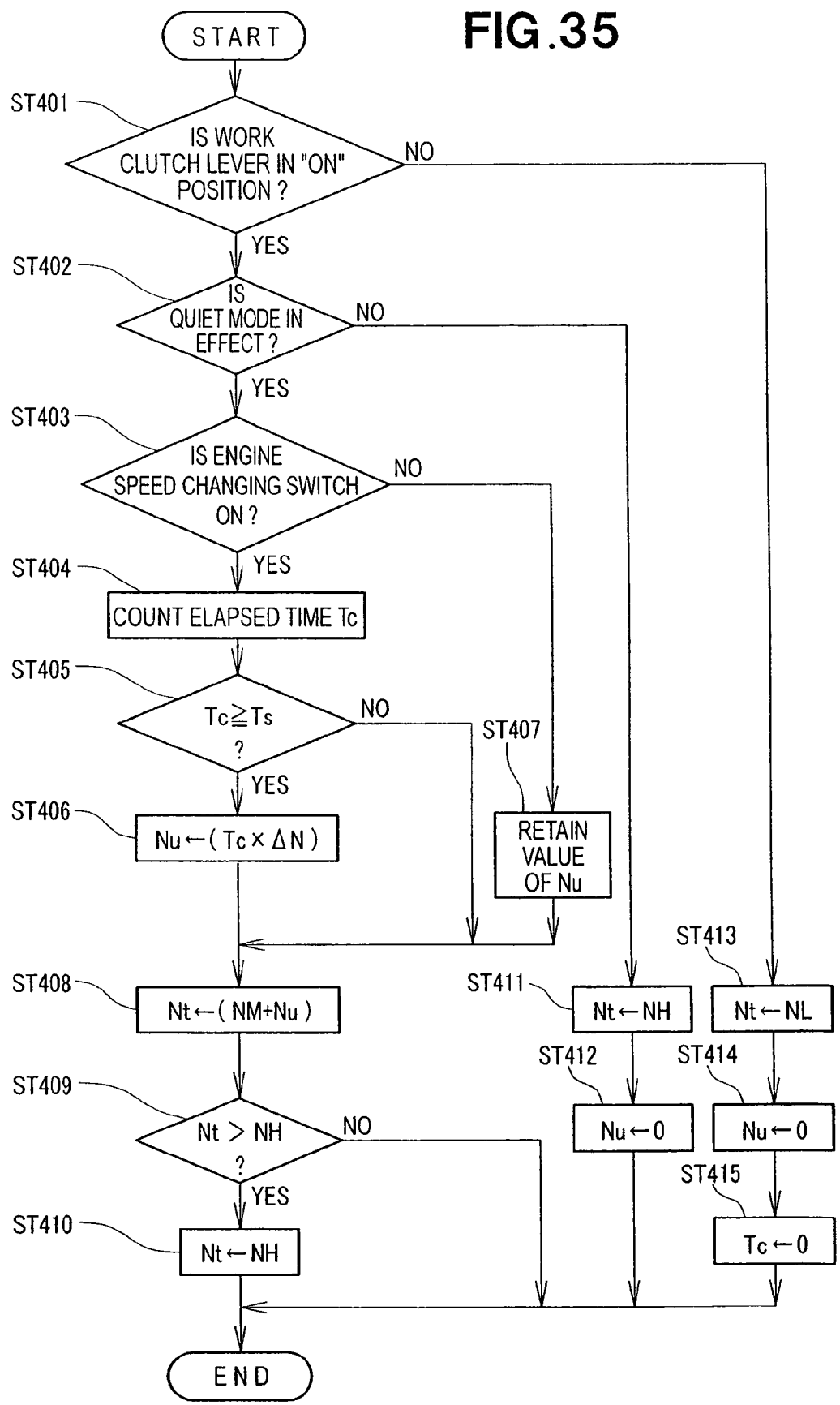
FIG. 35 is a flowchart showing the control of a first modification of the control unit according to the fourth embodiment.

FIG. 35 is a flowchart of the control (subroutine) performed by the control unit 89 in a first modification of the fourth embodiment, and shows a modified example of the subroutine for temporarily changing the speed of the engine 14 in step ST310 of FIG. 32.

ST401: An assessment is made as to whether the work clutch lever 41 is in the "on" position, and when the result is YES, the process proceeds to ST402. When the result is NO, a determination is made that the rotation control mode of the engine 14 is the "idle mode," and the process proceeds to ST413. The increased engine speed Nu is reset to 0 (zero) at the time at which the work clutch lever 41 is switched from the "off" position to the "on" position, as described hereinafter (see ST414).

ST402: An assessment is made as to whether the rotation control mode of the engine 14 is the "quiet mode," and when the result is YES, the process proceeds to ST403. When the result is NO, the "power mode" is determined to be in effect, and the process proceeds to ST411. In ST402, a determination of YES is made when the rotation mode switch 65 is on, and a determination of NO is made when the rotation mode switch 65 is off. The increased engine speed Nu is reset to 0 (zero) at the time at which the switch is made from the "power mode" to the "quiet mode," as described hereinafter (see ST412).

ST403: Since a transition to the "quiet mode" has taken place, an assessment is made as to whether the engine speed changing switch 66 is on, and when the result is YES, a determination is made that the "power mode" has been entered temporarily, and the process proceeds to ST404. When the result is NO, the process proceeds to ST407. The engine speed changing switch 66 is on only when the boost lever 67 is swung forward.

ST404: The time Tc, i.e., the elapsed time Tc, during which the engine speed changing switch 66 is on is counted by a timer built into the control unit 89. The elapsed time Tc, i.e., the initial value, is zero when the count is started.

ST405: An assessment is made as to whether the elapsed time Tc is longer than a certain preset reference time Ts (Tc≧Ts), and when the result is YES, the counter is stopped, and the process proceeds to ST406. When the result is NO, the process proceeds to ST408. The reference time Ts is used as a reference for determining that the boost lever 67 has been operated when the operator intends to make a temporary power mode switch.

ST406: Because a temporary power mode switch has taken place, a calculation is made to determine the engine speed Nu, i.e., the increased engine speed Nu, of the engine 14 that is increased according to the time Tc (elapsed time Tc) during which the operator temporarily operates the boost lever 67. The increased engine speed Nu is calculated by multiplying the elapsed time Tc by an engine speed increase ratio ΔN (Nu=Tc×ΔN). The engine speed increase ratio ΔN is a preset constant equal to the increase in the speed of the engine 14 per unit time.

ST407: Since the temporary power mode switch of the boost lever 67 is not present or no longer present in ST403, the increased engine speed Nu calculated in ST406 is stored in memory that is built into the control unit 89.

ST408: The increased engine speed Nu obtained from the temporary switch to the power mode is added to the medium target engine speed NM of the quiet mode to calculate the target engine speed Nt of the engine 14 (Nt=NM+Nu). The increased engine speed Nu herein is the value obtained in ST406 or ST407.

ST409: An assessment is made as to whether the target engine speed Nt exceeds the high target engine speed NH (Nt>NH), and when the result is YES, the target engine speed Nt is determined to be too high, and the process proceeds to ST410. When the result is NO, the target engine speed Nt is determined to be appropriate, and control according to the subroutine of FIG. 35 is ended.

ST410: After the excessive target engine speed Nt is updated to the high target engine speed NH that is the upper limit, control according to the subroutine of FIG. 35 is ended.

ST411: Since the rotation control mode of the engine 14 is the "power mode," the target engine speed Nt of the engine 14 is set to the high target engine speed NH.

ST412: After the increased engine speed Nu is reset to zero, control according to the subroutine of FIG. 35 is ended.

ST413: Since the rotation control mode of the engine 14 is the "idle mode," the target engine speed Nt of the engine 14 is set to the low target engine speed NL.

ST414: The increased engine speed Nu is reset to zero.

ST415: After the elapsed time Tc counted by the timer is reset to zero, control according to the subroutine of FIG. 35 is ended.

The operation of the walk-behind lawnmower 10 (engine-driven work machine 10) described by the control flowcharts shown in FIGS. 32 and 35 for the first modification of the fourth embodiment will next be described based on FIG. 36 with reference to FIG. 23.

Figure 36:
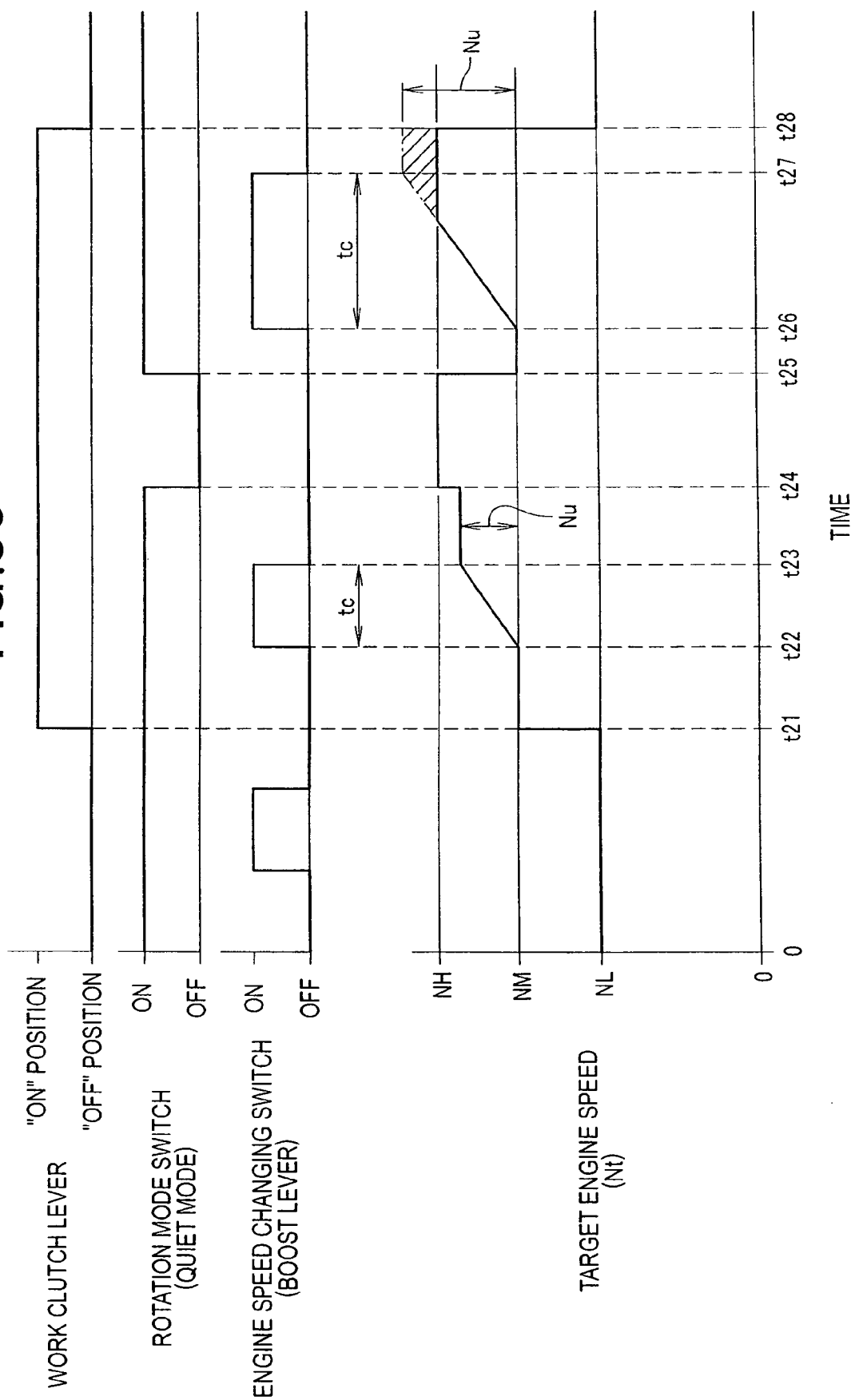
FIG. 36 is a diagram showing the actions performed in the control flowchart of FIG. 35.

FIG. 36 is a timing chart in which time is indicated on the horizontal axis, and FIG. 36 shows the operation of each component of the walk-behind lawnmower 10 in the first modification of the fourth embodiment.

When the work clutch lever 41 is in the "off" position, the rotation control mode of the engine 14 is the "idle mode" regardless of the operation of the rotation mode switch 65 or the engine speed changing switch 66 (ST12 of FIG. 32 and ST401 of FIG. 35). The target engine speed Nt of the engine 14 is therefore maintained at the low target engine speed NL (ST13 of FIG. 32 and ST413 of FIG. 35).

When the rotation mode switch 65 is on, the rotation control mode of the engine 14 changes to the "quiet mode" as soon as the work clutch lever 41 is placed in the "on" position at time t21 (ST12, ST14 of FIG. 32). The target engine speed Nt of the engine 14 therefore changes to the medium target engine speed NM (ST15 of FIG. 32).

When the engine speed changing switch 66 is then turned on, i.e., the boost lever 67 is swung forward, during the elapsed time Tc from time t22 to time t23, the increased engine speed Nu gradually increases at a constant increase rate according to the elapsed time Tc (ST403 through ST406 of FIG. 35). The target engine speed Nt of the engine 14 also gradually increases at a constant increase rate from the medium target engine speed NM (ST408 of FIG. 35).

The target engine speed Nt of the engine 14 can thus be increased during the time tc in which the boost lever 67 is operated only when the condition is satisfied in which the rotation control mode of the engine 14 is the "quiet mode."

At time t23, when operation of the boost lever 67 is stopped, the increased engine speed Nu at time t23 is maintained (ST407 of FIG. 35). Therefore, the value at time t23 of the target engine speed Nt of the engine 14 is also maintained (ST408 of FIG. 35).

When the rotation mode switch 65 is then turned off at time t24, the rotation control mode of the engine 14 changes to the "power mode" (ST14 of FIG. 32 and ST402 of FIG. 35). The target engine speed Nt of the engine 14 therefore changes to the high target engine speed NH (ST16 of FIG. 32 and ST411 of FIG. 35). In this "power mode" state, the "power mode" is maintained regardless of actuation of the engine speed changing switch 66, i.e., the operating state of the boost lever 67.

In the "power mode" state, the increased engine speed Nu is reset to zero (ST412 of FIG. 35).

When the rotation mode switch 65 is turned back on at time t25, the rotation control mode of the engine 14 changes to the "quiet mode" (ST14 of FIG. 32). The target engine speed Nt of the engine 14 therefore changes to the medium target engine speed NM (ST15 of FIG. 32).

When the engine speed changing switch 66 is then turned on, i.e., the boost lever 67 is swung forward, during the elapsed time Tc from time t26 to time t27, the increased engine speed Nu gradually increases at a constant increase rate according to the elapsed time Tc (ST403 through ST406 of FIG. 35). The target engine speed Nt of the engine 14 also gradually increases at a constant increase rate from the medium target engine speed NM (ST408 of FIG. 35).

However, when the target engine speed Nt exceeds the high target engine speed NH (Nt>NH), i.e., the increased engine speed Nu is too high, the target engine speed Nt is used as the upper limit of the high target engine speed NH (ST409 through ST410 of FIG. 35).

At time t27, when operation of the boost lever 67 is stopped, the increased engine speed Nu at time t27 is maintained (ST407 of FIG. 35). Therefore, the value at time t27 of the target engine speed Nt of the engine 14 is also maintained (ST408 of FIG. 35).

When the work clutch lever 41 is then placed in the "off" position at time t28, the rotation control mode of the engine 14 changes to the "idle mode" (ST12 of FIG. 32 and ST401 of FIG. 35). The target engine speed Nt of the engine 14 therefore changes to the low target engine speed NL (ST413 of FIG. 35).

In the state in which the work clutch lever 41 is in the "off" position, the increased engine speed Nu and the elapsed time Tc are reset to zero (ST414 through ST415 of FIG. 35).

The first modification of the fourth embodiment shown in FIGS. 35 and 36 has the following effects in addition to the effects of the first embodiment shown in FIGS. 1 through 11.

Specifically, the target engine speed changing unit 60 in the first modification is configured so as to continuously issue change commands only when operated by a human. The control unit 89 is configured so as to increase the target engine speed Nt according to the time Tc during which change commands are issued.

In the first modification, the target engine speed changing unit 60 continuously issues change commands during the time Tc in which the target engine speed changing unit 60 is continuously operated, and the control unit 89 increases the target engine speed Nt according to the time Tc (i.e., the elapsed time Tc) during which the change commands are issued. The target engine speed Nt can therefore be set with even greater precision. As a result, the working efficiency of the walk-behind lawnmower 10 can be even further improved.

In the fourth embodiment and the first modification of the fourth embodiment, the control unit 89 may be configured so as to determine that the condition in which the walk-behind lawnmower 10 is operating is satisfied when at least one condition is satisfied from the group consisting of a condition wherein work is being performed by the cutter 15 (implement 15), and a condition wherein travel is being performed by the travel unit 13.

The control unit 89 of the fourth embodiment and the first modification of the fourth embodiment is provided with ST12 of FIG. 32, ST301 of FIG. 33, and ST401 of FIG. 35, and is thereby configured so as to "determine that the condition wherein the walk-behind lawnmower 10 is operating is satisfied when the condition wherein the work clutch lever 41 is in the "on" position (i.e., the cutter 15 is actuated) is satisfied."

Figure 37:
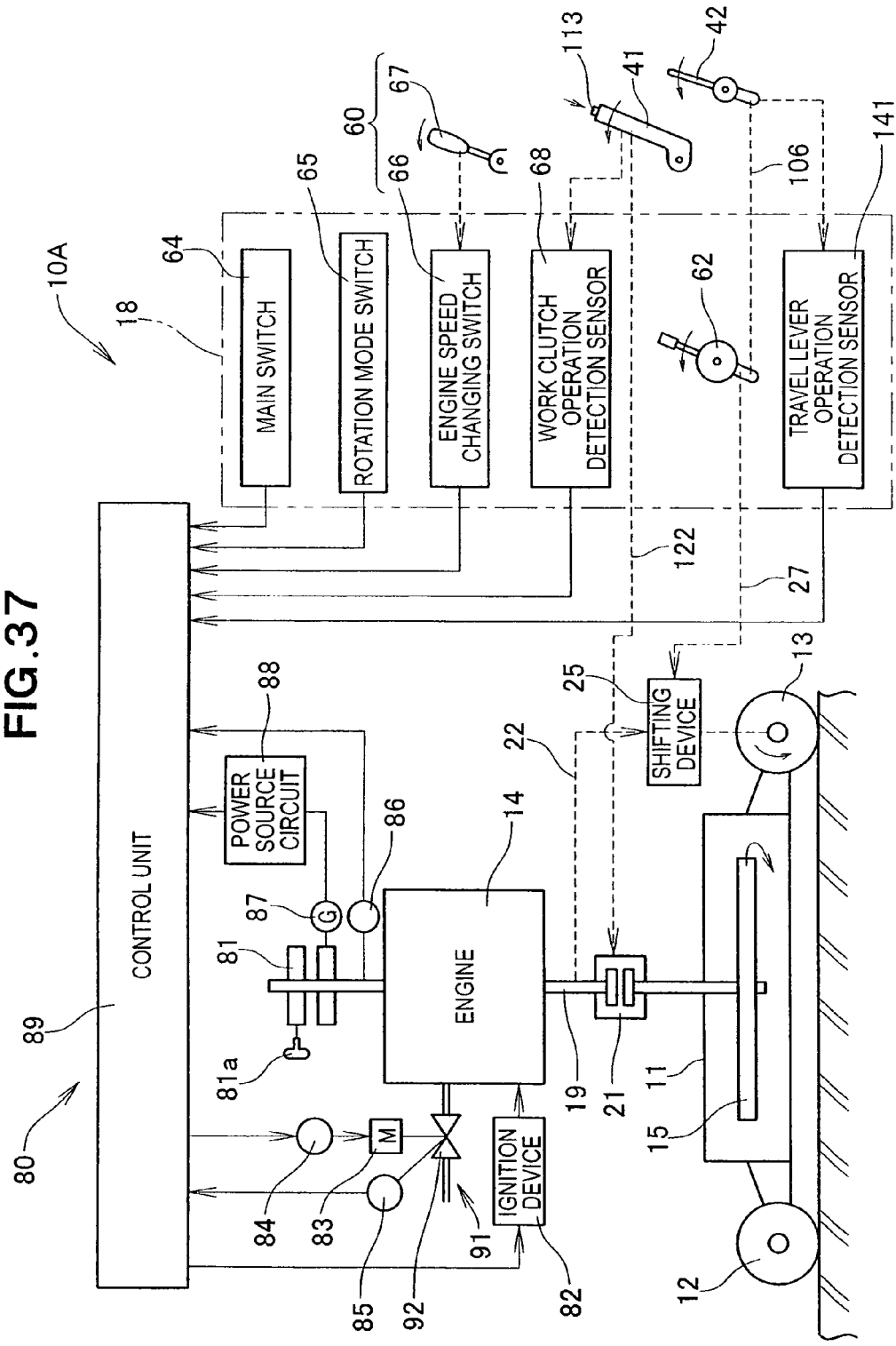
FIG. 37 is a schematic system diagram of a second modification of the engine-driven work machine according to the fourth embodiment.
Figure 38B:
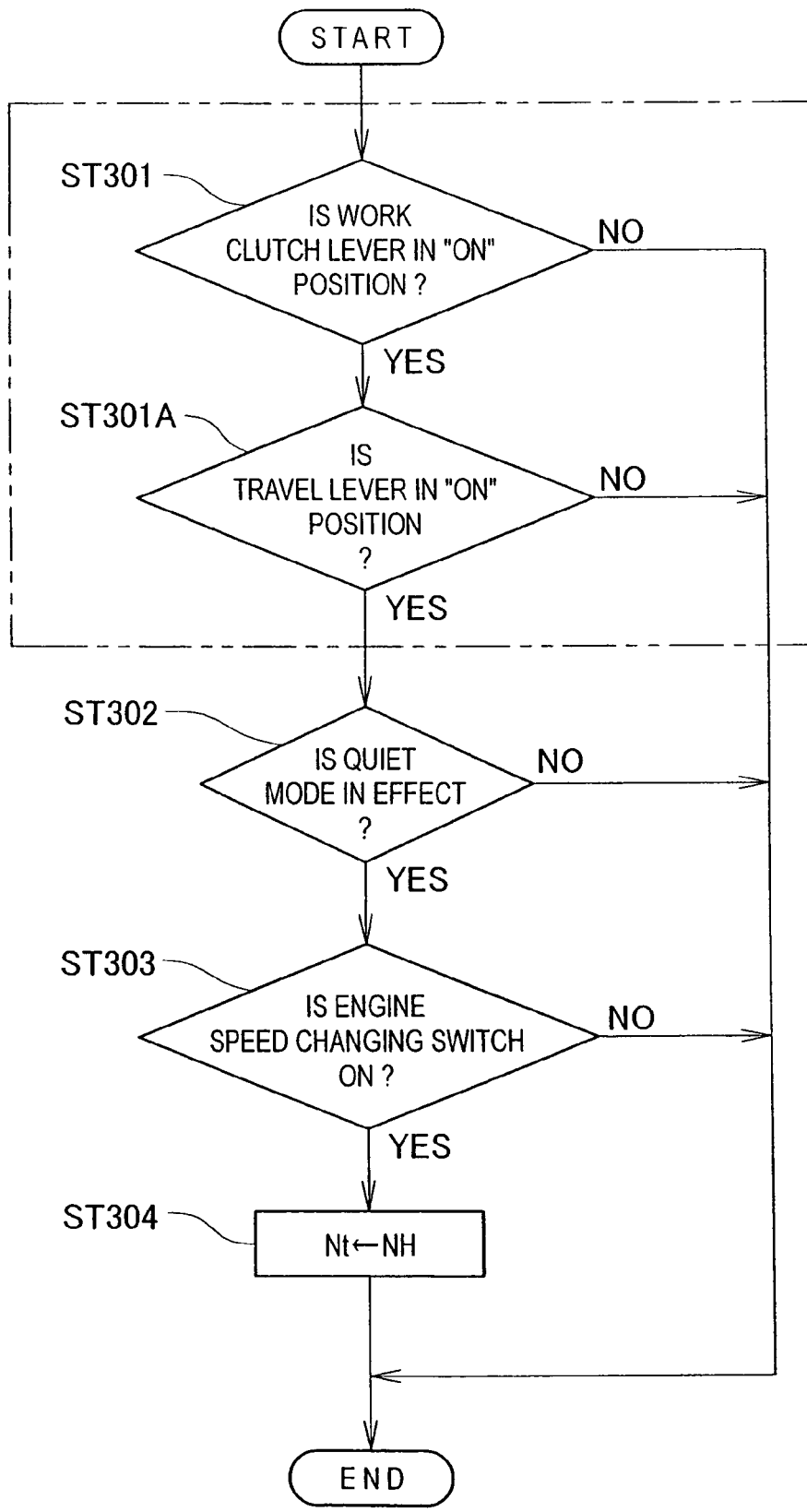
Figure 38C:
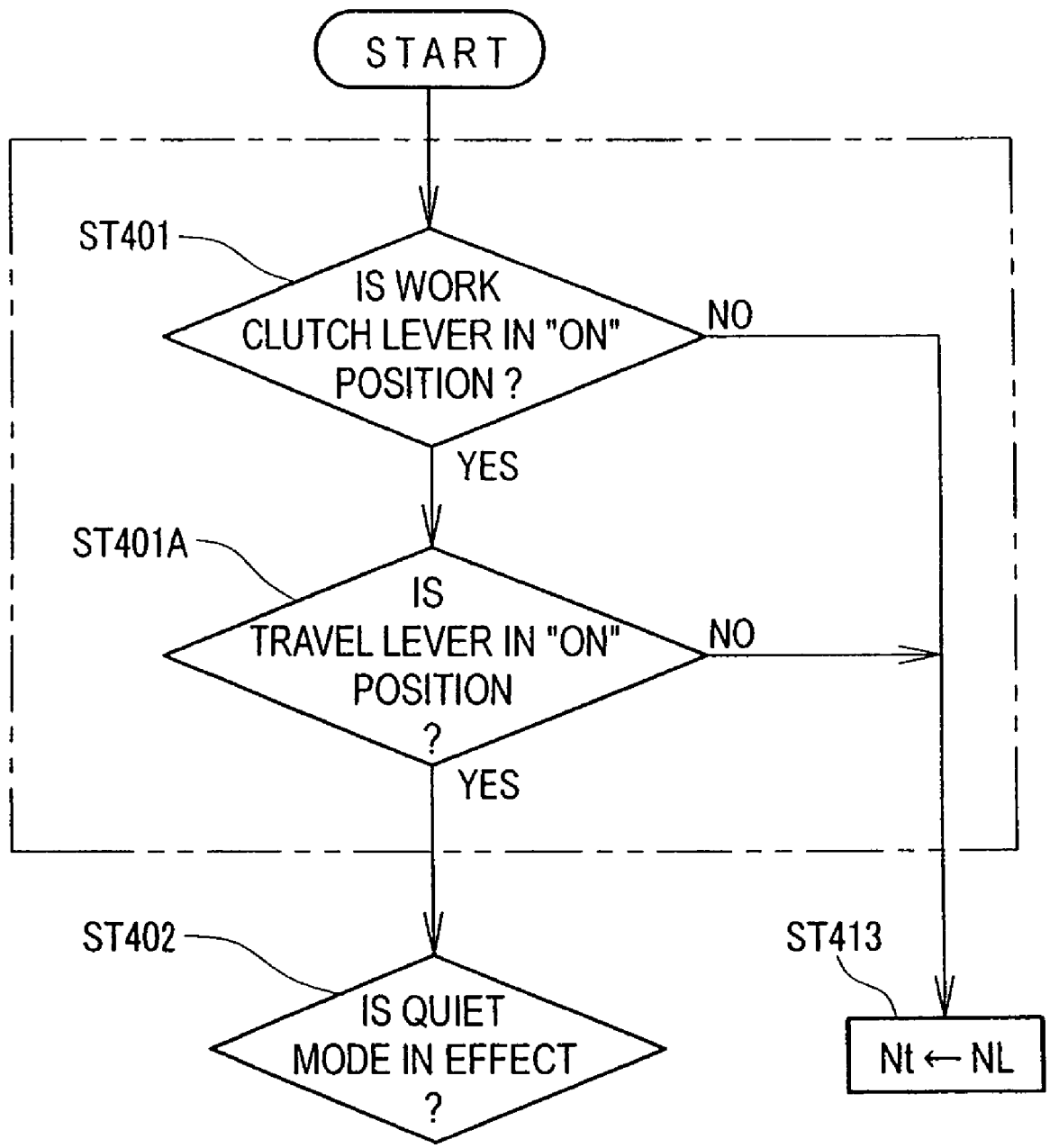
Figure 39A:
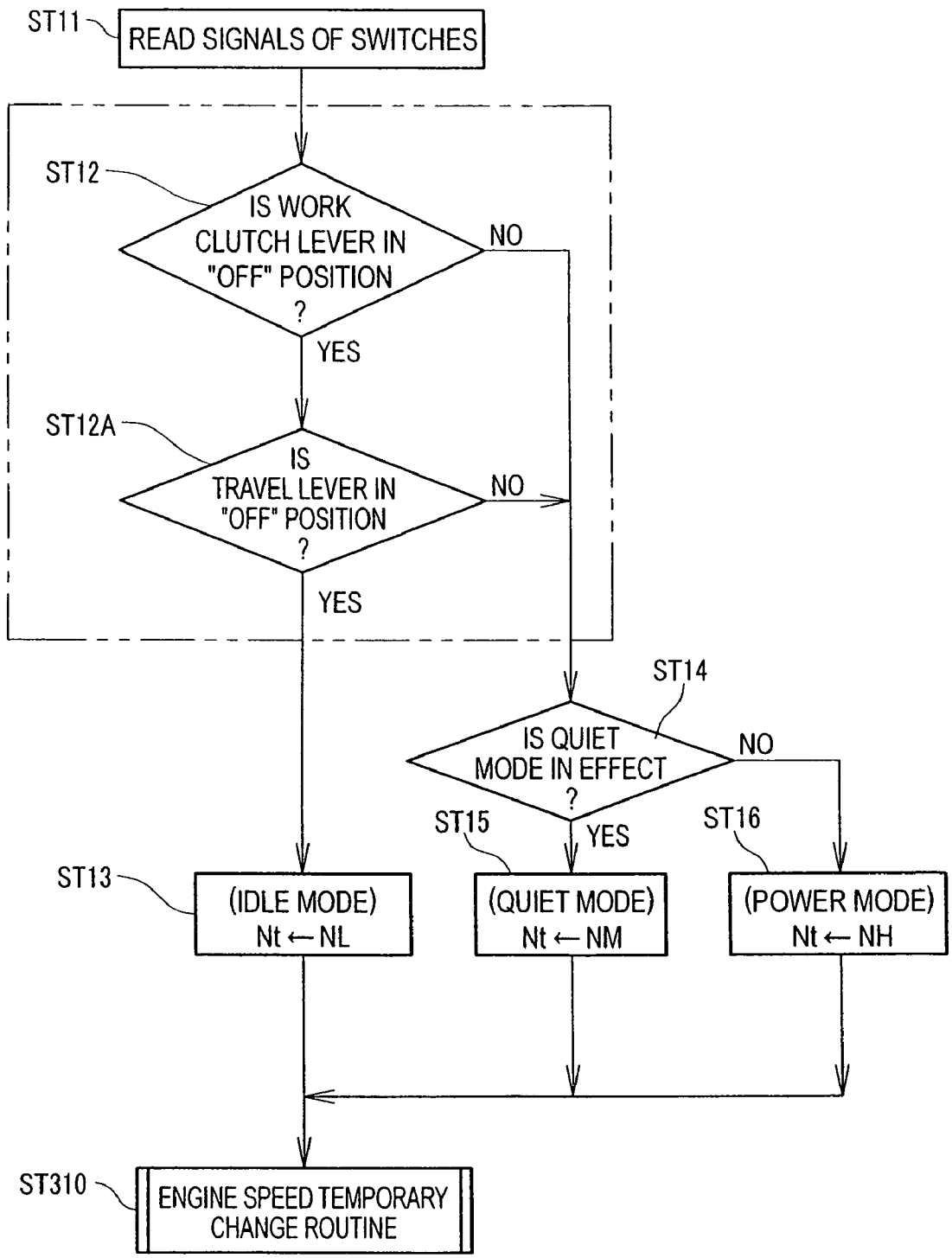
FIGS. 39A through 39C are flowcharts showing the control of the control unit according to a third modification of the fourth embodiment.
Figure 39B:
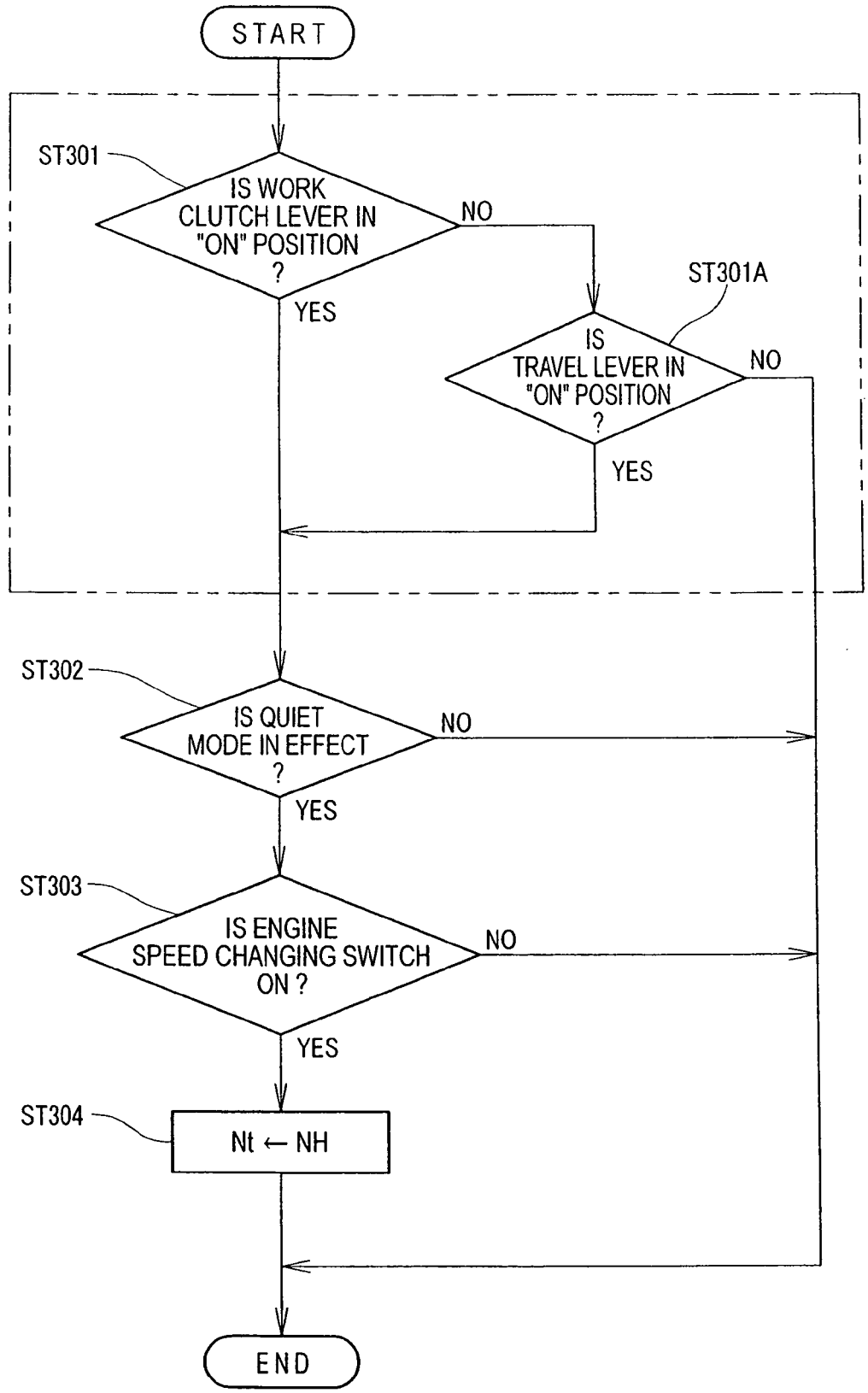
Figure 39C:
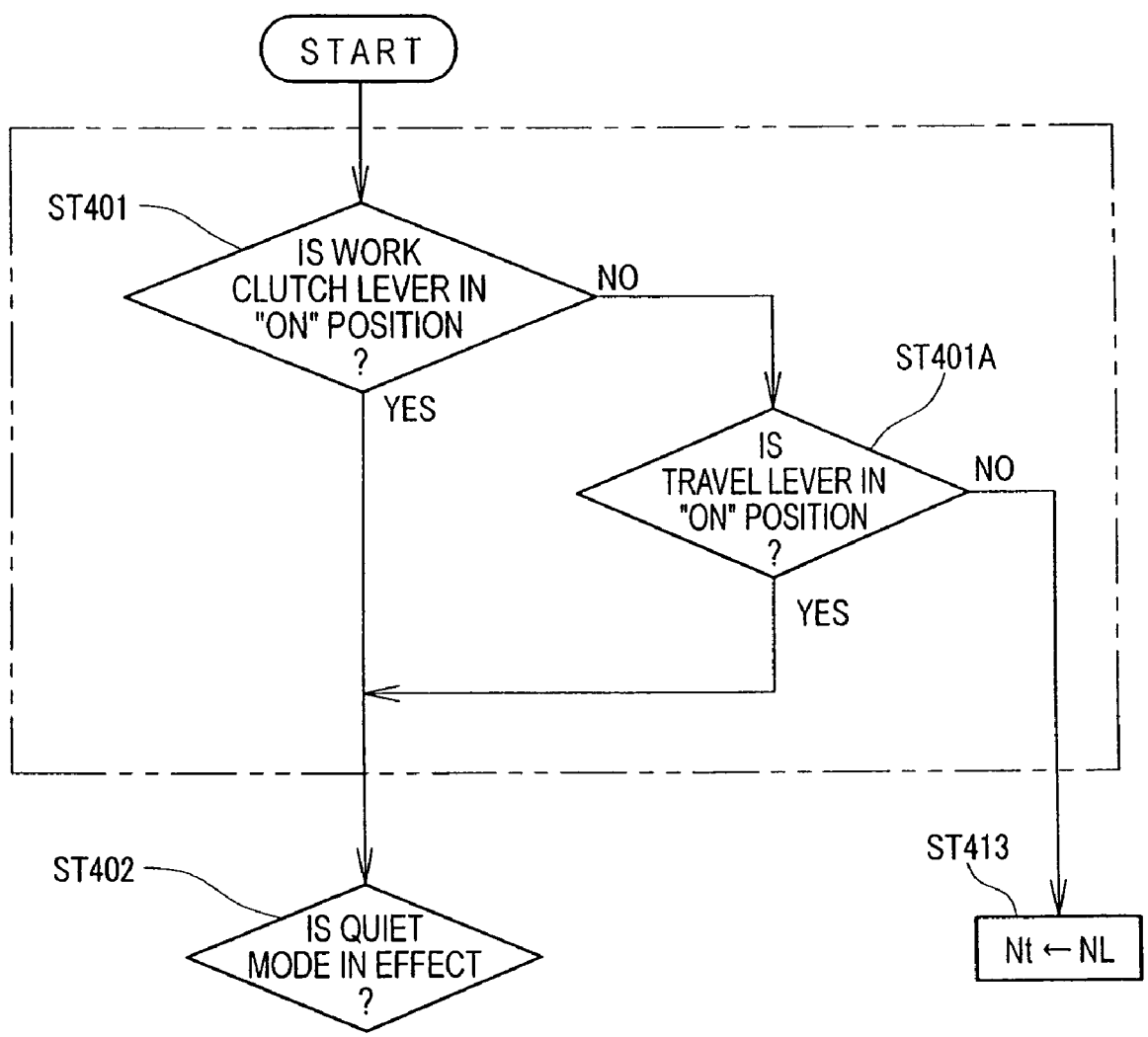

By adopting the structure of the walk-behind lawnmower 10A of the second modification shown in FIGS. 37 through 38C, or the structure of the walk-behind lawnmower 10A of the third modification shown in FIGS. 39A through 39C in the fourth embodiment, the control unit 89 can be configured so as to determine whether the walk-behind lawnmower 10A is operating.

FIG. 37 is a schematic system diagram of the walk-behind lawnmower 10A according to a second modification of the fourth embodiment.

The walk-behind lawnmower 10A of the second modification has the same basic structure and operation as the walk-behind lawnmower 10 shown in FIGS. 22 through 36. The same reference symbols are used to indicate the same components of the walk-behind lawnmower 10A, and description of these components is omitted. In the walk-behind lawnmower 10A of the second modification, the operating unit 18 is provided with a travel lever operation detection sensor 141.

The travel lever operation detection sensor 141 detects operation of the shifting device 25 (which corresponds to so-called engagement of the clutch) by the travel lever 42 to transmit the output of the engine 14 to the rear wheels 13, and is composed, for example, of a microcomputer. When the travel lever 42 is swung forward to the "on" position, the travel lever operation detection sensor 141 detects the engagement operation and issues a detection signal to the control unit 89.

FIG. 38A is a control flowchart of the main routine of the control unit 89 in the walk-behind lawnmower 10A of the second modification of the fourth embodiment. The main routine shown in FIG. 32 is partially modified, and only the modified portion is shown in FIG. 38A.

A characteristic feature of the main routine of the second modification is the addition of ST12A. An assessment is made in ST12 as to whether the work clutch lever 41 is in the "off" position, and when the result is NO, a determination is made that the cutter 15 is activated, and the process proceeds to ST12A.

In ST12A, an assessment is made as to whether the travel lever 42 is in the "off" position, and when the result is YES, the process proceeds to ST13. When the result is NO, a determination is made that the rear wheels 13 are traveling, and the process proceeds to ST14. As shown in FIG. 26, the position of the travel lever 42 when the operator's hand is removed from the travel lever 42 is the "off" position. The position of the travel lever 42 is determined according to the detection signal of the travel lever operation detection sensor 141 (see FIG. 37).

FIG. 38B is a control flowchart of the subroutine of the control unit 89 in the walk-behind lawnmower 10A of the second modification of the fourth embodiment, wherein the subroutine shown in FIG. 33 is partially modified.

A characteristic feature of the subroutine of the second modification is the addition of ST301A. An assessment is made in ST301 as to whether the work clutch lever 41 is in the "on" position, and when the result is YES, a determination is made that the cutter 15 is activated, and the process proceeds to ST301A.

In ST301A, an assessment is made as to whether the travel lever 42 is in the "on" position, and when the result is YES, a determination is made that the rear wheels 13 are traveling, and the process proceeds to ST302. When the result is NO, control according to the subroutine of FIG. 38B is ended.

FIG. 38C is a control flowchart in which the subroutine of the control unit 89 in the walk-behind lawnmower 10A of the second modification of the fourth embodiment is partially modified. The subroutine of the first modification shown in FIG. 35 is partially modified, and only the modified portion is shown in FIG. 38C.

A characteristic feature of the subroutine of the second modification is the addition of ST401A. An assessment is made in ST401 as to whether the work clutch lever 41 is in the "on" position, and when the result is YES, a determination is made that the cutter 15 is activated, and the process proceeds to ST401A.

In ST401A, an assessment is made as to whether the travel lever 42 is in the "on" position, and when the result is YES, a determination is made that the rear wheels 13 are traveling, and the process proceeds to ST402. When the result is NO, the process proceeds to ST413.

The control unit 89 in the second modification of the fourth embodiment shown in FIGS. 38A through 38C is thus configured so as to determine that the condition wherein the walk-behind lawnmower 10A is operating is satisfied when the condition wherein the cutter 15 is operating (ST12 of FIG. 38A, ST301 of FIG. 38B, and ST401 of FIG. 38C) and the condition wherein the rear wheels 13 are traveling (ST12A of FIG. 38A, ST301A of FIG. 38B, and ST401A of FIG. 38C) are both satisfied.

The control flow of a third modification in which the second modification is further modified will next be described based on FIGS. 39A through 39C.

FIG. 39A is a control flowchart of the main routine of the control unit 89 in the walk-behind lawnmower 10A of the third modification of the fourth embodiment. The main routine shown in FIG. 38A is partially modified, and only the modified portion is shown in FIG. 39A.

In the main routine of the third modification, an assessment is made in ST12 as to whether the work clutch lever 41 is in the "off" position, and when the result is YES, the process proceeds to ST12A. When the result is NO, a determination is made that the cutter 15 is activated, and the process proceeds to ST14.

In ST12A, an assessment is made as to whether the travel lever 42 is in the "off" position, and when the result is YES, the process proceeds to ST13. When the result is NO, a determination is made that the rear wheels 13 (see FIG. 37) are traveling, and the process proceeds to ST14.

FIG. 39B is a control flowchart of the subroutine of the control unit 89 in the walk-behind lawnmower 10A of the third modification of the fourth embodiment, wherein the subroutine shown in FIG. 38B is partially modified.

In the subroutine of the third modification, an assessment is made in ST301 as to whether the work clutch lever 41 is in the "on" position, and when the result is YES, a determination is made that the cutter 15 is activated, and the process proceeds to ST302. When the result is NO, the process proceeds to ST301A.

In ST301A, an assessment is made as to whether the travel lever 42 is in the "on" position, and when the result is YES, a determination is made that the walk-behind lawnmower 10A (see FIG. 37) is traveling, and the process proceeds to ST302. When the result is NO, control according to the subroutine of FIG. 39B is ended.

FIG. 39C is a control flowchart of the subroutine of the control unit 89 in the walk-behind lawnmower 10A of the third modification of the fourth embodiment, wherein the subroutine shown in FIG. 38C is partially modified.

In the subroutine of the third modification, an assessment is made in ST401 as to whether the work clutch lever 41 is in the "on" position, and when the result is YES, a determination is made that the cutter 15 is activated, and the process proceeds to ST402. When the result is NO, the process proceeds to ST401A.

In ST401A, an assessment is made as to whether the travel lever 42 is in the "on" position, and when the result is YES, a determination is made that the rear wheels 13 are traveling, and the process proceeds to ST402. When the result is NO, the process proceeds to ST413.

The control unit 89 in the third modification of the fourth embodiment shown in FIGS. 39A through 39C is thus configured so as to determine that the condition wherein the walk-behind lawnmower 10A is operating is satisfied when the condition wherein the cutter 15 is operating (ST12 of FIG. 39A, ST301 of FIG. 39B, and ST401 of FIG. 39C) and the condition wherein the rear wheels 13 are traveling (ST12A of FIG. 39A, ST301A of FIG. 39B, and ST401A of FIG. 39C) are both satisfied.

In addition to the effects of the first embodiment shown in FIGS. 1 through 11 and the effects of the fourth embodiment shown in FIGS. 22 through 34, the second and third modifications shown in FIGS. 37 through 39C have the following effects.

Specifically, the control unit 89 in the second and third modifications determines that the walk-behind lawnmower 10A is operating when the cutter 15 (implement 15) is operating and when the rear wheels 13 (travel unit 13) are traveling. Therefore, the target engine speed Nt can be incrementally changed with even greater precision according to variations in the workload of the cutter 15 itself, or variations in the travel load of the rear wheels 13. As a result, the working efficiency of the walk-behind lawnmower 10A can be further improved.

A fifth embodiment will next be described based on FIGS. 40 through 49F using a walk-behind lawnmower as an example of the engine-driven work machine. The same reference symbols are used for structures and actions in the fifth embodiment that are the same as those of the first embodiment shown in FIGS. 1 through 11, and for structures and actions that are the same as in the fourth embodiment shown in FIGS. 22 through 34, and description thereof is omitted.

Figure 40:
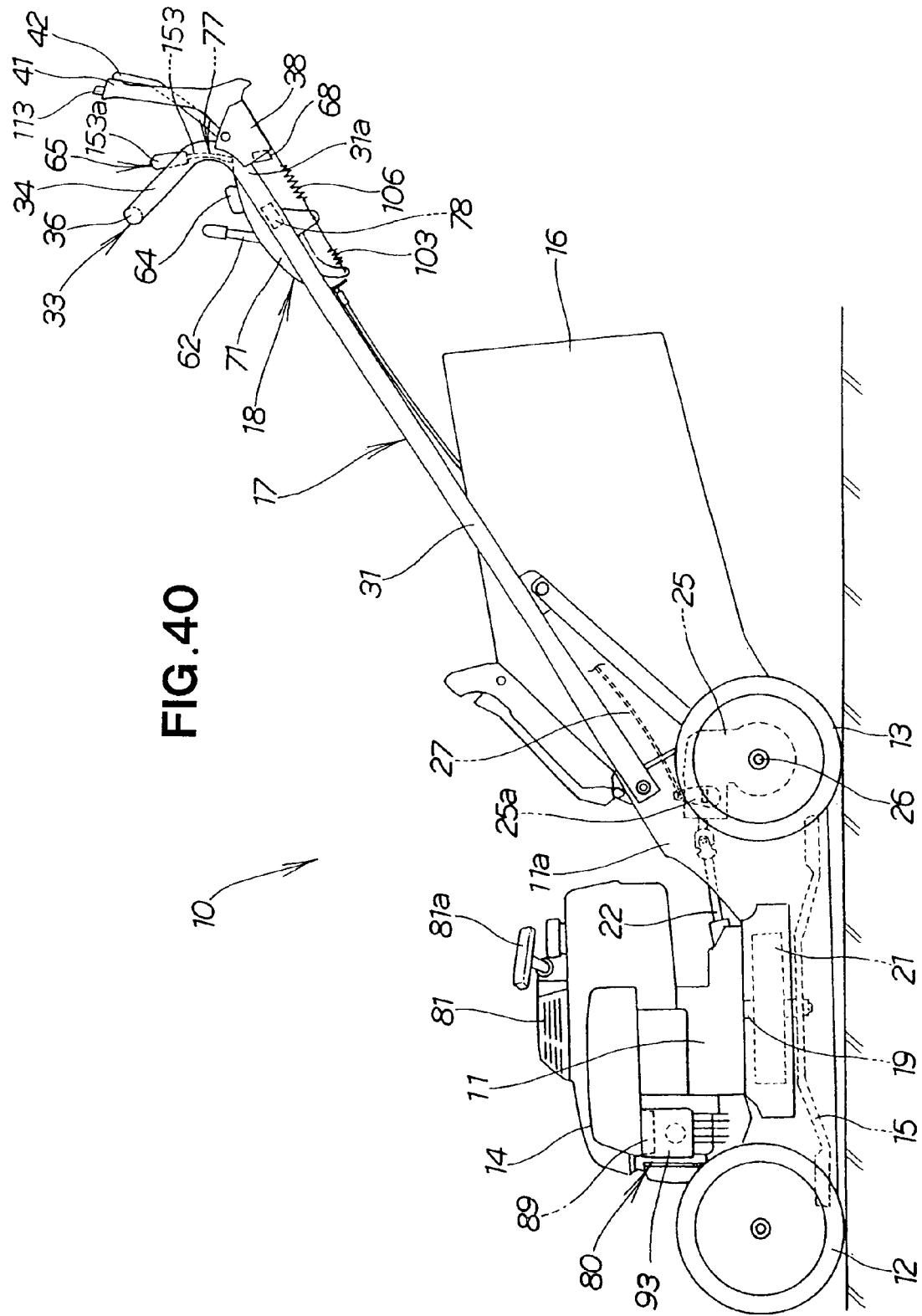
FIG. 40 is a left side elevational view of an engine-driven work machine according to a fifth embodiment of the present invention.
Figure 41:
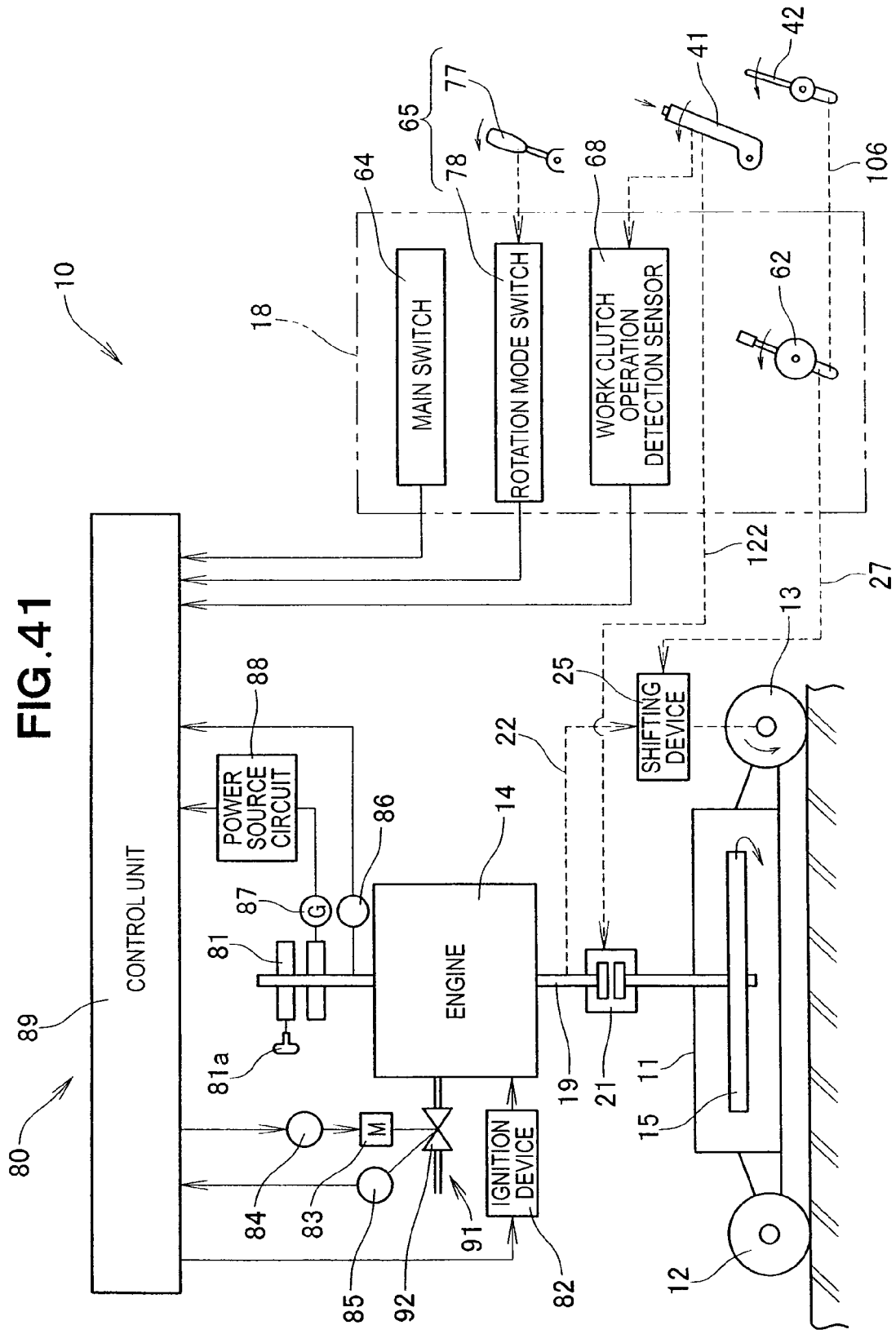
FIG. 41 is a schematic system diagram of the engine-driven work machine shown in FIG. 40.

As shown in FIGS. 40 and 41, the walk-behind lawnmower 10 of the fifth embodiment has substantially the same basic structure as that of the first embodiment. A characteristic feature of the walk-behind lawnmower 10 of the fifth embodiment is that the structure of the target engine speed switching unit 65 (target engine speed selection unit 65) is modified.

As shown in FIG. 41, the target engine speed selection unit 65 of the fifth embodiment is composed of a switch operation lever 77 and a rotation mode switch 78 (switching switch 78) that is operated by the switch operation lever 77. In other words, the target engine speed selection unit 65 of the fifth embodiment is composed of a combination of a switch operation lever 77 and a rotation mode switch 78 instead of the seesaw switch in the first embodiment.

The target engine speed selection unit 65 is a target engine speed switching unit for specifying the value of a single arbitrarily selected target engine speed from among target engine speeds of the engine 14 that have a plurality of preset incremental values. More specifically, the target engine speed selection unit 65 switches the control mode of the engine 14 between a "quiet mode" and a "power mode" described hereinafter.

The control unit 89 of the fifth embodiment receives the signals of the main switch 64, the target engine speed selection unit 65, the work clutch operation detection sensor 68, the throttle angle sensor 85, and the engine rotation sensor 86, and controls the engine 14. The details of the control performed by the control unit 89 of the fifth embodiment are thus the same as the details of the control performed by the control unit 89 of the first embodiment, and therefore will not be described.

The structure of the shift lever 62 and the target engine speed selection unit 65 of the fifth embodiment will be described in further detail hereinafter.

The shift lever 62 of the fifth embodiment will first be described. The basic structure of the shift lever 62 of the fifth embodiment is substantially the same as that of the shift lever 62 of the first embodiment shown in FIGS. 1 through 7. The shift lever 62 of the fifth embodiment has the following characteristic features.

Figure 43:
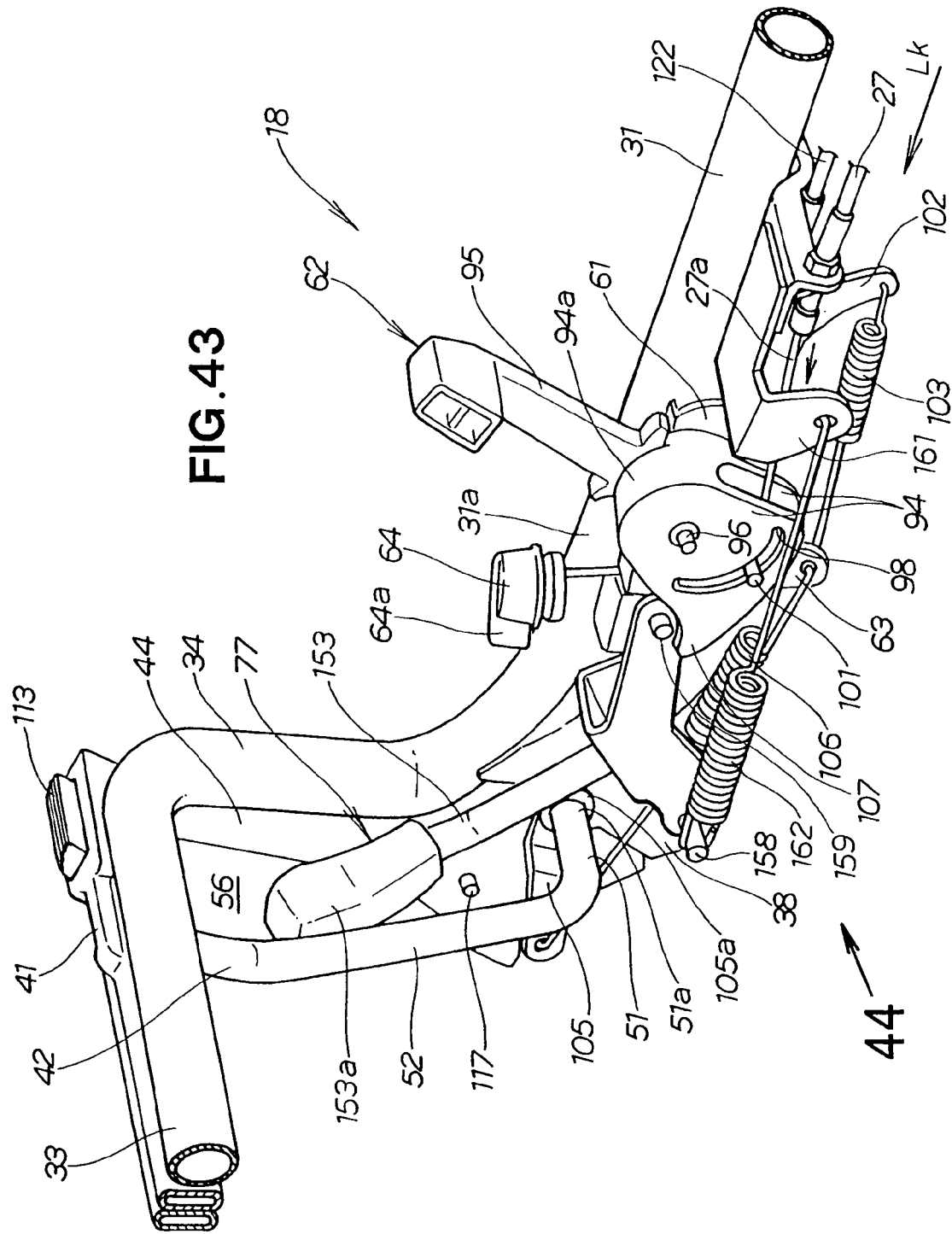
FIG. 43 is an enlarged view of the area surrounding the left rear portion of the handle of FIG. 42.
Figure 44:
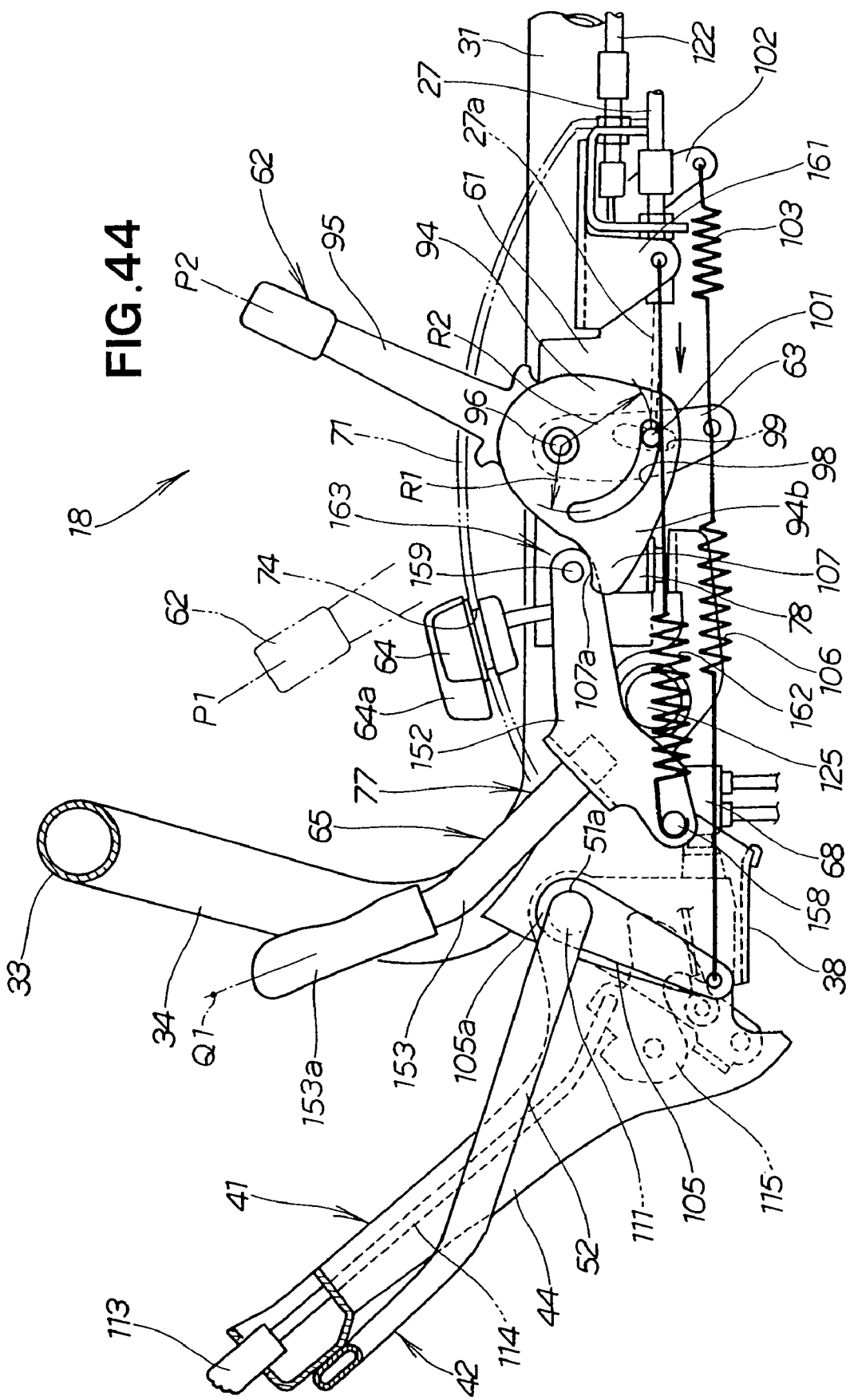
FIG. 44 is a view showing the area surrounding the left rear portion of the handle of FIG. 43, as seen from the direction of arrow 44.

As shown in FIGS. 43 and 44, the shift lever 62 is provided with an engagement-receiving protrusion 107 (engagement-receiving portion 107). Specifically, the disk portion 94 is formed in a forked shape that extends downward as viewed from the front (direction of the arrow Lk in FIG. 43) of the disk portion 94, as described above. The engagement-receiving protrusion 107 extends to the rear from the rear lower portion 94b of one of the two left and right sides of the fork shape. The engagement-receiving protrusion 107 has an engaging surface 107a on the upper surface thereof. The engaging surface 107a is recessed in an arc.

Figure 46:
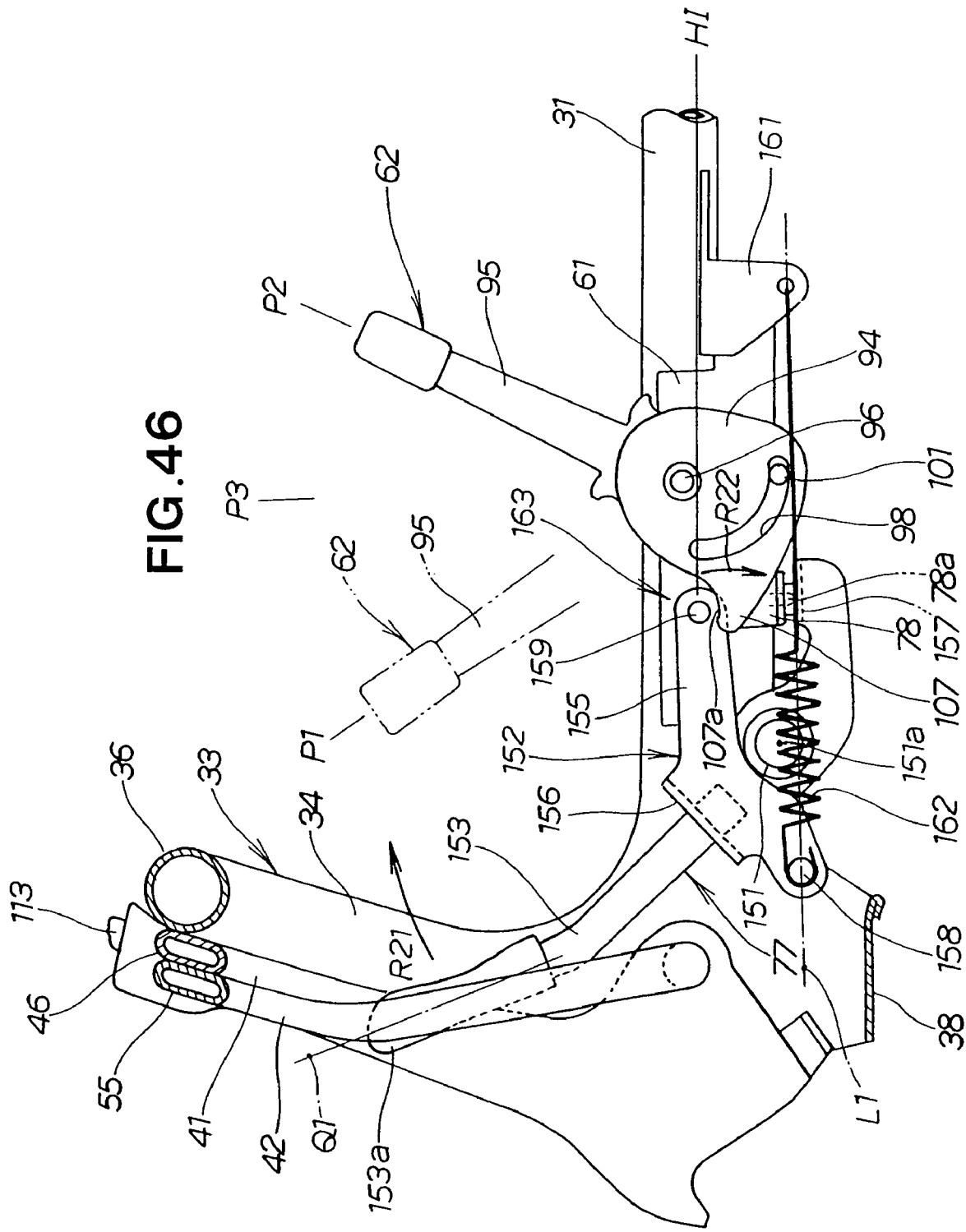
FIG. 46 is a perspective view showing relationships among the handle of FIG. 45, the shift lever, switching lever, rotation mode switch, and linkage mechanism.

The swing positions of the shift lever 62 include a low-speed position P1 in which the operating lever portion 95 is tilted furthest to the rear, as indicated by the imaginary line in FIG. 46, and a high-speed position P2 in which the operating lever portion 95 is tilted furthest forward, as indicated by the solid line. Furthermore, the middle position P3 between the low-speed position P1 and the high-speed position P2 is the medium-speed position P3. The shift lever 62 can be freely swung in the space from the low-speed position P1 to the high-speed position P2.

The low-speed position P1 is the position in which the shifting device 25 is placed in order to set the rotational speed of the rear wheels 13 shown in FIG. 40 to a prescribed minimum speed. The high-speed position P2 is the position in which the shifting device 25 is placed in order to set the rotational speed of the rear wheels 13 to a prescribed maximum speed.

The target engine speed selection unit 65 of the fifth embodiment will next be described based on FIGS. 42 through 48.

The basic structure of the target engine speed selection unit 65, i.e., the switch operation lever 77 and rotation mode switch 78, of the fifth embodiment is similar to that of the engine speed changing switch 66 and boost lever 67 of the fourth embodiment shown in FIGS. 27 and 28.

Figure 42:
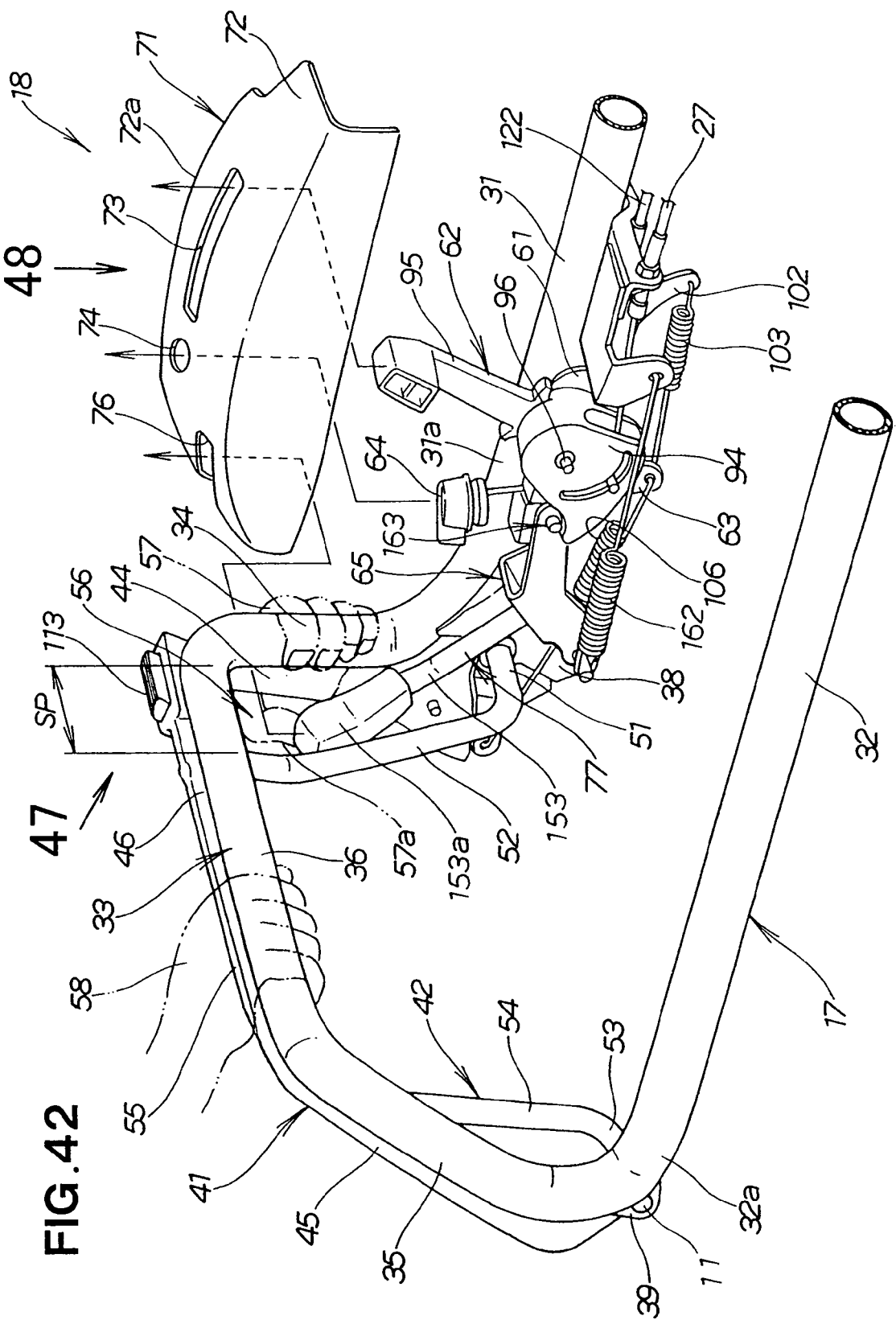
FIG. 42 is a perspective view showing the area surrounding the rear portion of the handle shown in FIG. 40, as seen from the upper right.
Figure 45:
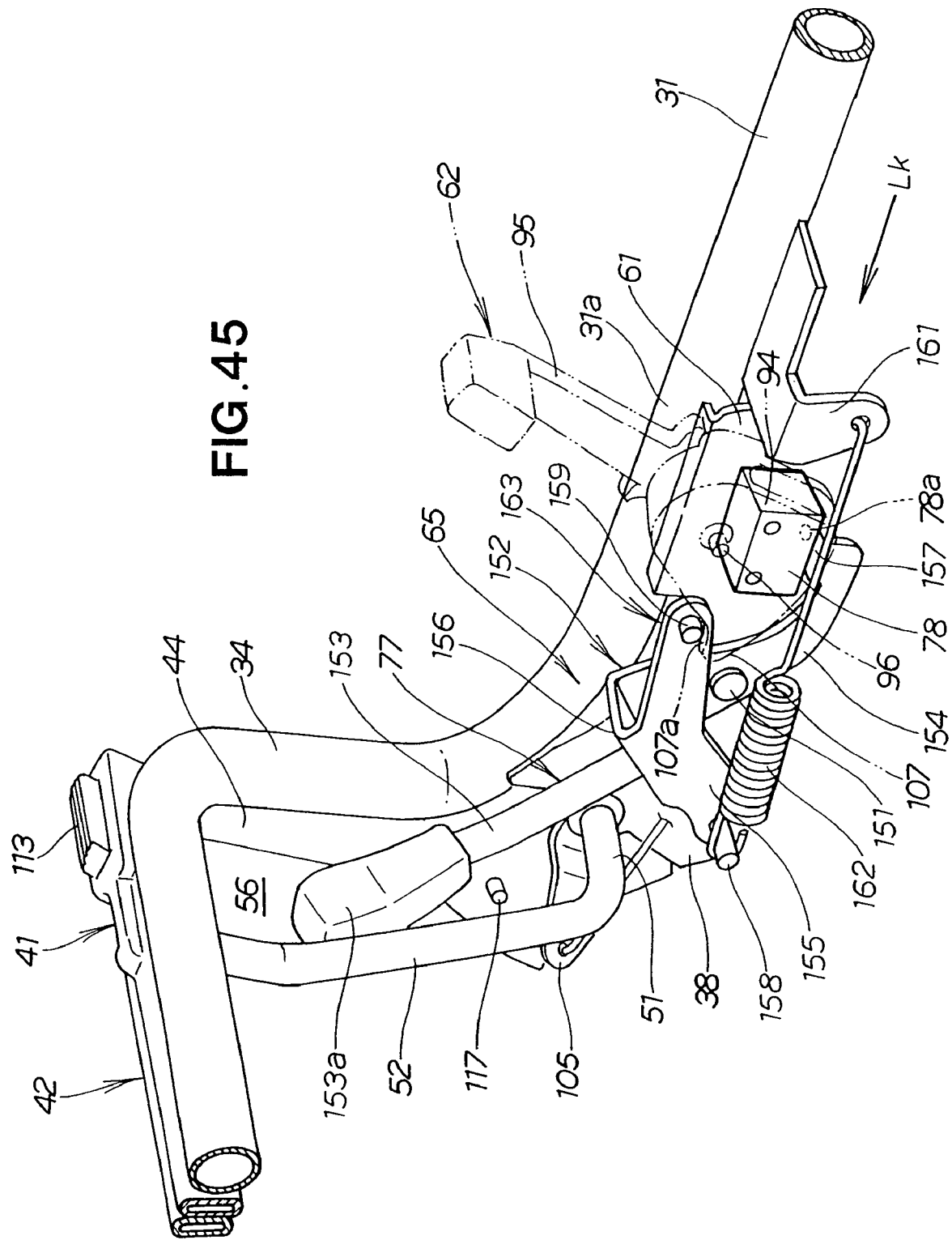
FIG. 45 is a perspective view showing relationships among the handle of FIG. 44, the shift lever, switching lever, rotation mode switch, and linkage mechanism.

As shown in FIGS. 42, 44, and 45, the switch operation lever 77 is an auto-returning member that automatically returns to the original position when released from the lever by the operating hand 57. The rotation mode switch 78 (see FIG. 45) switches according to the operation of the switch operation lever 77. For example, the rotation mode switch 78 turns on when the switch operation lever 77 is operated, and turns off when the switch operation lever 77 is returned to the original position.

As shown in FIGS. 45 and 46, the switch operation lever 77 is positioned in the following manner in relation to the left grip leg portion 34 and the operating space 56.

The switch operation lever 77 is disposed in the vicinity of the left grip leg portion 34 and in the vicinity of the rear end portion 31a in the left handlebar 31. More specifically, the switch operation lever 77 has an arm portion 152 that is attached to the shift lever mounting bracket 61 of the left handlebar 31 via a support pin 151 so as to be able to swing forward and backward, and also has an operating lever portion 153 that extends upward and to the rear from the arm portion 152.

The operating lever portion 153 has a grip 153a at the distal end thereof. The distal end of the grip 153a is positioned slightly further to the rear than the left grip leg portion 34. Accordingly, the operator can operate the switch operation lever 77 by pushing the grip 153a forward with the thumb 57a while grasping the left grip leg portion 34 in the operating space 56 with the left hand 57. As a result, the rotation mode switch 78 is turned on.

Since the switch operation lever 77 is set in this type of positional relationship, the effects obtained are the same as those of the positional relationship of the boost lever 67 to the left grip leg portion 34 and the operating space 56 in the fourth embodiment shown in FIGS. 27 through 29.

More specifically, the arm portion 152 of the switch operation lever 77 has a pair of left and right vertical panels 154, 155, and also has a horizontal panel 156 that extends between the upper ends of the left and right vertical panels 154, 155, as shown in FIGS. 45 and 46. The overall shape of the arm portion 152 is substantially that of an inverted "U" when the arm portion 152 is viewed from the front side (direction of the arrow Lk in FIG. 45) of the walk-behind lawnmower 10. The left vertical panel 154 will be referred to hereinafter as the arm plate 154, the right vertical panel 155 as the actuation arm 155, and the horizontal panel 156 as the lever attachment portion 156.

The center portion of the arm plate 154 is attached to the support pin 151 so that the arm plate 154 can swing forward and backward, and the arm plate 154 has a pressing plate 157 at the elongated end thereof that extends forward and downward from the center portion. The pressing plate 157 is a horizontal portion that is folded toward the shift lever mounting bracket 61 from the end of the arm plate 154.

The lever attachment portion 156 constitutes a rear end of the arm plate 154. The operating lever portion 153 extends rearwardly upwardly from the lever attachment portion 156.

The actuation arm 155 is tilted from the forward-upward direction to the backward-downward direction so as to nearly intersect the arm plate 154 when viewed from the side as shown in FIGS. 45 and 46. The actuation arm 155 has a spring hooking pin 158 at the rear end portion thereof, and an engaging pin 159 (engaging portion 159) at the front end thereof. The engaging pin 159 is positioned so as to approach the engaging surface 107a of the engagement-receiving protrusion 107 in the disk portion 94.

As shown in FIGS. 43 and 44, the left handlebar 31 is provided with a support arm 161. The support arm 161 is positioned further towards the front than the shift lever arm 63. A tension spring 162 is provided between the support arm 161 and the spring hooking pin 158. The tension spring 162 is a return spring for automatically returning the switch operation lever 77 to the "off" position. When the switch operation lever 77 is in the "off" position, the operating lever portion 153 is in the "off" position Q1 (see FIG. 44).

When the operating lever portion 153 is in the "off" position Q1 as shown in FIG. 46, the line L1 in the tension direction of the tension spring 162 is referred to as the "off-time tension line L1." The off-time tension line L1 is offset further downward than the center 151a of the support pin 151.

The rotation mode switch 78 is disposed in front of the switch operation lever 77 in a position that faces the pressing plate 157. The rotation mode switch 78 is composed, for example, of a limit switch that is provided with a pushrod 78a. The pushrod 78a is disposed in a downward orientation opposite the pressing plate 157. The contact of the limit switch is in the "off" state when the pushrod 78a is pushed in by the pressing plate 157 as shown in FIG. 46, and the contact switches to the "on" state when the pushrod 78a is released.

As described above, the rotation mode switch 78 is urged in the counterclockwise direction by the tension spring 162. The pressing plate 157 is therefore retained in a state in which the pushrod 78a is pushed in.

Figure 48:
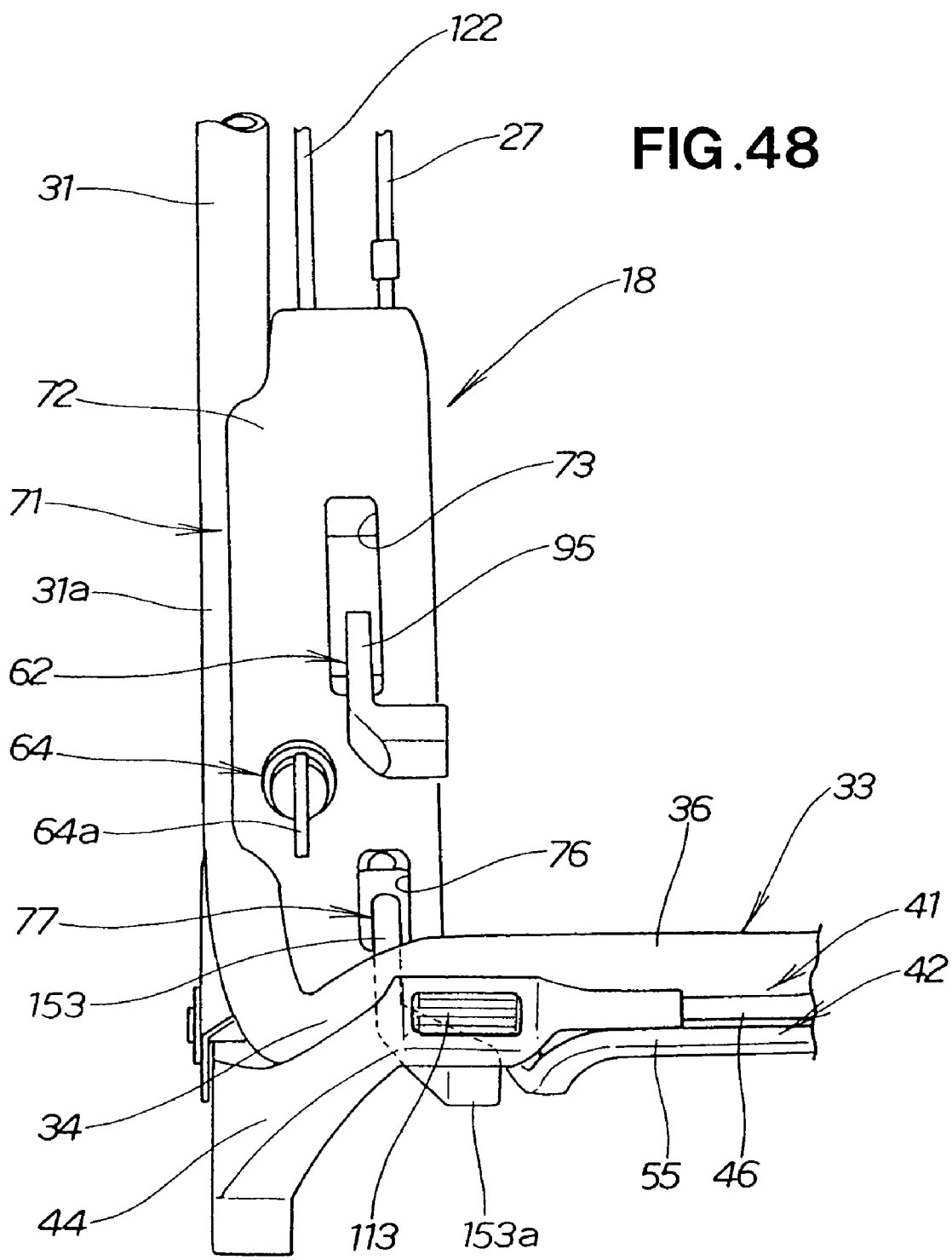
FIG. 48 is a view showing the area surrounding the left rear portion of the handle shown in FIG. 42, as seen from the direction of arrow 48.

In the operating unit 18 as shown in FIGS. 42, 44, and 48, the main switch 64 is disposed to the left and in front of the switch operation lever 77, and the shift lever 62 is disposed in front of the switch operation lever 77 and to the right and in front of the main switch 64.

The cover 71 has a switching lever guide hole 76 to the right of and behind the main switch attachment hole 74. The rotation mode switch 78 and the arm portion 152 of the switch operation lever 77 are covered by the cover 71. The operating lever portion 153 of the switch operation lever 77 protrudes upward from the switching lever guide hole 76.

As shown in FIG. 46, when the operating lever portion 153 is in the "off" position Q1, and the shift lever 62 is in the high-speed position P2, the engaging pin 159 is set to a position HI that approaches the engaging surface 107a of the engagement-receiving protrusion 107. The relationship between the engaging pin 159 and the engagement-receiving protrusion 107 is as follows.

When the operating lever portion 153 is in the "off" position Q1 shown in FIG. 46, the engagement-receiving protrusion 107 does not contact the engaging pin 159 regardless of the swing position of the shift lever 62.

More specifically, when the operating lever portion 95 of the shift lever 62 is in the high-speed position P2 in this relationship, as shown in FIG. 46, the operating lever portion 153 is swung in the clockwise direction of the diagram (direction of the arrow R21), whereby the engaging pin 159 pushes the engagement-receiving protrusion 107 so that the shift lever 62 is swung to the medium-speed position P3.

The engaging pin 159 is positioned in the relatively high position HI in relation to the engaging surface 107a of the engagement-receiving protrusion 107. In this state, the engaging surface 107a of the engagement-receiving protrusion 107 does not contact the engaging pin 159 even when the shift lever 62 is swung forward and backward between the low-speed position P1 and the high-speed position P2.

The operating lever portion 153 is then swung in the clockwise direction (direction of the arrow R21) from the "off" position Q1 to the "on" position, whereby the engaging pin 159 descends in the direction of the arrow R22. In this case, when the shift lever 62 is in the high-speed position P2, for example, the engaging pin 159 contacts the engaging surface 107a and pushes down on the engagement-receiving protrusion 107. The shift lever 62 therefore swings backward from the high-speed position P2 to the medium-speed position P3. The position to which the shift lever 62 is returned is not limited to the medium-speed position P3, and any position can be set.

The structure formed by combining the engaging pin 159 and the engagement-receiving protrusion 107 constitutes a linkage mechanism 163. Since the linkage mechanism 163 is provided in this manner, the shift lever 62 can be engaged in the speed reduction direction when the switch operation lever 77 is swung to switch the target engine speed of the engine 14 (see FIG. 2) to a high level. The shift lever 62 can be linked to the operation of the switch operation lever 77 by the linkage mechanism 163 which is composed of the engaging pin 159 and the engagement-receiving protrusion 107 and hence is simple in structure.

The positional relationship of the operating lever portion 153 to the grip portion 33 of the handle 17 is as follows.

Figure 47:
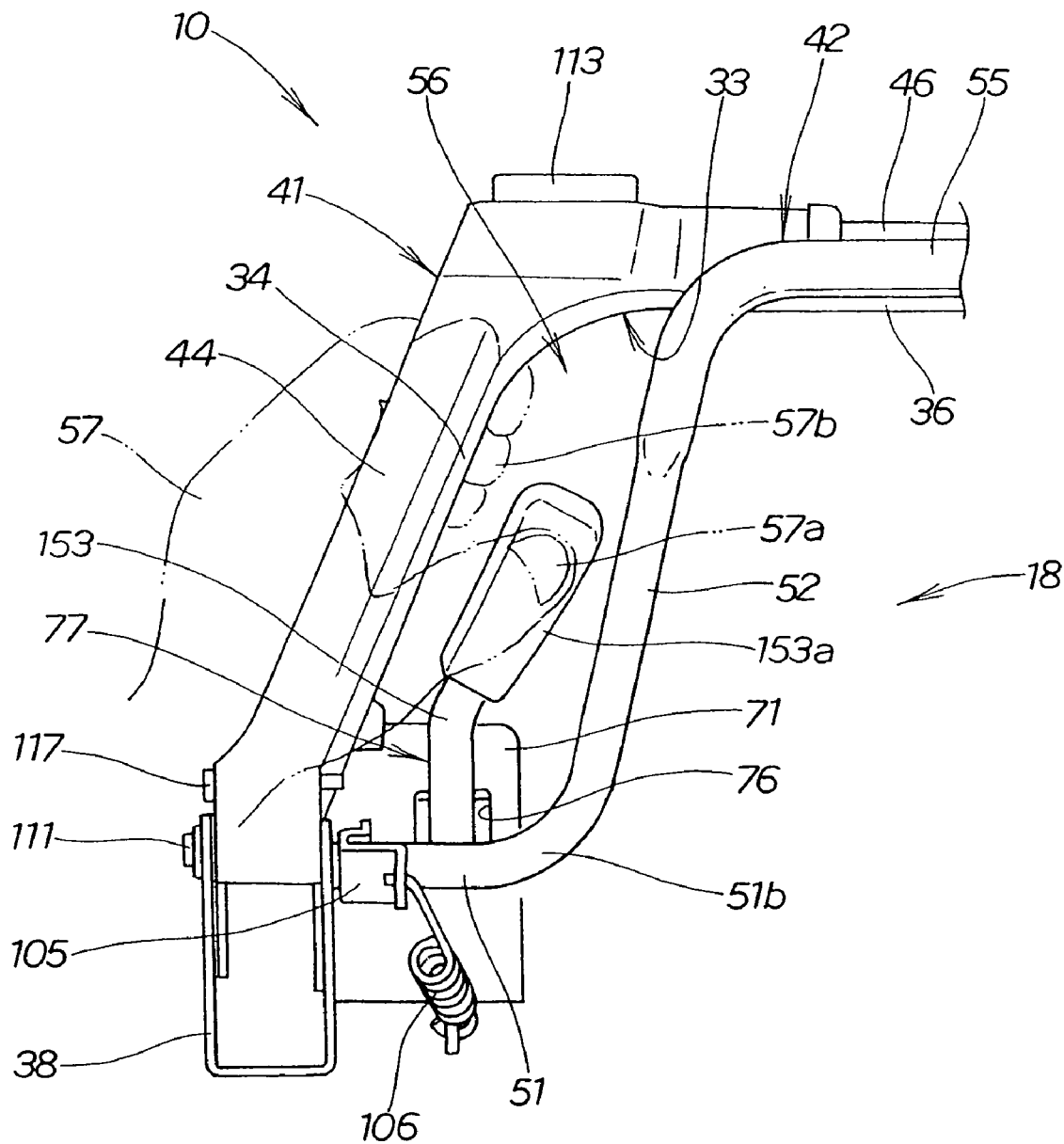
FIG. 47 is a view showing the area surrounding the left rear portion of the handle shown in FIG. 42, as seen from the direction of the arrow 47.

As shown in FIGS. 42 and 47, the grip 153a of the operating lever portion 153 is disposed in the operating space 56. In other words, the operating lever portion 153 is disposed in a position in which the operating lever portion 153 can be operated by the left hand 57 grasping the left grip leg portion 34 of the grip portion 33.

Therefore, it is possible for the operator to hook the thumb 57a on the grip 153a by moving the thumb 57a from behind the grip 153a into the operating space 56, for example, when the left grip leg portion 34 is gripped in the left hand 57. In this state, the grip 153a can be pushed forward by the thumb 57a. The grip 153a is pushed forward, whereby the rotation mode switch 78 (see FIG. 46) switches to the "on" state. The rotation control mode of the engine 14 is thereby switched from the "quiet mode" to the "power mode," and the "power mode" is selected.

The grip 153a that is pushed forward can be returned to the original position by the operation described below.

The operator moves an index finger, a middle finger, a ring finger, and a little finger 57b (hereinafter referred to as "the other fingers 57b") to the operating space 56 from in front of the grip portion 33, for example, while gripping the left grip leg portion 34 in the left hand 57. The other fingers 57b can thereby be hooked on the grip 153a.

Rearward pressure is applied to the grip 153a by the other fingers 57b, and the grip 153a is returned backward. The grip 153a is returned backward, whereby the rotation mode switch 78 (see FIG. 46) is switched to the "off" state. The rotation control mode of the engine 14 is thus switched from the "power mode" to the "quiet mode," and the "quiet mode" is selected.

Specifically, the grip 153a of the operating lever portion 153 can be disposed on the left-hand side on which there is little switching of the handle from one hand to the other during work, and the engine speed can be reduced using only the other fingers 57b without moving the hand.

As is apparent from the above description, in the walk-behind lawnmower 10 of the fifth embodiment, the operator can push the grip 153a forward using only the thumb 57a to increase the speed of the engine 14, without moving the left hand 57 that is gripping the left grip leg portion 34. The operator can therefore comfortably (without awkwardness) push the grip 153a forward using the thumb 57a.

The grip 153a can then be comfortably (without awkwardness) returned backward by pushing the grip 153a to the rear using only the other fingers 57b of the left hand 57 while the operator grasps the left grip leg portion 34 and the left lever leg portion 44 of the work clutch lever 41 in the left hand 57.

An example of the operation of the work clutch lever 41, the travel lever 42, the target engine speed selection unit 65, and the linkage mechanism 66 will next be described.

An example in which the walk-behind lawnmower 10 is made to travel in a state in which the cutter 15 is stopped will first be described based on FIGS. 44 and 49 with reference to FIG. 41. "off" position. Since the work clutch lever 41 is in the "off" position, the clutch 21 is maintained in the "off" state, and the work clutch operation detection sensor 68 is in the "off" state as well. Since the travel lever 42 is in the "off" state, the shifting device 25 is blocking the output of the engine 14 from being transmitted to the rear wheels 13.

Figure 49A:
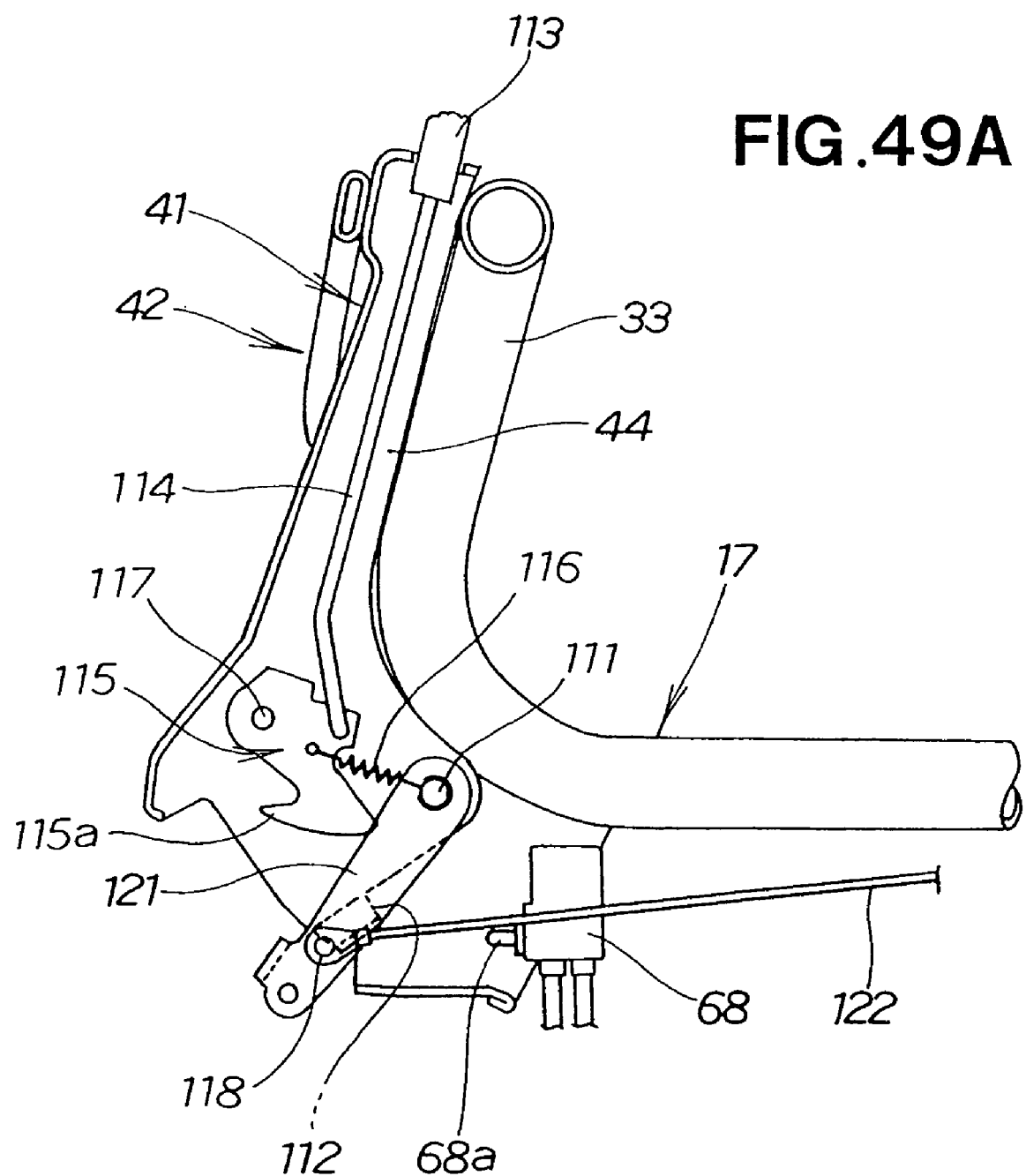
FIGS. 49A through 49F are views showing example operations of the work clutch lever, travel lever, shift lever, and switching lever shown in FIGS. 44 through 46.

After the engine 14 is started, the work clutch lever 41 and the travel lever 42 are swung forward. As a result, the work clutch lever 41 and the travel lever 42 are superposed on the grip portion 33, as shown in FIG. 49A. The position of this superposition is the "on" position.

The work clutch lever 41 is moved to the "on" position, whereby the work clutch operation detection sensor 68 is placed in the "on" state. The push button 113 is not being pressed, and the clutch 21 is therefore maintained in the "off" state. The travel lever 42 is placed in the "on" position, whereby the shifting device 25 transmits the output of the engine 14 to the rear wheels 13. As a result, the walk-behind lawnmower 10 travels forward.

An example in which the cutter 15 is made to rotate while the walk-behind lawnmower 10 is traveling will next be described based on FIGS. 42 and 49B through 49F with reference to FIG. 41.

Figure 49B:
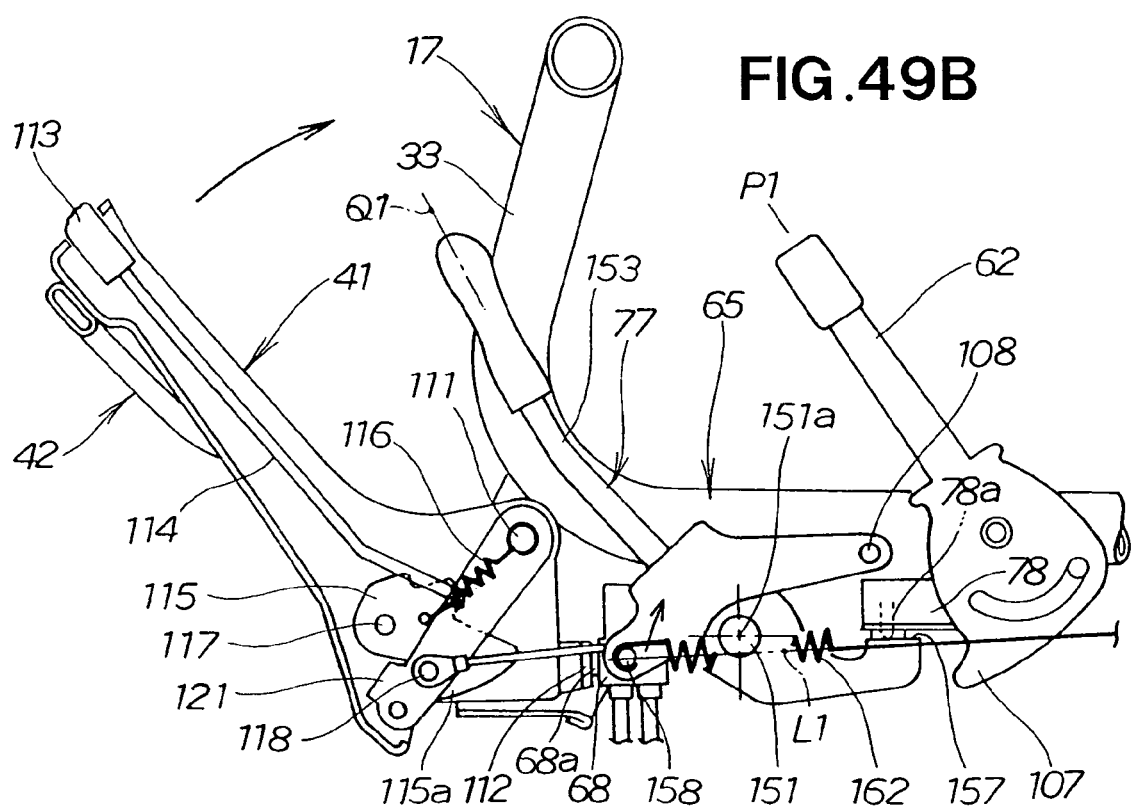

As shown in FIG. 49B, the work clutch lever 41 and the travel lever 42 are in the "off" position. The clutch 21 and the work clutch operation detection sensor 68 are therefore in the "off" state. The shifting device 25 is blocking the output of the engine 14 from being transmitted to the rear wheels 13. The shift lever 62 is also in the rearward low-speed position P1. The operating lever portion 153 of the switch operation lever 77 is in the "off" position Q1. The rotation mode switch 78 is in the "off" state in which the pushrod 78a is pushed by the switch operation lever 77. FIG. 49B shows a state in which the push button 113 is pressed.

The off-time tension line L1 in the tension spring 162 is offset further downward than the center 151a of the support pin 151. The tension spring 162 therefore urges the switch operation lever 77 in the counterclockwise direction about the support pin 151. As a result, the switch operation lever 77 is stably maintained in the "off" position.

The engine 14 is then started.

Figure 49C:
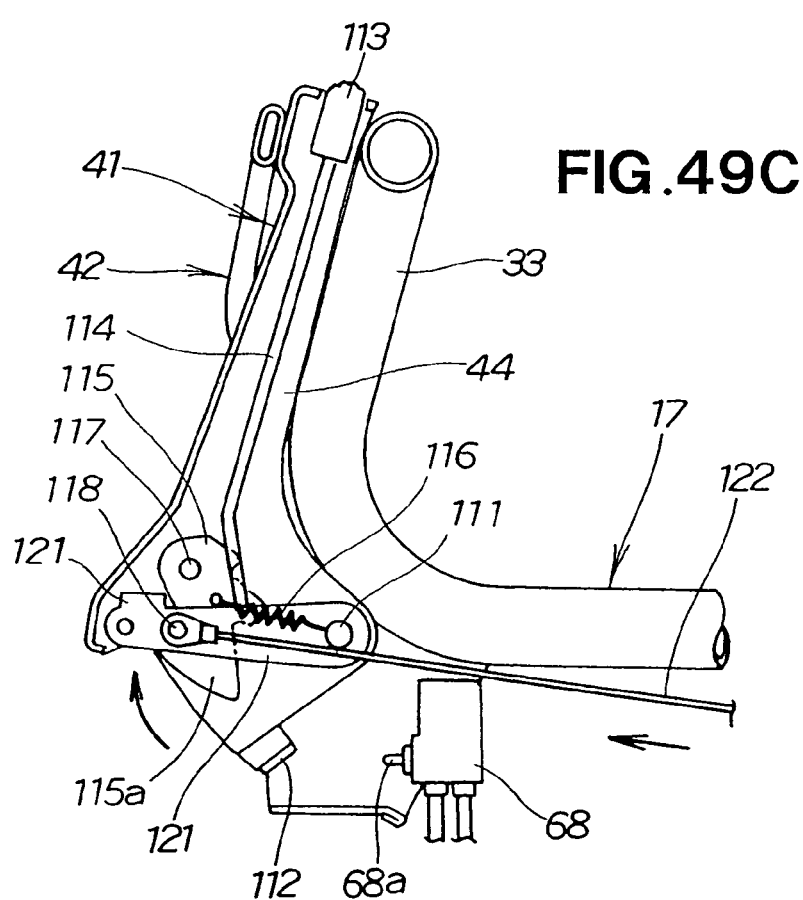

As shown in FIGS. 49B and 49C, the work clutch lever 41 is swung forward while the push button 113 is pressed, whereby the clutch 21 is placed in the "on" state. The cutter 15 rotates as a result. The work clutch operation detection sensor 68 is placed in the "on" state by moving the work clutch lever 41 from the "off" position to the "on" position.

As shown in FIG. 49C, after the work clutch lever 41 is placed in the "on" position, the locking tab 115a and the linking pin 118 remain locked together even when the hand is separated from the push button 113.

Furthermore, the travel lever 42 is swung forward, whereby the shifting device 25 transmits the output from the engine 14 to the rear wheels 13. As a result, the walk-behind lawnmower 10 travels forward. Since the shift lever 62 is in the low-speed position P1, the walk-behind lawnmower 10 travels at low speed.

As shown in FIG. 42, the operator can use the cutter 15 to perform grass cutting work while grasping the left grip leg portion 34 and the left lever leg portion 44 of the work clutch lever 41 in the left hand 57, and grasping the three horizontal bars 36, 46, 55 together on each other in the right hand 58 to cause the walk-behind lawnmower 10 to travel forward.

Figure 49D:
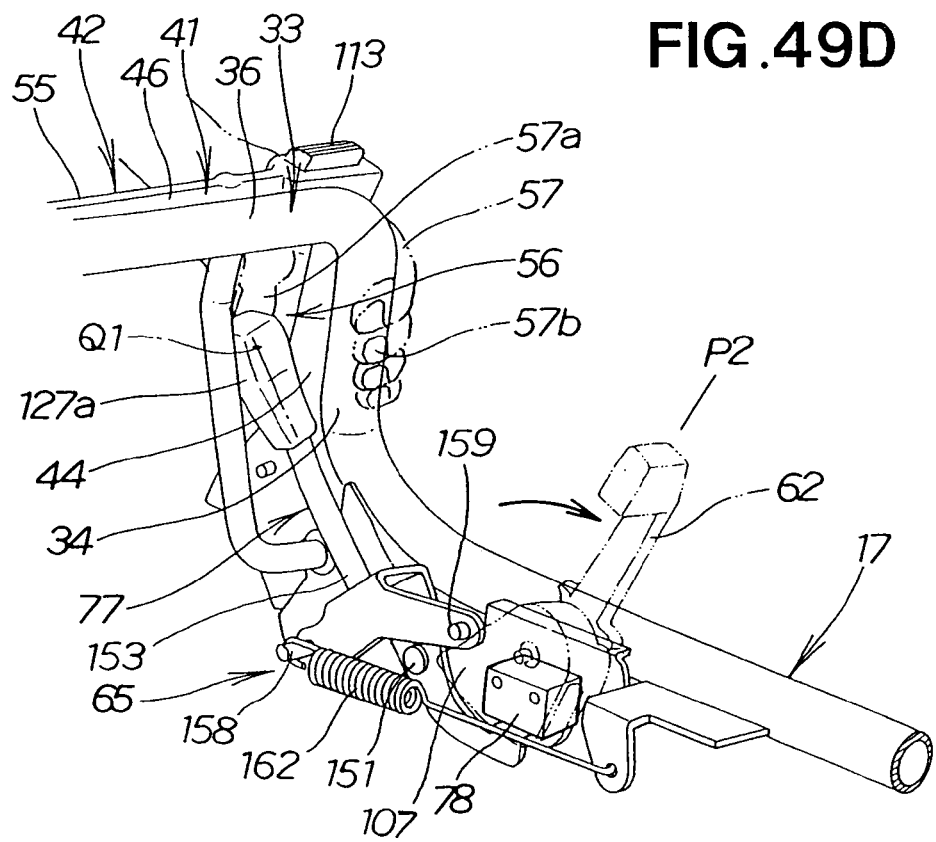
Figure 49E:
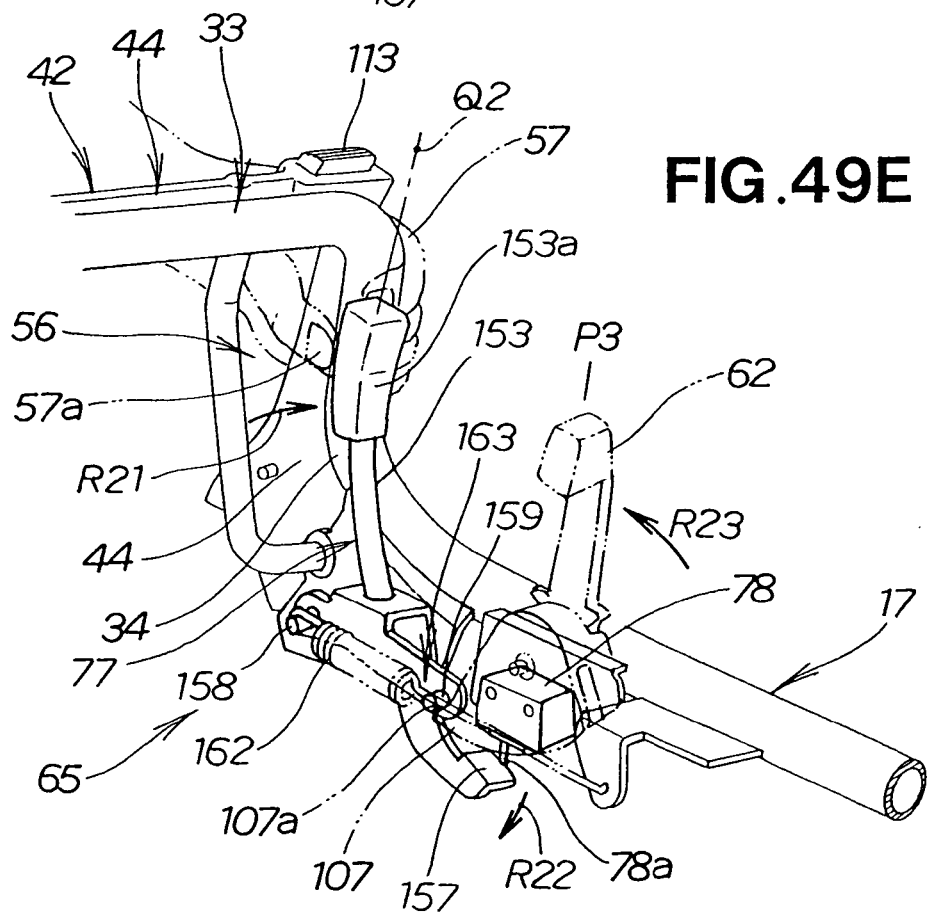

As shown in FIG. 49D, the shift lever 62 is then swung to the high-speed position P2 by the right hand 58. As a result, the walk-behind lawnmower 10 is made to travel at high speed.

Subsequently switching the control mode of the engine 14 from "quiet mode" to "power mode" involves the following operations.

The operator first moves his thumb 57a into the operating space 56 from behind the grip portion 33 while grasping the left grip leg portion 34 in the left hand 57, and hangs (places) his thumb 57a on the grip 153a, as shown in FIG. 49D.

The operator then pushes the grip 153a forward (in the direction of the arrow 21) using the thumb 57a. As a result, the switch operation lever 77 swings in the clockwise direction (direction of the arrow R21) of the diagram. In other words, the operating lever portion 153 shifts to the "on" position Q2. The pressing plate 157 therefore swings in the clockwise direction (direction of the arrow R22) of the diagram and separates from the pushrod 78a. The pushrod 66a protrudes downward, whereby the rotation mode switch 78 is switched to the "on" state. The rotation control mode of the engine 14 is switched to the "power mode" by the switching on of the rotation mode switch 78.

The switch operation lever 77 also swings in the direction of the arrow R21, whereby the engaging pin 159 presses down on the engagement-receiving protrusion 107. The shift lever 62 therefore swings in the counterclockwise direction (direction of the arrow R23) of the diagram from the high-speed position P2 shown in FIG. 49D to the medium-speed position P3 shown in FIG. 49E.

Figure 49F:
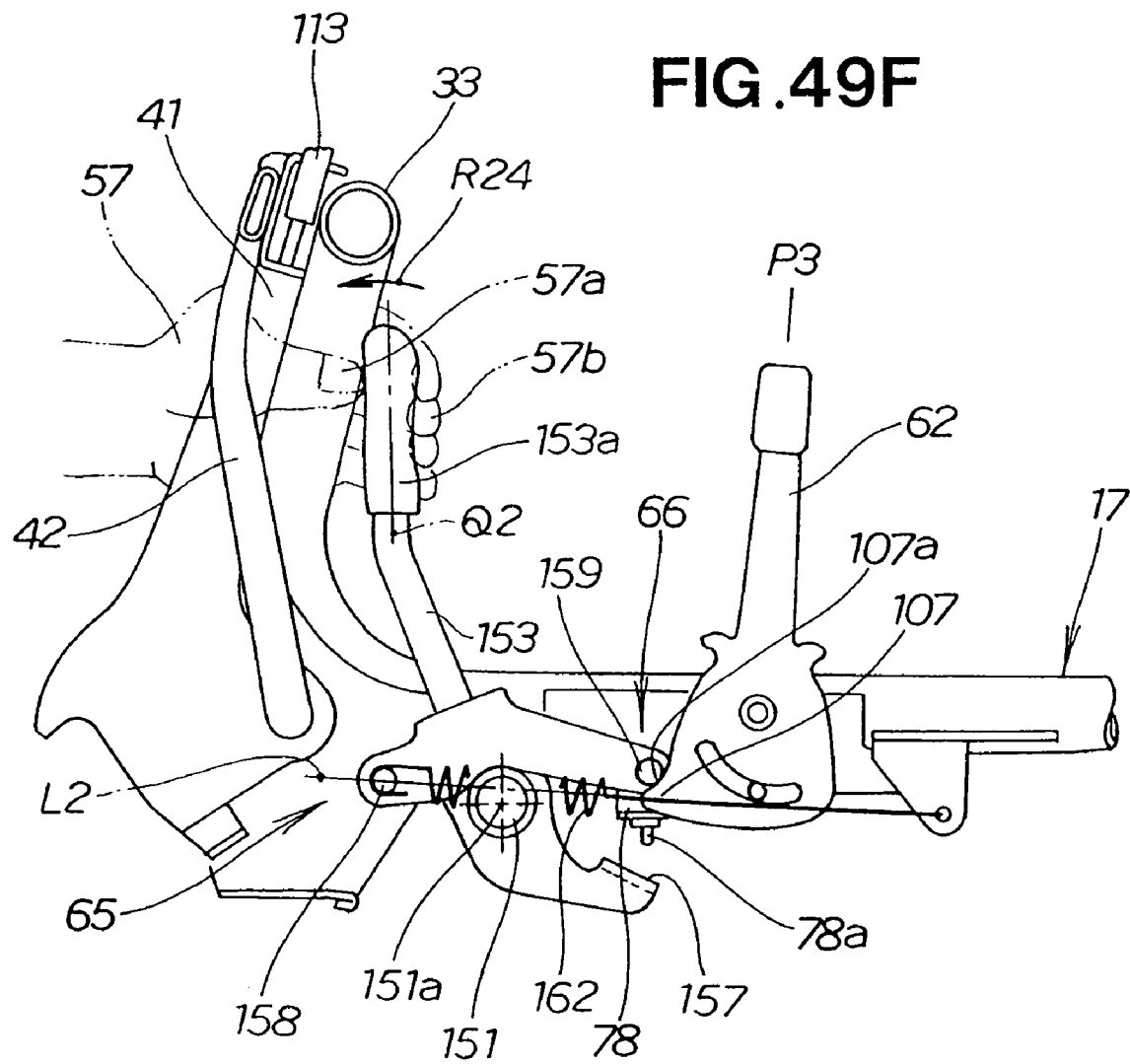

FIG. 49F shows a state in which the operating lever portion 153 is shifted to the "on" position Q2.

The spring hooking pin 158 of the switch operation lever 77 shifts upward in conjunction with the swinging of the switch operation lever 77. As shown in FIG. 49F, the spring hooking pin 158 is higher than the center 151a of the support pin 151 in the state in which the operating lever portion 153 is moved to the "on" position Q2. The linkage point of the tension spring 162 to the spring hooking pin 158 also moves upward as the spring hooking pin 158 is displaced.

The line L2 in the tension direction of the tension spring 162 when the operating lever portion 153 is in the "on" position Q2 will thus be referred to as "the on-time tension line L2." The on-time tension line L2 is offset further upward than the center 151a of the support pin 151. The tension spring 162 is displaced over the center 151a of the support pin 151 from the off-time tension line L1 shown in FIG. 49B to the on-time tension line L2 shown in FIG. 49F. The displacement of the tension line of the tension spring 162 over the center 151a in this manner is referred to as "fulcrum crossing."

The on-time tension line L2 in the tension spring 162 is thus offset further upward than the center 151a of the support pin 151. The tension spring 162 therefore urges the switch operation lever 77 in the clockwise direction about the support pin 151. As a result, the switch operation lever 77 is stably retained in the "on" position.

Subsequently returning the control mode of the engine 14 (see FIG. 41) from the "power mode" to the "quiet mode" during the work of grass cutting involves the following operations.

The operator uses the other fingers 57b of the left hand 57 to pull back the grip 153a while gripping the left grip leg portion 34 in the left hand 57, as shown in FIG. 49F. In other words, the other fingers 57b are used to apply a backward pushing force to the grip 153a to return the grip 153a in the counterclockwise direction (direction of the arrow 24). As a result, the switch operation lever 77 returns to the original "off" position, as shown in FIG. 49D. Since the rotation mode switch 78 switches to the "off" state, the control mode of the engine 14 returns from the "power mode" to the "quiet mode." The shift lever 62 is retained in the medium-speed position P3 shown in FIG. 49F.

As is apparent from the above description, the target engine speed selection unit 65 can be operated to select the target engine speed Nt of the engine 14 according to the work conditions. The working efficiency of the walk-behind lawnmower 10 can therefore be improved.

Furthermore, since a linkage mechanism 66 is provided, the shift position of the shift lever 62 can be automatically adjusted when the target engine speed selection unit 65 is used to select the target engine speed Nt. As a result, the travel speed of the walk-behind lawnmower 10 can be automatically adjusted. The time taken to manually operate the shift lever 62 can be spared when the target engine speed Nt is selected by the target engine speed selection unit 65, and the working efficiency of the walk-behind lawnmower 10 can therefore be increased even further.

Providing the linkage mechanism 66 also enables the shift position of the shift lever 62 to be automatically adjusted to the low-speed side when the target engine speed Nt is increased by the target engine speed selection unit 65. As a result, the travel speed of the walk-behind lawnmower 10 can be automatically reduced. The travel speed of the walk-behind lawnmower 10 can thereby be limited when the target engine speed Nt is switched to a high level. The operator can easily walk along with and operate the walk-behind lawnmower 10, and the maneuverability and ease of use of the walk-behind lawnmower 10 can therefore be enhanced.

In the present invention, the engine-driven work machine is not limited to the walk-behind lawnmower 10, 10A or walking-type tiller 200, and can be applied to various types of work machines that are driven by an engine 14 and provided with an implement.

A seesaw switch was used as the rotation mode switch 65 in the first embodiment, but this configuration is not limiting, and a push switch or other switch may also be used.

The engine-driven work machine of the present invention is suitable for a work machine in which the load on the implement can vary significantly during work, i.e., a walk-behind lawnmower that is driven by an engine 14 and provided with a cutter 15, or a walking-type tiller that is driven by an engine 14 and provided with tilling plates 205, 206.

Obviously, various minor changes and modifications of the present invention are possible in light of the above teaching. It is therefore to be understood that within the scope of the appended claims the invention may be practiced otherwise than as specifically described.

What is claimed is:

1. An engine-driven work machine for driving an implement by an engine, comprising:
    a target engine speed selection unit for selecting and specifying an arbitrary target engine speed from among a plurality of target engine speeds that are set in a stepwise fashion; and
    a control unit for electrically controlling opening and closing of a throttle valve of the engine so as to cause an actual engine speed of the engine to conform to the target engine speed specified by the target engine speed selection unit;
    wherein the target engine speed selection unit is configured to be manually manipulated by an operator of the engine driven working machine for selecting and specifying the arbitrary target engine speed; and
    wherein the plurality of target engine speeds comprises two target engine speeds that include:
    a medium target engine speed at which the engine is substantially capable of generating a maximum torque; and
    a high target engine speed which is higher than the medium target engine speed and at which the engine is substantially capable of generating a maximum output.

2. The work machine of claim 1, further comprising:
    a clutch for disengaging and engaging an output that is transmitted from the engine to the implement;
    a work clutch operating unit for operating the clutch; and
    a work clutch operation detection sensor for detecting that the clutch has been placed in the engaging position by the work clutch operating unit;
    wherein the work clutch operating unit is configured to be manually manipulated by the operator of the engine driven working machine for operating the clutch.

3. An engine-driven work machine for driving an implement by an engine, comprising:
    a target engine speed selection unit for selecting and specifying an arbitrary target engine speed from among a plurality of target engine speeds that are set in a stepwise fashion;
    a control unit for electrically controlling opening and closing of a throttle valve of the engine so as to cause an actual engine speed of the engine to conform to the target engine speed specified by the target engine speed selection unit;
    a clutch for disengaging and engaging an output that is transmitted from the engine to the implement;
    a work clutch operating unit for operating the clutch; and
    a work clutch operation detection sensor for detecting that the clutch has been placed in the engaging position by the work clutch operating unit;
    wherein the target engine speed selection unit is configured to be manually manipulated by an operator of the engine driven working machine for selecting and specifying the arbitrary target engine speed;
    wherein the work clutch operating unit is configured to be manually manipulated by the operator of the engine driven working machine for operating the clutch; and
    wherein the control unit executes control on the basis of the specified target engine speed only when the work clutch operation detection sensor detects that the clutch has been placed in the engaging position.

4. The work machine of claim 1, wherein the control unit increases the specified target engine speed in said stepwise fashion when an angle of the throttle valve increases.

5. The work machine of claim 4, wherein the control unit performs a stepwise reduction so as to reduce the specified target engine speed by a prescribed decrease increment each time the throttle angle is reduced by a prescribed reduction amount when the throttle angle is reduced, and the prescribed reduction amount of the throttle angle and the prescribed decrease increment by which the specified target engine speed is reduced in said stepwise fashion are both set to small step values.

6. The work machine of claim 4, wherein the control unit performs a stepwise increase so as to increase the specified target engine speed by a prescribed increase increment each time the throttle angle is increased by a prescribed increase amount when the throttle angle is increased, and the prescribed increase amount of the throttle angle and the prescribed increase increment by which the target engine speed is increased in said stepwise fashion are both set to large increment values.

7. The work machine of claim 4, wherein the control unit performs a stepwise increase according to an increase characteristic whereby the specified target engine speed is increased by a prescribed increase increment each time the throttle angle is increased by a prescribed increase amount when the throttle angle is increased; and
    performs a stepwise reduction according to a reduction characteristic whereby the specified target engine speed is reduced by a prescribed decrease increment each time the travel is reduced by a prescribed reduction amount when the throttle angle is reduced, and the increase characteristic and the reduction characteristic are hysteretic.

8. An engine-driven work machine for driving an implement by an engine, comprising:
    a target engine speed selection unit for selecting and specifying an arbitrary target engine speed from among a plurality of target engine speeds that are set in a stepwise fashion;
    a control unit for electrically controlling opening and closing of a throttle valve of the engine so as to cause an actual engine speed of the engine to conform to the target engine speed specified by the target engine speed selection unit; and
    a target engine speed change operation unit for issuing a temporary change command on the basis of a human operation;
    wherein the target engine speed selection unit is configured to be manually manipulated by an operator of the engine driven working machine for selecting and specifying the arbitrary target engine speed; and
    wherein the control unit temporarily changes the specified target engine speed to a different target engine speed according to the temporary change command only when a condition wherein the engine-driven work machine is operating is satisfied.

9. The engine-driven work machine of claim 8, further comprising a travel unit capable of self-propulsion of the engine-driven work machine, wherein the control unit determines that said condition in which the engine-driven work machine is operating is satisfied when at least one condition is satisfied from the group consisting of a condition in which work is being performed by an implement, and a condition in which travel is being performed by the travel unit.

10. The work machine of claim 8, wherein the specified target engine speed is a medium target engine speed at which the engine is substantially capable of generating a maximum torque, and the different target engine speed is a high target engine speed which is higher than the medium target engine speed and at which the engine is substantially capable of generating a maximum output.

11. The work machine of claim 8, wherein the target engine speed change operation unit continuously issues the change command only during the time in which said human operation is continued, and the control unit increases a value of the specified target engine speed according to a time during which the change command is issued, and uses the increased value as the different target engine speed.

12. An engine-driven work machine for driving an implement by an engine, comprising:
   a target engine speed selection unit for selecting and specifying an arbitrary target engine speed from among a plurality of target engine speeds that are set in a stepwise fashion;
   a control unit for electrically controlling opening and closing of a throttle valve of the engine so as to cause an actual engine speed of the engine to conform to the target engine speed specified by the target engine speed selection unit;
   a machine body which has a travel unit and on which the engine is mounted;
   left and right handlebars that extend rearward from the machine body; and
   a grip portion that extends between the rear ends of the left and right handlebars;
   wherein the target engine speed selection unit is configured to be manually manipulated by an operator of the engine driven working machine for selecting and specifying the arbitrary target engine speed;
   wherein the grip portion comprises left and right grip leg portions that extend upward from rear ends of the left and right handlebars; and
   a grip bar that extends between upper ends of the left and right grip leg portions, and the target engine speed selection unit is provided at a rear end portion of one of the left and right handlebars.

13. The work machine of claim 12, further comprising a target engine speed change operation unit for temporarily changing the specified target engine speed, wherein the target engine speed change operation unit has an operating member for manual operation, and the operating member is provided in a position which is close to the target engine speed selection unit and where operation of the operating member by a hand gripping one of the left and right handlebars is permitted.

14. The work machine of claim 13, further comprising:
   a lever that is used for operating either the implement or the travel unit, and that is positioned so as to be generally parallel to a rear surface of the grip portion;
   left and right lever leg portions that are substantially parallel to the left and right grip leg portions, respectively; and
   a horizontal bar extending between upper ends of the left and right lever leg portions and being substantially parallel to the grip bar,
   wherein an interval between the left and right lever leg portions is smaller than an interval between the left and right grip leg portions, whereby an operating space is provided between the grip leg and the lever leg portion on one of the left side and the right side, the operating member being disposed in the operating space.

15. The work machine of claim 14, wherein the operating member comprises an operating lever extending further to the rear than the grip portion.

16. An engine-driven work machine for driving an implement by an engine, comprising:
   a target engine speed selection unit for selecting and specifying an arbitrary target engine speed from among a plurality of target engine speeds that are set in a stepwise fashion;
   a control unit for electrically controlling opening and closing of a throttle valve of the engine so as to cause an actual engine speed of the engine to conform to the target engine speed specified by the target engine speed selection unit;
   a machine body which has a travel unit and on which the engine is mounted;
   a handle extending to the rear from the machine body;
   a shift lever provided with the handle and used to adjust a travel speed of the travel unit; and
   a linkage mechanism for linking the shift lever to operation of the target engine speed selection unit;
   wherein the target engine speed selection unit is configured to be manually manipulated by an operator of the engine driven working machine for selecting and specifying the arbitrary target engine speed.

17. The work machine of claim 16, wherein the linkage mechanism switches the shift lever to a speed reduction side when the target engine speed selection unit is moved from a low-speed target engine speed to a high-speed target engine speed among the plurality of target engine speeds.

18. The work machine of claim 16, wherein the target engine speed selection unit comprises a switching lever provided to the handle, and a switch that can be operated by the switching lever, the linkage mechanism comprises an engaging portion provided to the switching lever, and an engagement-receiving portion provided to the shift lever, and the engaging portion engages with the engagement-receiving portion in conjunction with movement of the switching lever, whereby the shift lever is moved in conjunction with the switching lever.

19. The work machine of claim 18, wherein the switching lever comprises a grip, and the grip is disposed in a vicinity of a grip portion of the handle.

* * * * *